US009688422B2

(12) United States Patent
Roberts et al.

(10) Patent No.: US 9,688,422 B2
(45) Date of Patent: *Jun. 27, 2017

(54) SYSTEM AND TOOL FOR ACCESSING SATELLITE FILL/DRAIN VALVES DURING PROPELLANT RESUPPLY

(71) Applicant: MACDONALD, DETTWILER AND ASSOCIATES INC., Brampton (CA)

(72) Inventors: Paul Roberts, Brampton (CA); Gavin Hay, Toronto (CA); Jason White, Toronto (CA); Geoffrey Sprawson, Kleinberg (CA)

(73) Assignee: MACDONALD, DETTWILER AND ASSOCIATES INC., Brampton, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,444

(22) Filed: Aug. 14, 2015

(65) Prior Publication Data
US 2016/0039544 A1  Feb. 11, 2016

Related U.S. Application Data

(62) Division of application No. 13/706,126, filed on Dec. 5, 2012, now Pat. No. 9,108,747.
(Continued)

(51) Int. Cl.
*B64G 1/10* (2006.01)
*B64G 4/00* (2006.01)
*B64G 1/40* (2006.01)

(52) U.S. Cl.
CPC .......... *B64G 1/1078* (2013.01); *B64G 1/402* (2013.01); *B64G 4/00* (2013.01)

(58) Field of Classification Search
CPC .......... B64G 1/10; B64G 1/1078; B64G 1/64; B64G 1/646; B64G 4/00; B64G 2004/005
See application file for complete search history.

(56) References Cited

U.S. PATENT DOCUMENTS

| 3,953,039 A | 4/1976 | Hauge et al. |
| 4,502,353 A | 3/1985 | Beaudoin |

(Continued)

FOREIGN PATENT DOCUMENTS

| CA | 2473981 | 1/2006 |
| CA | 2680364 | 9/2008 |

(Continued)

OTHER PUBLICATIONS

Oda M et al.: "ETS-VII, space robot in-orbit experiment satellite," Robotics and Automation, 1996. Proceedings., 1996 IEEE International Conference on Minneapolis, MN, USA Apr. 22-28, 1996, New York, NY, USA IEEE, US, vol. 1, Apr. 22, 1996, pp. 739-744.
(Continued)

*Primary Examiner* — Tien Dinh
*Assistant Examiner* — Christopher Hutchens
(74) *Attorney, Agent, or Firm* — Lynn C. Schumacher; Stephen W. Leonard; Hill & Schumacher

(57) ABSTRACT

Herein is disclosed a tool, system and method for refueling on-orbit spacecraft. The tool and system are configured to allow for resupply of spacecraft configured to be propelled by either a bipropellant (oxidizer and fuel) or a monopropellant (typically hydrazine). The refueling tool is particularly suited for resupply of satellites not originally prepared for refueling but the system may also be used for satellites specifically designed for refueling.

12 Claims, 45 Drawing Sheets

Related U.S. Application Data

(60) Provisional application No. 61/566,893, filed on Dec. 5, 2011.

(56) References Cited

U.S. PATENT DOCUMENTS

| | | | |
|---|---|---|---|
| 4,609,169 | A | 9/1986 | Schweickert et al. |
| 4,720,221 | A | 1/1988 | Yoshioka et al. |
| 4,831,531 | A | 5/1989 | Adams et al. |
| 4,955,654 | A | 9/1990 | Tsuchihashi et al. |
| 5,238,461 | A | 8/1993 | Gotman |
| 5,322,494 | A | 6/1994 | Holtey et al. |
| 5,511,748 | A | 4/1996 | Scott |
| 5,582,366 | A | 12/1996 | Hamant et al. |
| 5,803,407 | A | 9/1998 | Scott |
| 5,806,802 | A | 9/1998 | Scott |
| 6,484,973 | B1 | 11/2002 | Scott |
| 6,739,555 | B2 | 5/2004 | Mazanek et al. |
| 6,843,446 | B2 | 1/2005 | Scott |
| 7,156,348 | B1 | 1/2007 | Kistler et al. |
| 7,370,835 | B2 | 5/2008 | Kistler et al. |
| 7,575,200 | B2 | 8/2009 | Behrens et al. |
| 7,823,837 | B2 | 11/2010 | Behrens et al. |
| 8,074,935 | B2 | 12/2011 | Gryniewski et al. |
| 8,181,911 | B1 | 5/2012 | Gryniewski et al. |
| 8,196,870 | B2 | 6/2012 | Gryniewski et al. |
| 2004/0026571 | A1 | 2/2004 | Scott |
| 2006/0145024 | A1 | 7/2006 | Kosmas et al. |
| 2006/0151671 | A1 | 7/2006 | Kosmas et al. |
| 2007/0051854 | A1 | 3/2007 | Behrens et al. |
| 2007/0125910 | A1 | 6/2007 | Cepollina et al. |
| 2007/0228219 | A1 | 10/2007 | Behrens et al. |
| 2007/0228220 | A1 | 10/2007 | Behrens et al. |
| 2008/0237400 | A1* | 10/2008 | Gryniewski ......... B64G 1/1078 244/172.2 |
| 2009/0044655 | A1 | 2/2009 | DeLouis et al. |
| 2012/0053000 | A1 | 3/2012 | Ohm et al. |

FOREIGN PATENT DOCUMENTS

| | | |
|---|---|---|
| DE | 102008061978 | 7/2010 |
| WO | 2007117373 | 10/2007 |
| WO | 2007126526 A1 | 11/2007 |
| WO | 2008066512 | 6/2008 |
| WO | 2011019742 | 2/2011 |
| WO | 2012113621 | 8/2012 |

OTHER PUBLICATIONS

Madison, Richard "Micro-Satellite Based, On-Orbit Servicing Work at the Air Force Research Laboratory," In: Aerospace Conference Proceedings, 2000IEEE, Big Sky, MT, USA: Mar. 18, 2000 to Mar. 25, 2000, vol. 4 ISBN: 0-7803-5846-5, p. 215-226.

Eberhardt et al, "Orbital Spacecraft Resupply Technology," In AIAA/ASME/SAE/ASEE 22nd Joint Propulsion Conference Jun. 16-18, 1986, Huntsville, Alabama.

Cox, G.R., et al. "Orbital Spacecraft Consumables Resupply System (OSCRS), Final Report, vol. II, Study Results", National Aeronautics and Space Administration Lyndon B. Johnson Space Center, Mar. 1987.

European Search Report; (EP 8733557.6); MacDonald Dettwiler & Associates Inc., Completed Jan. 14, 2011.

Manouchehri et al., "Automated Resupply of Consumables: Enhancement of Space Commercialization Opportunities" In: Fifth Annual Workshop on Space Operations Applications and Research (SOAR '91) NASA CP-3127, Kumar Krishen, 788 pages, published by NASA, Washington, D.C. 1992, p. 407-411.

Kosmas et al., "On-Orbit-Servicing by 'Hermes on -Orbit-Servicing System', Policy Robust Planning", American Institute of Aeronautics and Astronautics, 4 pages.

International Search Report (PCT/CA2012/050876) dated Apr. 24, 2013.

International Search Report (PCT/CA2012/000947) dated Mar. 28, 2013.

Jasiobedski, P. et al., "Pose Determination and Tracking for Autonomous Satellite Capture", Jun. 2001, Conference proceeding: 6th International Symposium on Artificial Intelligence, Robotics and Automation in Space, Montreal downloaded on Mar. 15, 2013 from: http://nparc.cisti-icist.nrc-enrc.gc.ca/npsi/ctrl?action=rtdoc &an=5763623&lang=en.

"The Structure of Canaderm"—Brochure (Canadian Space Agency), Nov. 7, 2011, 4 pages total, downloaded on Mar. 15, 2013 from: http://www.asc-csa.gc.ca/eng/canaderm/description.asp.

* cited by examiner

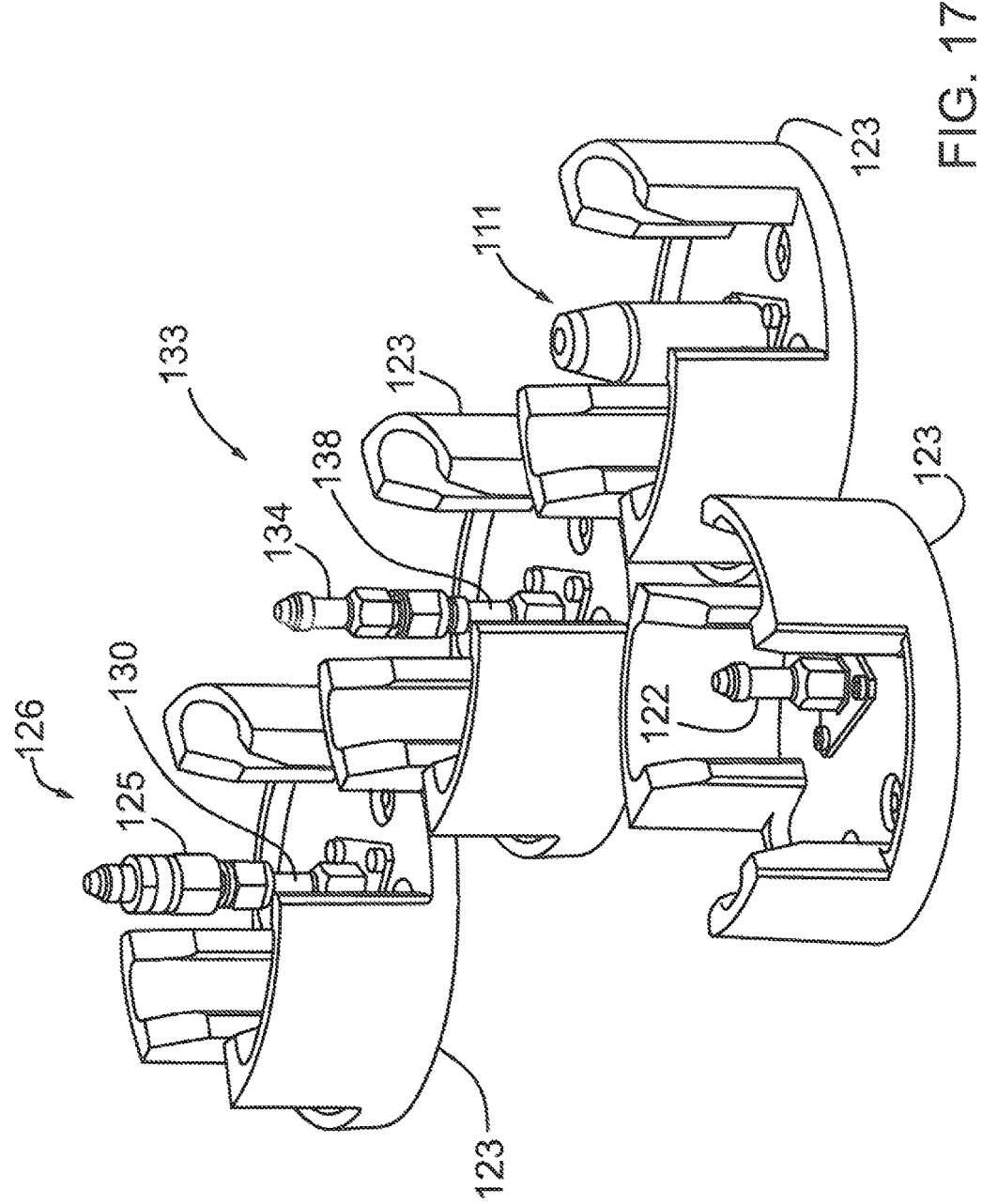

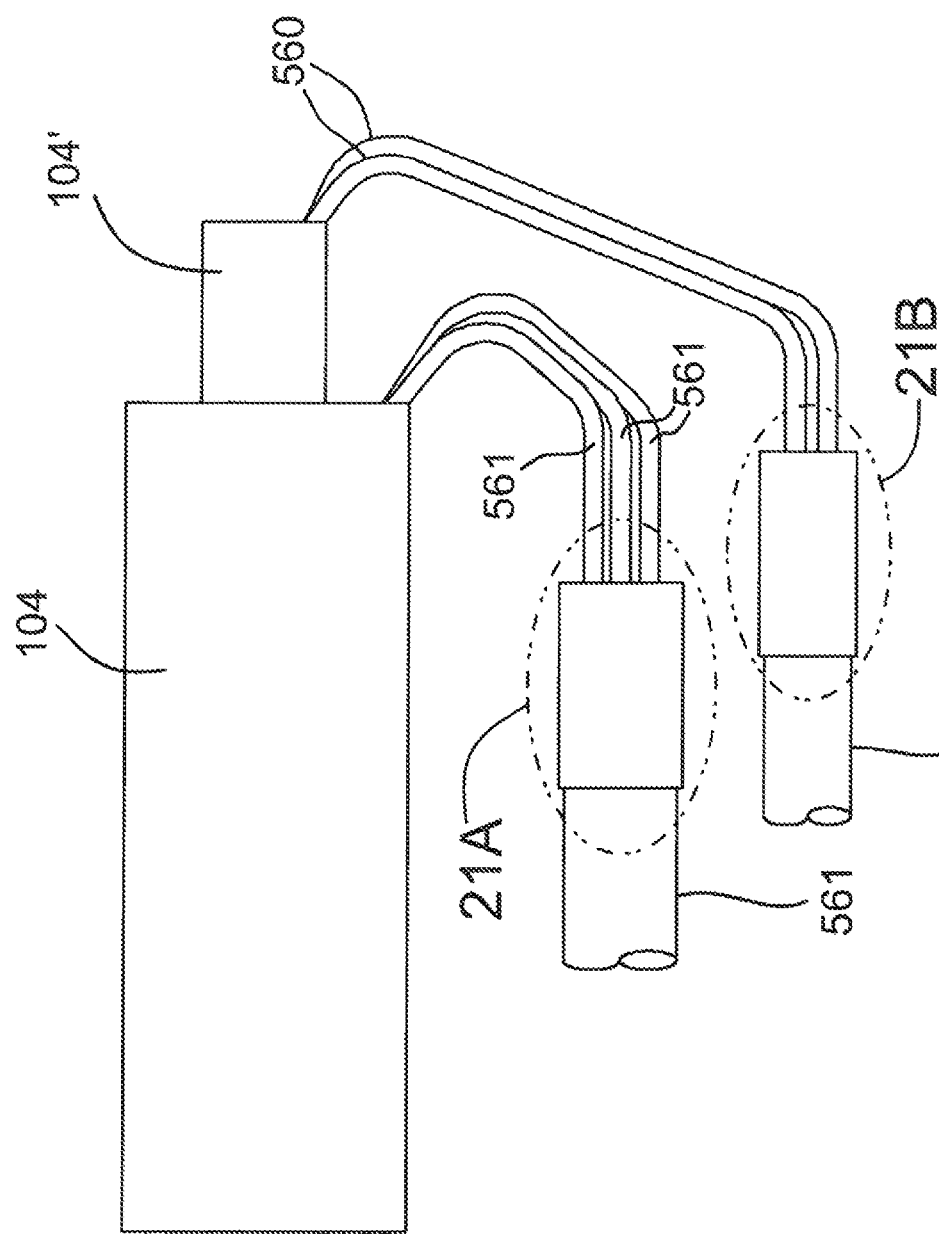

SYSTEM AND TOOL FOR ACCESSING SATELLITE FILL/DRAIN VALVES DURING PROPELLANT RESUPPLY

CROSS REFERENCE TO RELATED U.S PATENT APPLICATION

This patent application is a divisional application of U.S. patent application Ser. No. 13/706,126, filed in English, claiming the priority benefit from U.S. provisional patent application Ser. No. 61/566,893 filed on Dec. 5, 2011, entitled TOOL FOR ACCESSING SATELLITE FILL/DRAIN VALVES DURING PROPELLANT RESUPPLY, filed in English, the Summary, Detailed Description, claims and figures all being incorporated herein in their entirety by reference.

TECHNICAL FIELD

The present disclosure relates to a tool for safely accessing, opening and closing fill/drain valves on artificial satellites during on-orbit propellant resupply operations. More particularly the tool is designed for resupply of satellites with propellant not originally prepared for being resupplied as well as satellites designed for resupply.

BACKGROUND

Many satellites currently in operation were designed with a finite amount of propellant and were not designed for the possibility of being resupplied with propellant. The design philosophy relied upon replacement of the satellites after they had exhausted the on-board propellant supply. In view of the expense of replacing satellites, it would be very advantageous to be able to resupply satellites with propellant which are either near their end of propellant life but otherwise functional, or have suffered an infant propulsion system failure or insertion anomaly, or have been maneuvered more than originally intended for their nominal operations, thereby extending their operational life by several or many years.

It is estimated that as many as half of all GEO communication satellites end their 10 to 15 year life with all or most of their subsystems still functional and it is only the depletion of the carefully budgeted propellant load that drives retirement of the satellite. Using a current economic model, the ability to resupply these end of life satellites in one mission with propellant, would extend each of their useful lives by 3 to 5 years and thereby delay the need to outlay the very high capital costs to launch a replacement for each satellite. Some satellites suffer from primary propulsion system failures or launch vehicle upper stage related failures soon after they are launched. In these cases the entire book value must be written off and compensation paid to the operator by the insurer. The satellite becomes an asset of the insurer and will eventually have to be disposed of in a graveyard or re-entry orbit. If one of these assets can be resupplied with propellant, enabling it to transfer to an orbital station in geosynchronous orbit and extending its life by 5 to 10 years, most or all of the value of the spacecraft can be recovered.

The key technical difficulty is that these satellites were not designed for robotic servicing, and it is not generally accepted that such missions are technically possible. Specifically, most satellites are designed with propellant fill and drain valves that were intended to be filled once prior to launch and never opened or manipulated again. Thus, accessing these fill and drain valves remotely in-orbit presents several major challenges and would involve several operations, each of which is difficult to accomplish robotically including: cutting and removal of the protective thermal blankets, removal of several lockwires hand wrapped around the valves, unthreading and removing outer and inner valve caps, mating a fuel fill line to the valve nipple, mechanically actuating the valve, and when resupply with propellant is complete, replacing the inner valve cap.

On-orbit servicing has been the subject of much study over the past thirty years. The idea of maintaining space assets rather than disposing of and replacing them has attracted a variety of ideas and programs. So far the concept has only found a home in the manned space program where some success can be attributed to the Solar Max and Hubble Space Telescope repair missions, Palapa-B2 and Westar rescue missions and the assembly and maintenance of the International Space Station.

Robotic capture and servicing of operating geostationary spacecraft has never been demonstrated. Until recently there have been no technologies disclosed that can solve the problem of accessing the propellant system of an unprepared satellite for the purpose of replenishing station keeping propellant. The majority of artificial satellites in orbit today were not designed with orbital propellant resupply in mind and access to the propellant system is designed to be accessed by a human on earth before launch. The technologies required to access the client spacecraft's propellant system for the purposes of resupply of propellant still have a very low technology readiness level, and are generally considered to be the main obstacle to a successful servicing mission.

Transferring fuels used for spacecraft propulsion systems from one source to another is very dangerous, due to the corrosive and explosive nature of the liquids involved. For example, inadvertent mixing of fuel and oxidizer in bipropellant systems will cause immediate combustion, so a liquid transfer system for bipropellant based fuels needs to ensure that no accidental mixing occurs.

It would be very advantageous to provide a tool designed for opening and closing of a variety of types/sizes of satellite fill/drain valves during a propellant resupply operation being conducted on an unprepared satellite, such as but not limited to, removal of the sealing cap assembly, coupling/decoupling of propellant hoses to the client satellite, installation of a new sealing cap assembly, to mention just a few.

SUMMARY

The present disclosure relates to a tool for safely accessing, opening and closing fill drain valves on satellites during on-orbit propellant resupply operations. The tool is designed for resupply of satellites not originally prepared for propellant but may also be used for resupplying satellites designed specifically for resupply operations.

An embodiment disclosed herein is a tool mounted on a first satellite for opening a rotationally removable access component of a second satellite, the access component on the second satellite having rotatable and static features coaxially aligned along a first axis, comprising:
  a housing including
    a motor mounted in said housing, a gear shifter coupled to said motor,
    a wrench mechanism mounted in said housing including at least first and second adjustable wrench mechanisms coaxially aligned one on top of the other along a second axis;

a differential gearbox mounted in said housing coupled to said first and second adjustable wrench mechanisms, the gearbox being configured to split the torque received by the gear shifter evenly between the first and second adjustable wrench mechanisms; and wherein, when the tool is positioned with the wrench mechanism down over the access component with the second axis coincident with the first axis, the first adjustable wrench mechanism engages the rotatable feature of the rotationally removable access component and the second adjustable wrench mechanism engages the static feature of the access component such that the wrench mechanism applies equal and opposite forces to the rotatable feature and the static feature to apply bi-directional torque to the rotatable feature while reacting the torque on the static feature.

There is also provided a method for remotely opening a rotationally removable access component mounted on a client satellite, the access component on the client satellite having rotatable and static features, comprising:

activating a positioning mechanism mounted on a servicer satellite and releasibly coupling an end-effector on the positioning mechanism to a tool mounted on the servicer satellite;

positioning the tool over the rotationally removable access component and aligning a wrench mechanism mounted in the tool over the rotationally removable access component until a rotational axis of the wrench mechanism is aligned with a rotational axis of the rotationally removable access component so that a first adjustable wrench mechanism section of the wrench mechanism is engaged with the rotatable feature of the rotationally removable access component and a second adjustable wrench mechanism section of the wrench mechanism is engaged with the static feature of the rotationally removable access component; and activating the wrench mechanism for applying equal and opposite forces to the rotatable feature and the static feature to apply bi-directional torque to the rotatable feature while reacting the torque on the static feature.

There is also disclosed a system mounted on a servicing spacecraft for transferring fluid between one or more selected fluid storage tanks on the servicing spacecraft and a client satellite, the client satellite including one or more fluid storage tanks and a fill/drain valve associated with each of the one or more fluid storage tanks, each fill/drain valve having rotatable features and static features, comprising:

a) a positioning mechanism, an end effector mounted on the positioning mechanism, the end effector being coupled to the one or more selected fluid storage tanks;

b) a tool including
a housing,
a fixture mounted on said housing configured to be grasped by said end effector,
a fluid selection and coupling mechanism mounted in said housing and configured to be coupled to the end effector for coupling the one or more fluid storage tanks on the client satellite to the one or more selected fluid storage tanks mounted on the servicing spacecraft,
a wrench mechanism located in said housing and configured for opening and closing each fill/drain valve on the one or more tanks and mating the fluid selection and coupling mechanism to the at least one fill/drain valve on the client satellite;
an actuator mounted in said housing coupled to the fluid selection and coupling mechanism and the wrench mechanism;

c) a sensor system for at least determining a relative displacement between said tool and each fill/drain valve on the one or more fluid storage tanks; and d) a control system in communication with said sensor, said positioning mechanism, said end effector and said actuator for controlling operation of said positioning mechanism, said end effector and said tool based on feedback from said sensor.

A further understanding of the functional and advantageous aspects of the disclosure can be realized by reference to the following detailed description and drawings.

BRIEF DESCRIPTION OF THE DRAWINGS

Embodiments of the refueling tool will now be described, by way of example only, with reference to the drawings, in which:

FIG. 5IB shows part of the assembled tubing system of the fuel oxidizer exchanger subsystem of FIG. 5IA.

FIG. 17 shows four component stowage points and the components stored on each one forming part of the system disclosed herein.

FIG. 21 shows how the motor leads are connected to the motor harness.

DETAILED DESCRIPTION

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

Figure 1A:
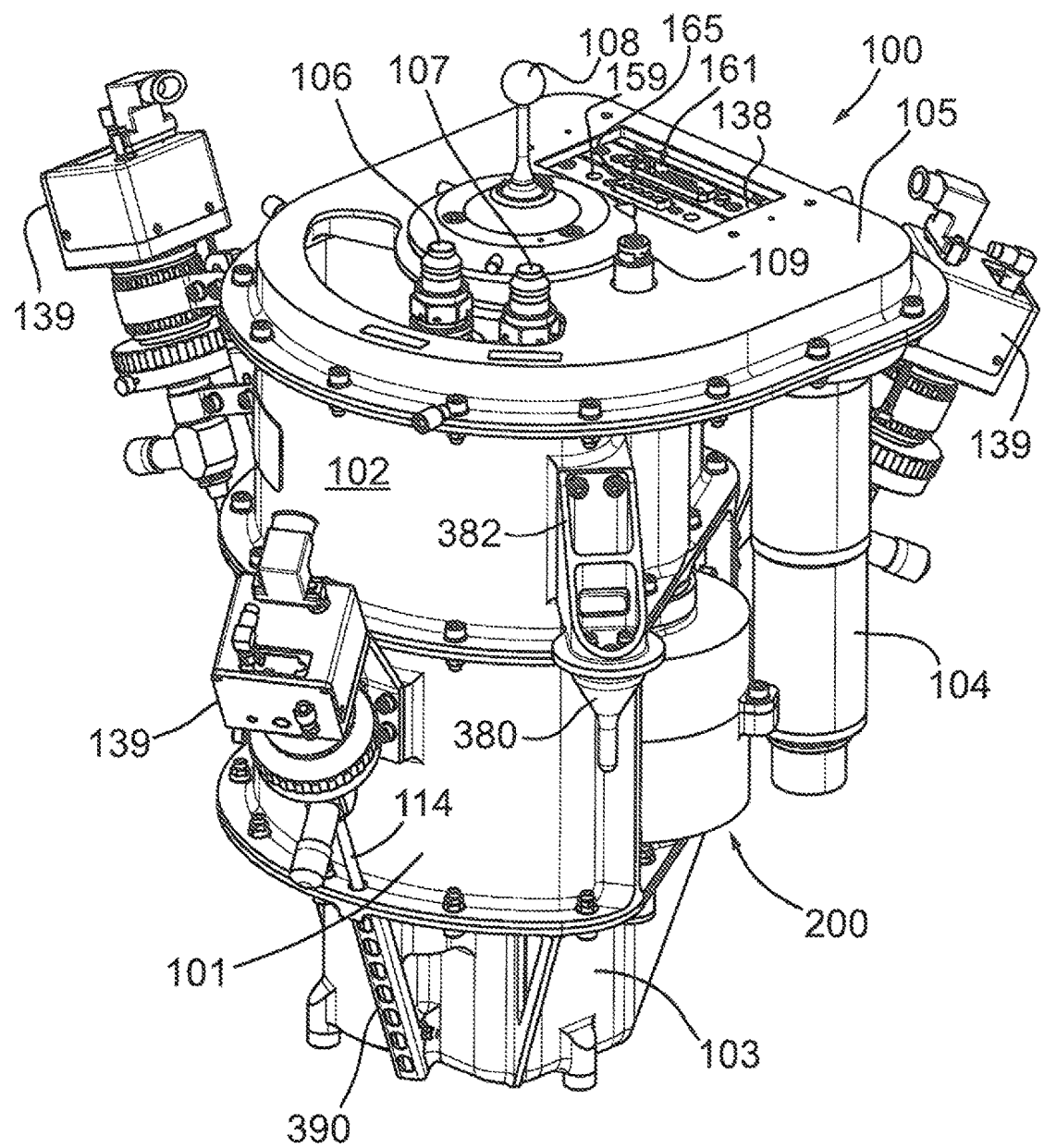
FIG. 1A is a perspective view of a refueling tool constructed in accordance with the present disclosure.
Figure 1B:
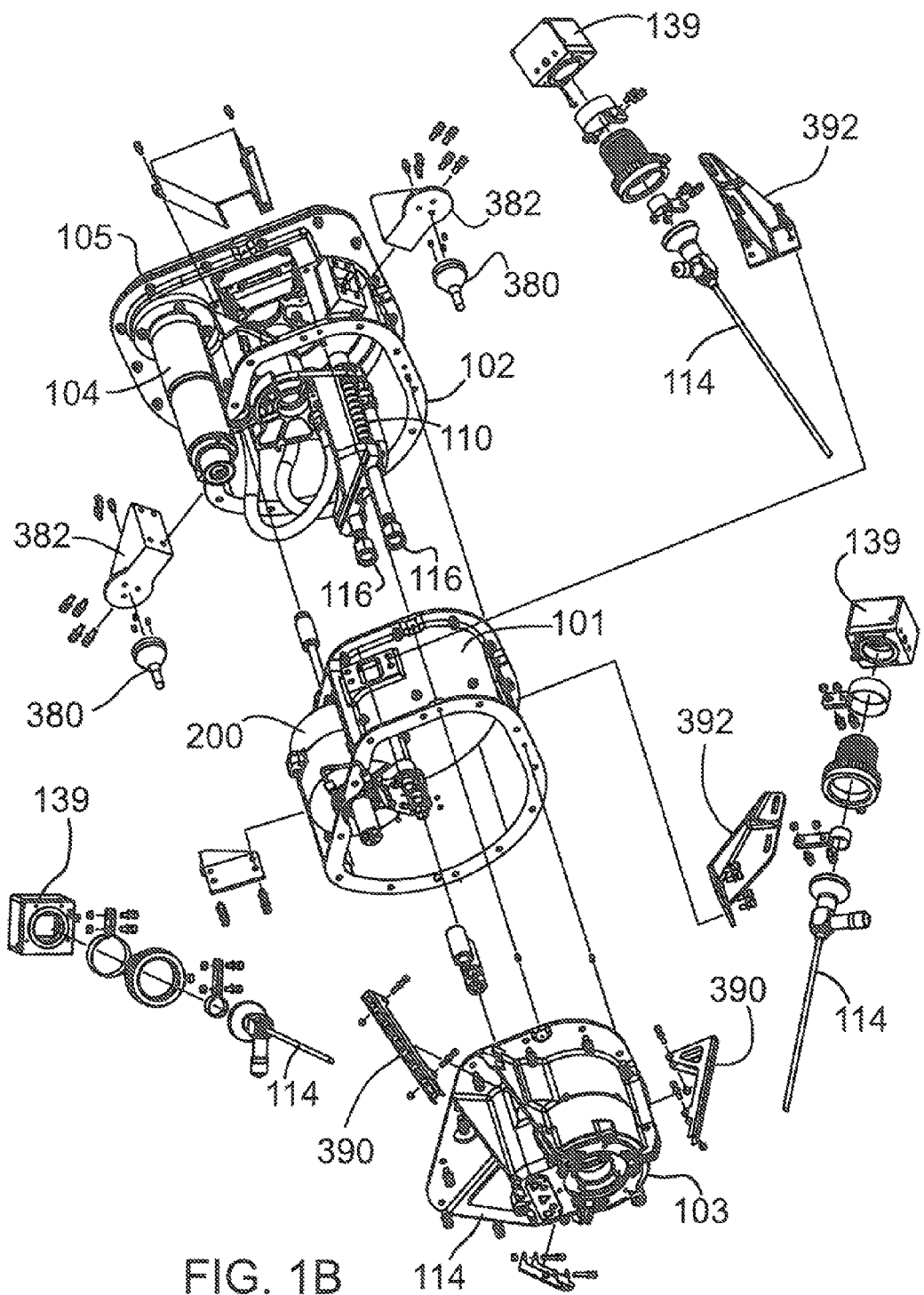
FIG. 1B is a disassembled view of the refueling tool of FIG. 1.

FIG. 1 is a perspective view of the tool for removing/replacing fill/drain valves on satellites shown generally at 100 constructed in accordance with the present disclosure. Tool 100 is comprised of a mid-housing section 101, an upper housing section 102 and a lower housing section 103. Lower housing section 103 encloses a cam wrench mechanism 300, not visible in FIG. 1 but shown in FIG. 13A and which comprises three cam wrench mechanisms which include: secondary seal fitting cam wrench 300A, valve actuation cam wrench 300B, and the torque reaction feature cam wrench 300C). A differential gearbox 200 is partially contained in mid-housing section 101. A motor 104 is mounted on the exterior of housing section 102. A housing cover 105 is bolted to upper housing section 102 and two propellant couplings 106 and 107 are located on cover 105. A grapple fixture 108 is mounted on housing cover 105 and is designed to be releasibly gripped by a robotic arm. Electrical connectors 161 and 165 are mounted on plates 138 and 159 respectively, FIG. 1B is a disassembled view of the refueling tool of FIG. 1 showing separately the upper housing section 102 containing a Fuel Oxidiser Exchanger 110 (also referred to as a fluid selection and coupling mechanism), the mid-housing section 101 containing the differential gearbox 200, the lower housing section 103 containing the cam wrench mechanism 300 (FIG. 13A) and a camera vision system which includes cameras 139 shown in FIG. 2 and discussed below and is configured to illuminate and view a bottom portion of the lower housing section 103 which is used to access a fill/drain valve on a client satellite, and optionally attach a backup fill/drain valve to the fuel valve(s) on the client satellite being resupplied with propellant.

Figure 2:
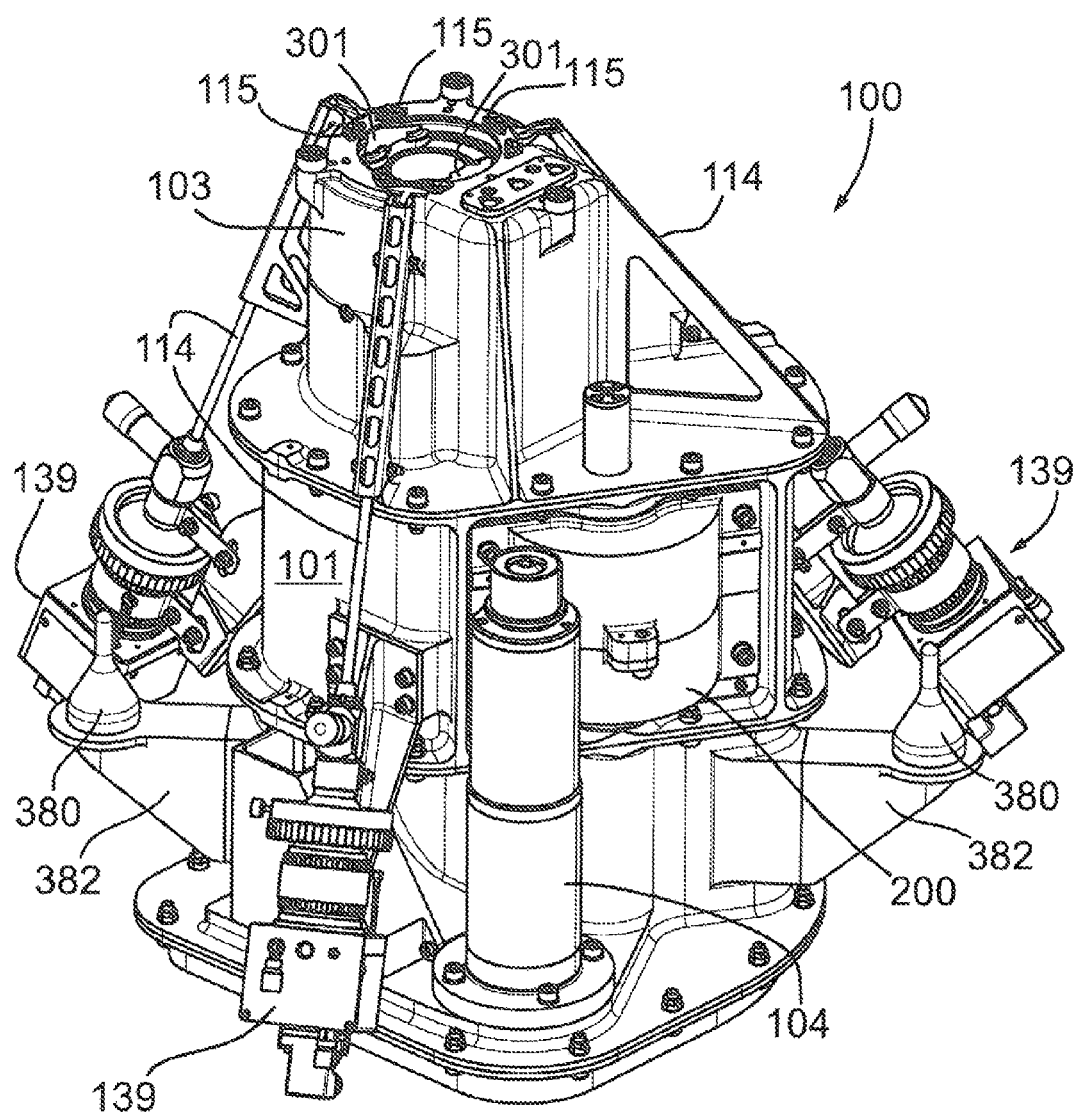
FIG. 2 is another perspective view of the tool of FIG. 1 upside down relative to the view shown in FIG. 1.

FIG. 2 shows the tool 100 of FIG. 1A but upside down to give a view from the bottom of the tool. Three tool cameras 139, are located at intervals of approximately 120 degrees around, and secured to the mid-housing section 101 with the cameras 139 mounted by brackets 392 (FIG. 3B) to mid-housing section 101. Each camera 139 is attached to optics 114 that permit the camera to look under the bottom of the tool 100. Illumination for the cameras is provided by three pairs of lights 115 located on the bottom face of the tool. The field of view of each camera 139 will capture the workspace of tool 100 as it engages the various fill-drain valves of the client satellite being refuelled which will allow a remote operator to see the entire operation of opening and closing, and attachment of the refueling hoses.

Figure 3A:
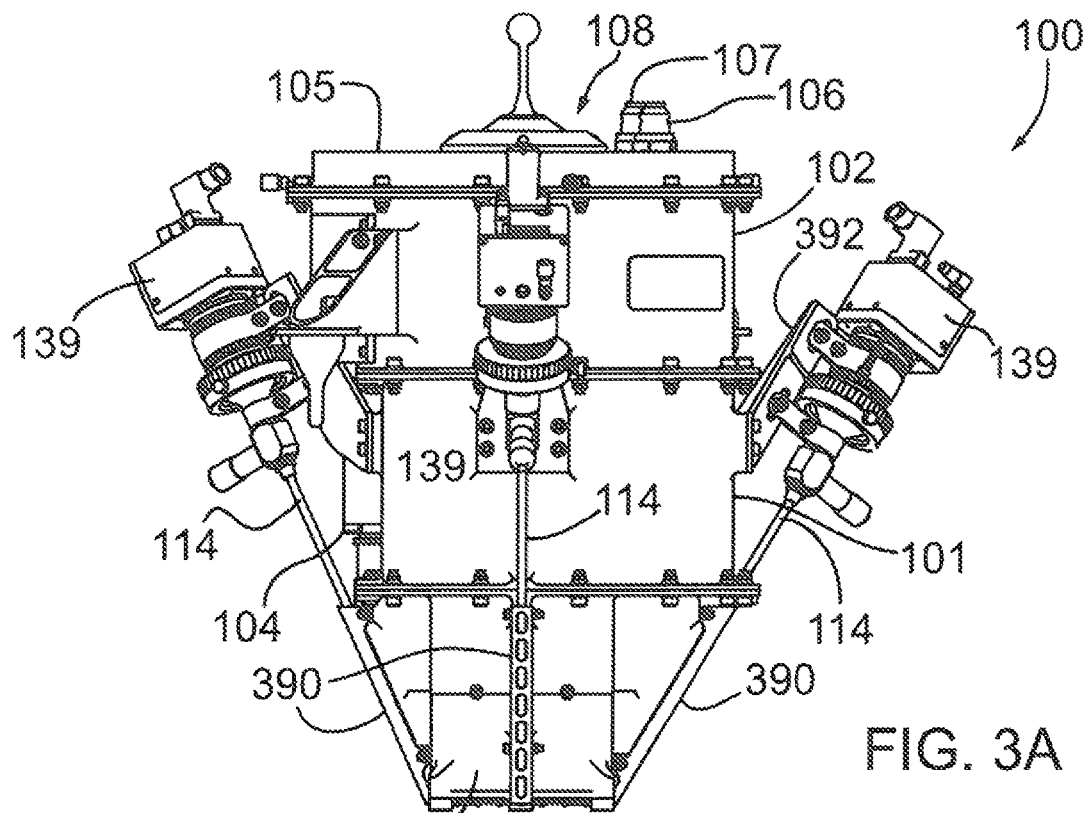
FIG. 3A shows a side elevation view of the upper housing of the refueling tool of FIG. 1.
Figure 3B:
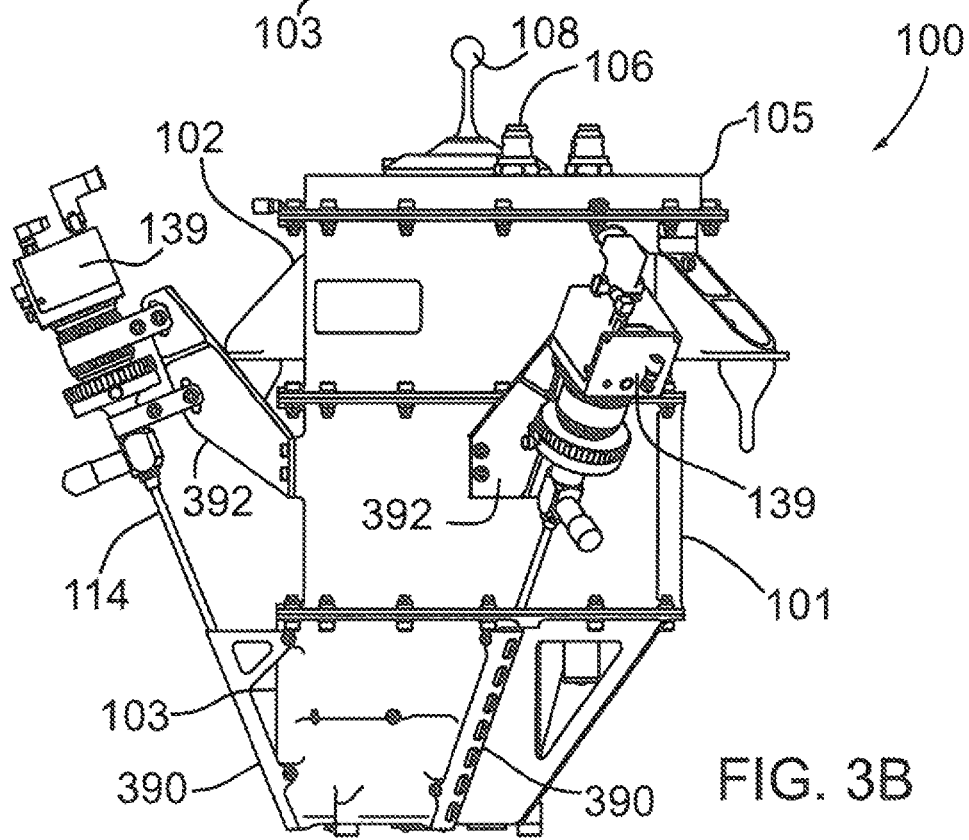
FIG. 3B shows a side elevation view of the upper housing of the refueling tool of FIG. 1 but opposite to that of FIG. 3A.

FIG. 3A is a vertical elevation of the tool 100 and FIG. 3B is another vertical elevation of the tool 100. The view in FIG. 3B is rotated 90 degrees counter clockwise about the vertical centreline of the tool.

Figure 4:
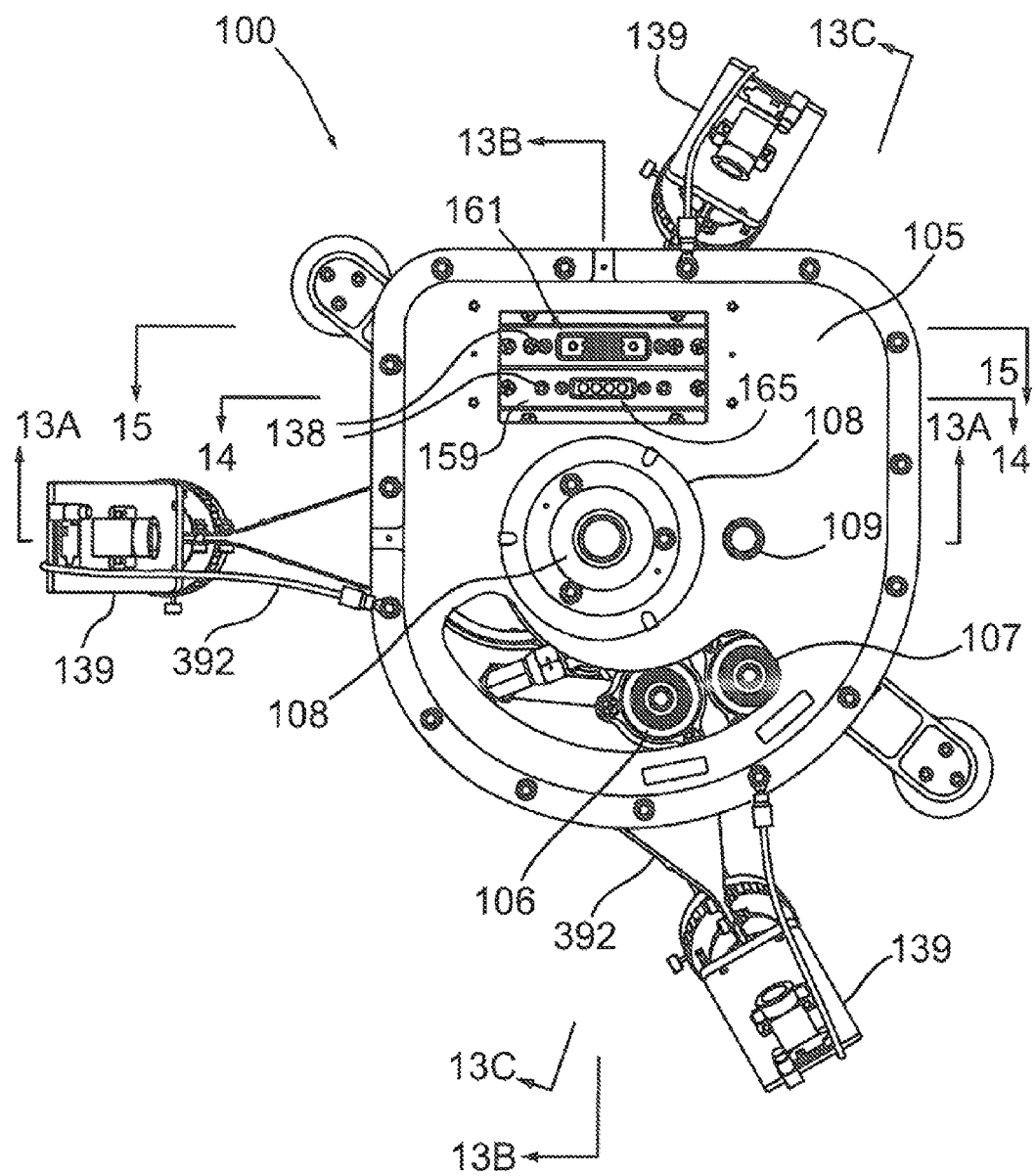
FIG. 4 shows a top view of the upper housing of the refueling tool with a vision system attached to the housing.

FIG. 4 is an overhead or top view of the tool 100 showing the two propellant couplings 106 and 107, the grapple fixture 108 and the electrical connectors 138 that receive electrical power from the robotic arm 403. Also seen in FIG. 4 is the vision system including the three (3) cameras 139 which use optical fibers 114 (FIGS. 3A and 3B) (or other light pipe configurations) to pass light received at the bottom of lower section 103 (where the cam wrench mechanism 300 (FIG. 13A) of refueling tool 100 engages the fill/drain valves 402 of the client satellite 401 being refuelled) back to the imager located within the body of camera 139.

Figure 5A:
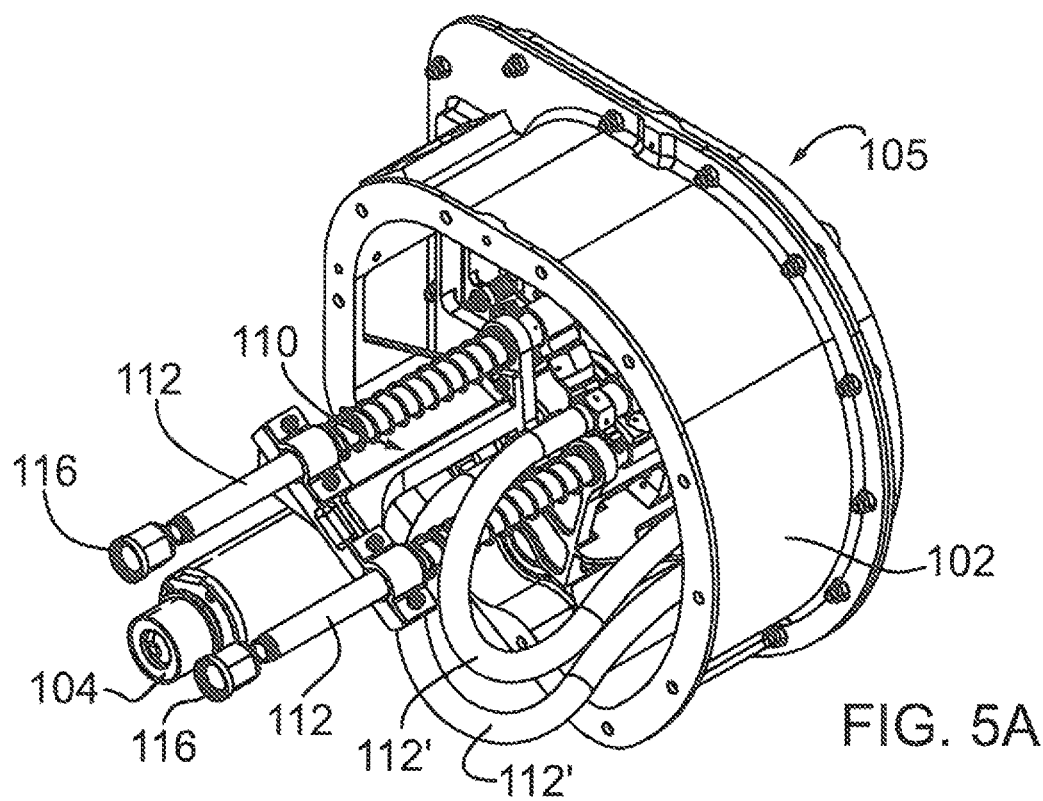
FIG. 5A shows an isometric view of the upper tool housing showing the internal fittings of the housing including fuel/oxidizer exchanger with the propellant hoses.
Figure 5B:
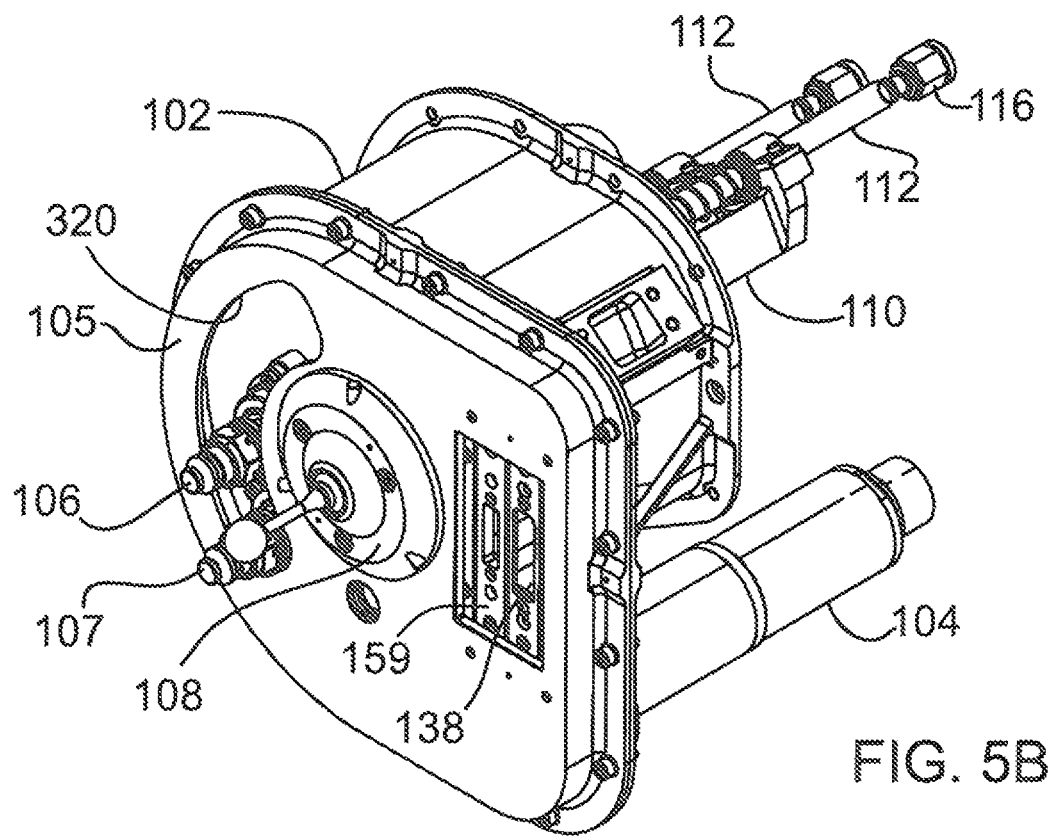
FIG. 5B shows an isometric view of the upper tool housing showing the external fittings of the housing including the grapple fixture and the electrical connections.
Figure 5C:
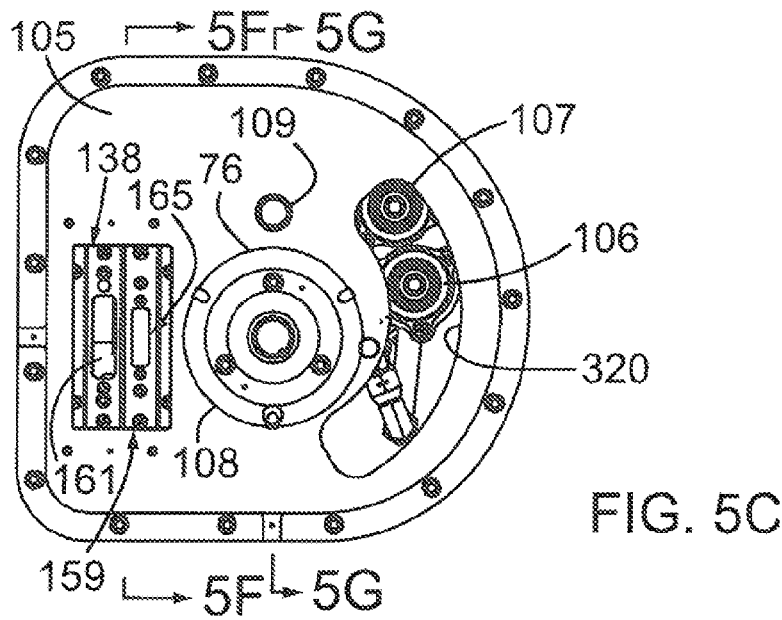
FIG. 5C shows a top view of similar to FIG. 4 absent the vision system.
Figure 5D:
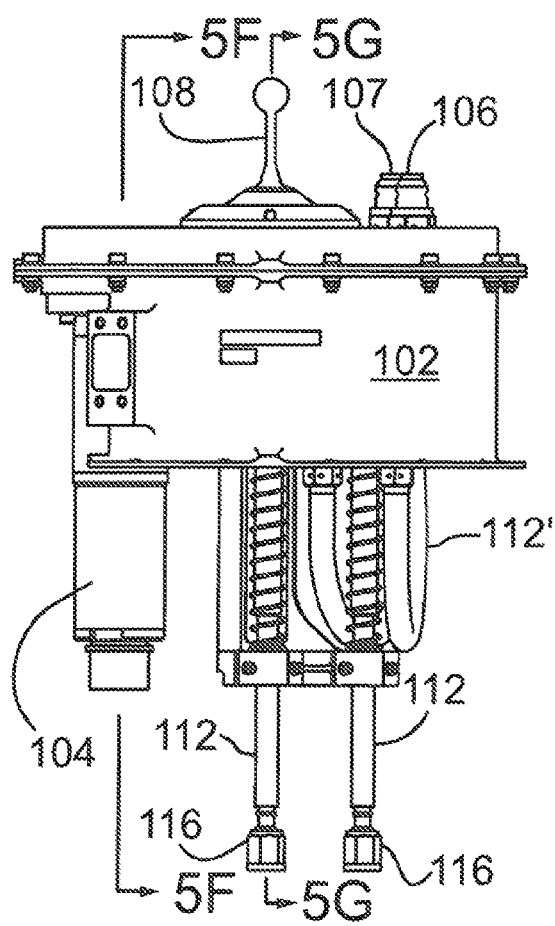
FIG. 5D is a side elevation view of upper tool housing section showing the Fuel Oxidiser Exchanger (FOE) assembly.
Figure 5E:
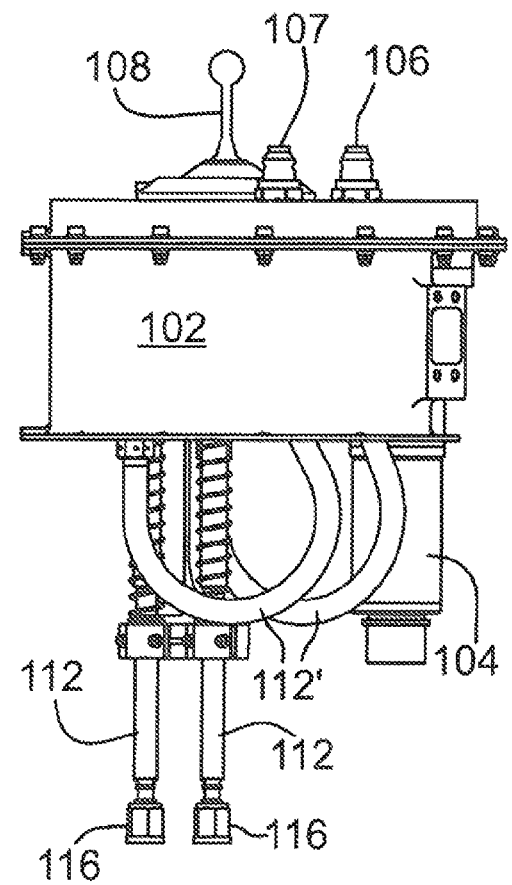
FIG. 5E is a side elevation view of upper tool housing section similar to FIG. 5D but rotated 90°.
Figure 5F:
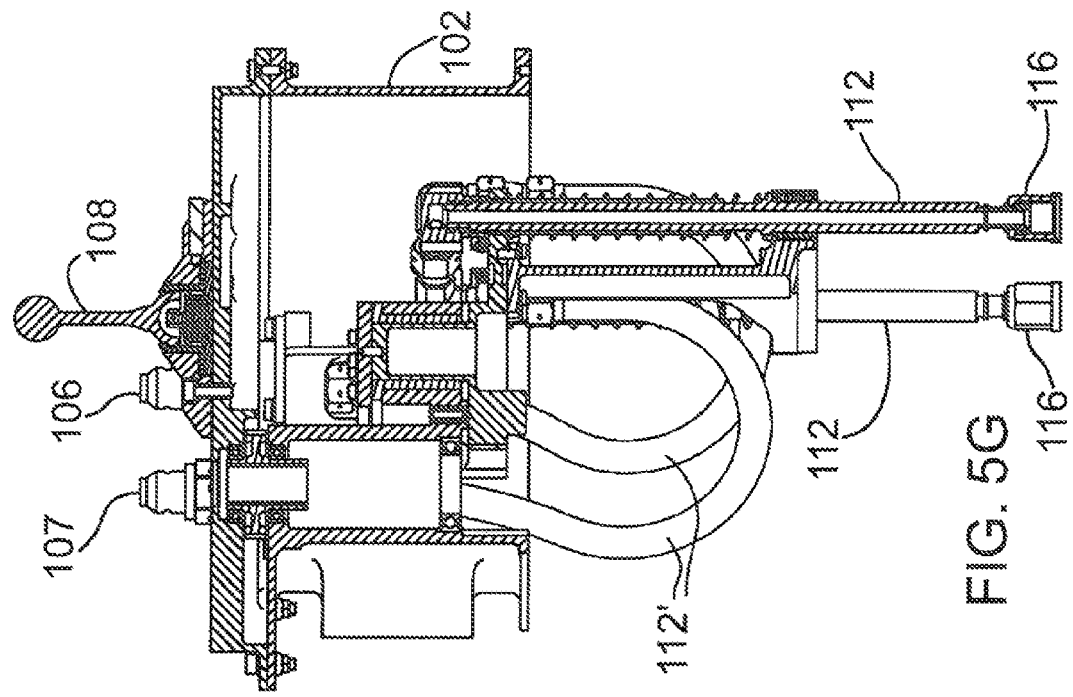
FIG. 5F is a cross section through line 5F-5F of FIG. 5C and line 5F-5F of FIG. 5D.
Figure 5G:
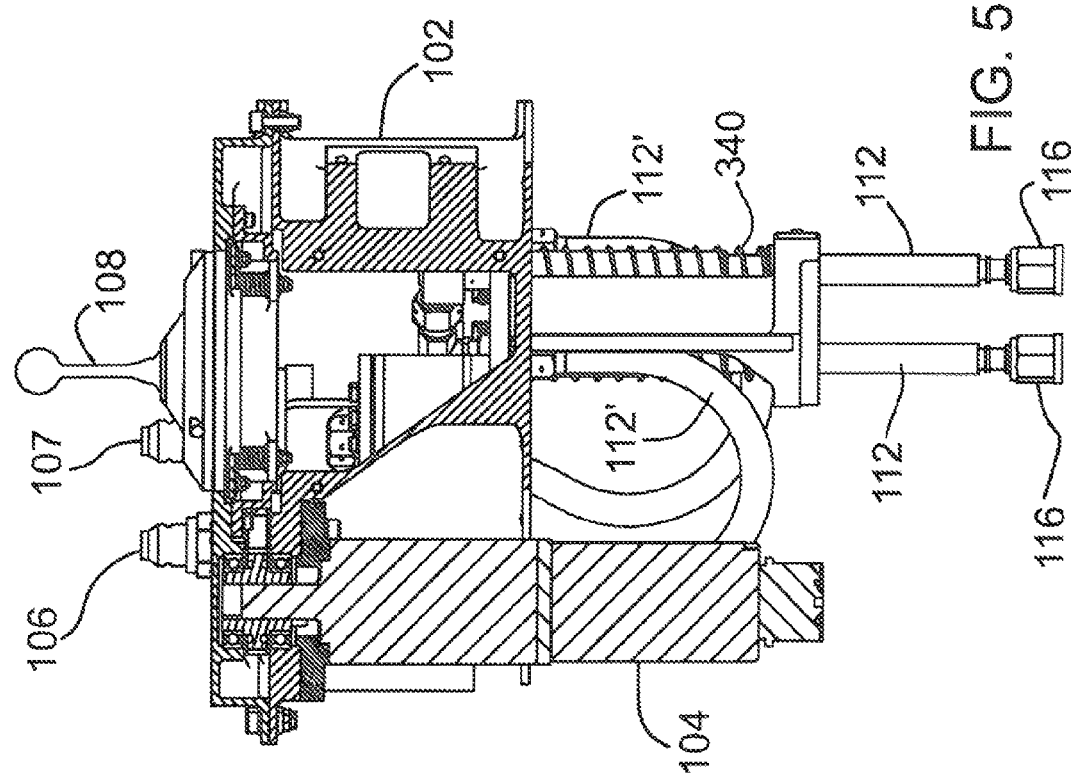
FIG. 5G is a cross section through line 5G-5G of FIG. 5C and line 5G-5G of FIG. 5D.

FIGS. 5A to 5I show various views of the upper housing section 102 and the various components housed therein. Specifically, FIG. 5A is an isometric view of the inside of upper housing section 102 showing details of a Fuel Oxidiser Exchanger (FOE) 110, the propellant delivery hoses 112 and the tips of the propellant delivery tubes 116. FIG. 5B is another isometric view of the upper housing section 102 but now reversed from the view of FIG. 5A showing exterior details of the upper housing section 102 and the top cover 105 including the grapple fixture 108, the propellant couplings 106 and 107 protruding through an arcurate slot 320 in top plate 105, and the electrical (power and data) connectors 138. FIG. 5C is a top view of the upper housing section 102 while FIGS. 5D and 5E show vertical elevation views, and the sections along lines 5F-5F and 5G-5G of both FIGS. 5C and 5D are shown in FIGS. 5F and 5G respectively.

Figure 5H:
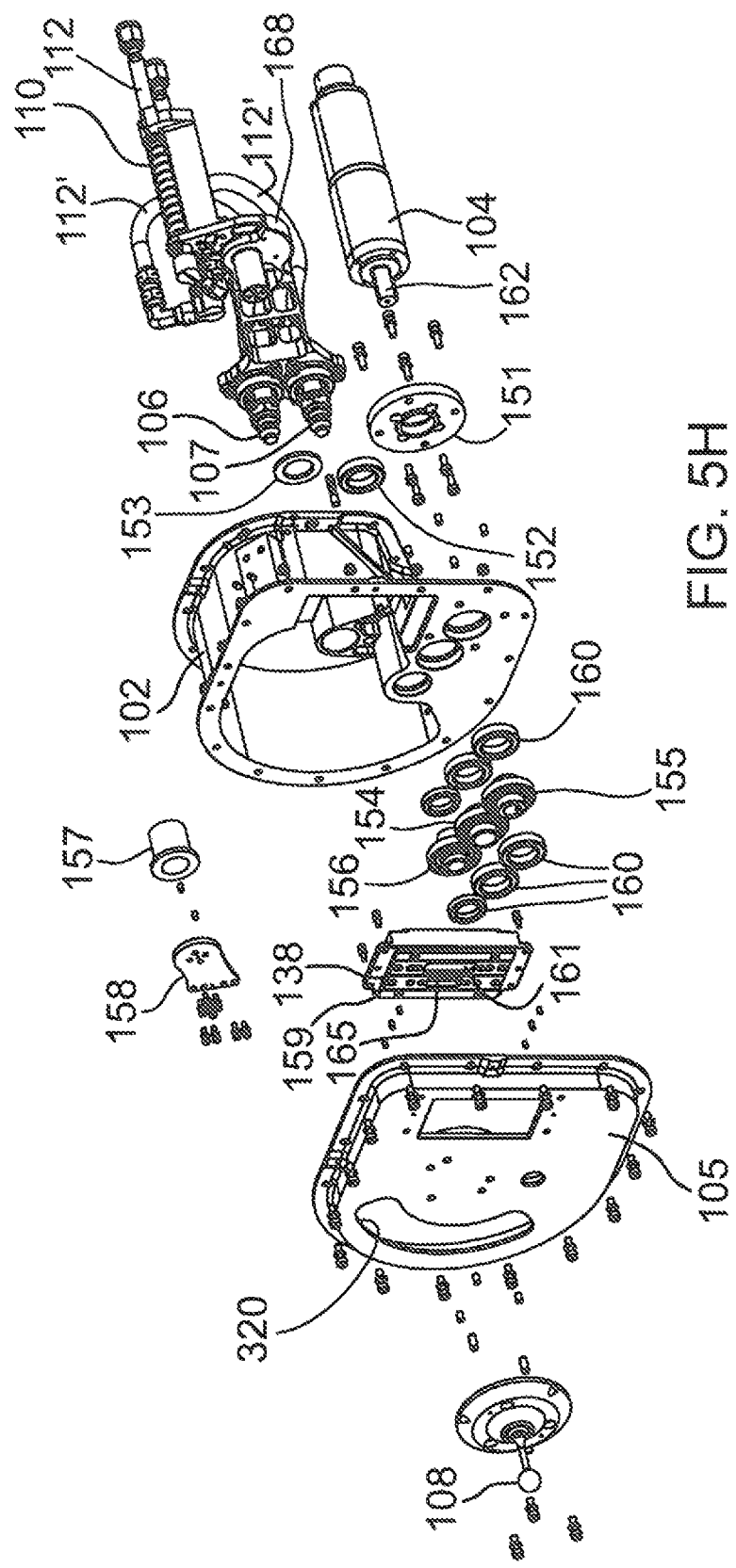
FIG. 5H is a disassembled view of the upper tool housing section containing the fuel oxidizer exchanger (FOE).
Figure 5I:
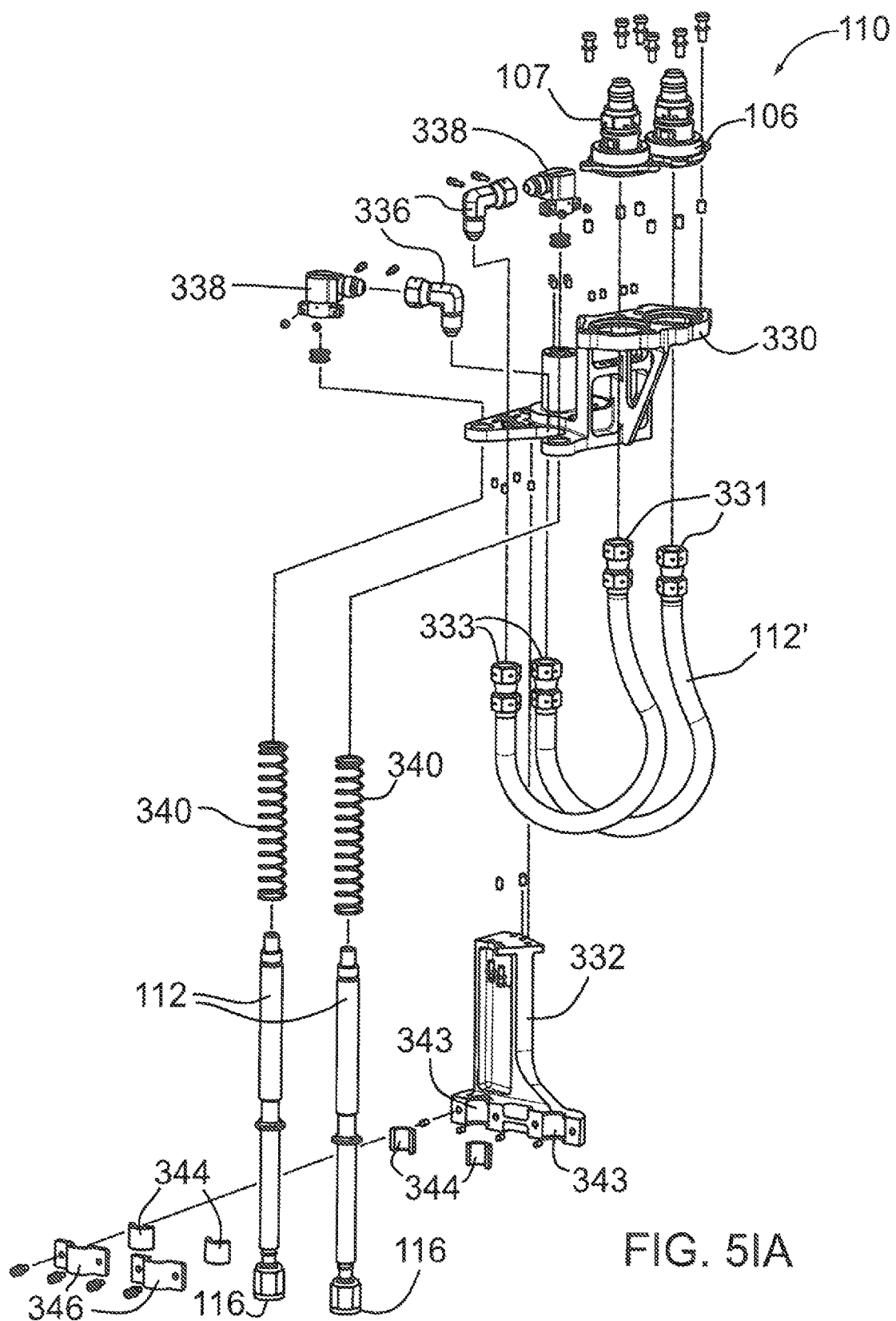
FIG. 5IA is a disassembled view of a fuel oxidizer exchanger (FOE) subsystem forming part of the present refueling tool.
Figure 5I:
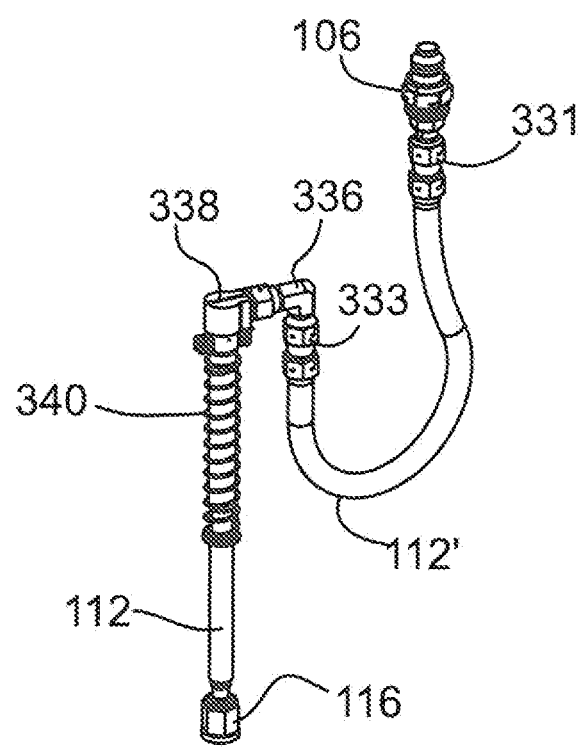

FIG. 5IA shows a disassembled view of the Fuel Oxidiser Exchanger (FOE) 110. FOE 110 includes a mounting bracket 330 to which propellant couplings 106 and 107 are bolted. The two (2) propellant delivery hoses 112/112' are shown having two sections, a flexible section 112' which is connected to fitting 331 and a rigid pipe section 112. The rigid section 112 is coupled to the flexible section 112' by elbow joints 336 and fittings 338. A spring 340 is located around the outside of rigid section 112. One end of each of the two (2) flexible hose sections 112' are attached to fittings 331 which are mated in turn to associated fittings (not shown) on the bottom of propellant couplings 106 and 107 which are bolted to mounting bracket 330. The other ends of the flexible hose sections 112' are attached to fittings 333 which are coupled to associated elbow joints 336. The elbow joints 336 are mated to associated fittings 338, and first ends of the rigid pipe sections 112 are each connected to one of the fittings 338.

FIG. 5IB shows one of the propellant delivery hoses 112/112' fully assembled with the spring 340 on rigid pipe section 112, one end of which is connected to coupling 338 which is coupled to elbow joint 336 connected to one end of the flexible hose section 112', and the other end of hose section 112' being connected to propellant coupling 106.

Referring again to FIG. 5IA, a bracket 332 is bolted to the mounting bracket 330 and includes features 343 configured to receive the rigid pipe sections 112 which are held in place such that they are free to move vertically against bracket 330 by bushings 344 and brackets 346. In operation, as the FOE 110 is being coupled (and decoupled) to (from) the client satellite being refuelled, (by couplings 116 being connected to associated fill/drain valves on the client satellite), the rigid pipe sections 112 slide up (and down) in bracket 332 facilitated by the bushings 344 which are retained in bracket 332.

FIG. 5H is a disassembled view of the upper tool housing section 102 which houses the motor 104, electrical (power and data) connectors 138 and the fuel oxidizer exchanger (FOE) subsystem 110, shown assembled in this Figure. Motor 104 includes a motor shaft 162 which passes through the motor mounting plate 151 which in turn is bolted to the housing section 102. Motor shaft 162 is secured to a motor output gear 155. The motor output gear 155 transmits the motor torque through an idler gear 154 to a gear shifter input gear 156. These three gears 155, 154 and 156 are secured in the upper tool housing section 102 by bearings 160. The fuel oxidiser exchanger. 110 rotates within the upper tool housing 102 on journal bearing sleeve 157 and ball bearing 152. Ball bearing 152 is retained in housing 102 by retaining ring 153. Journal sleeve bearing 157 is retained in housing 102 by support plate 158.

Figure 6A:
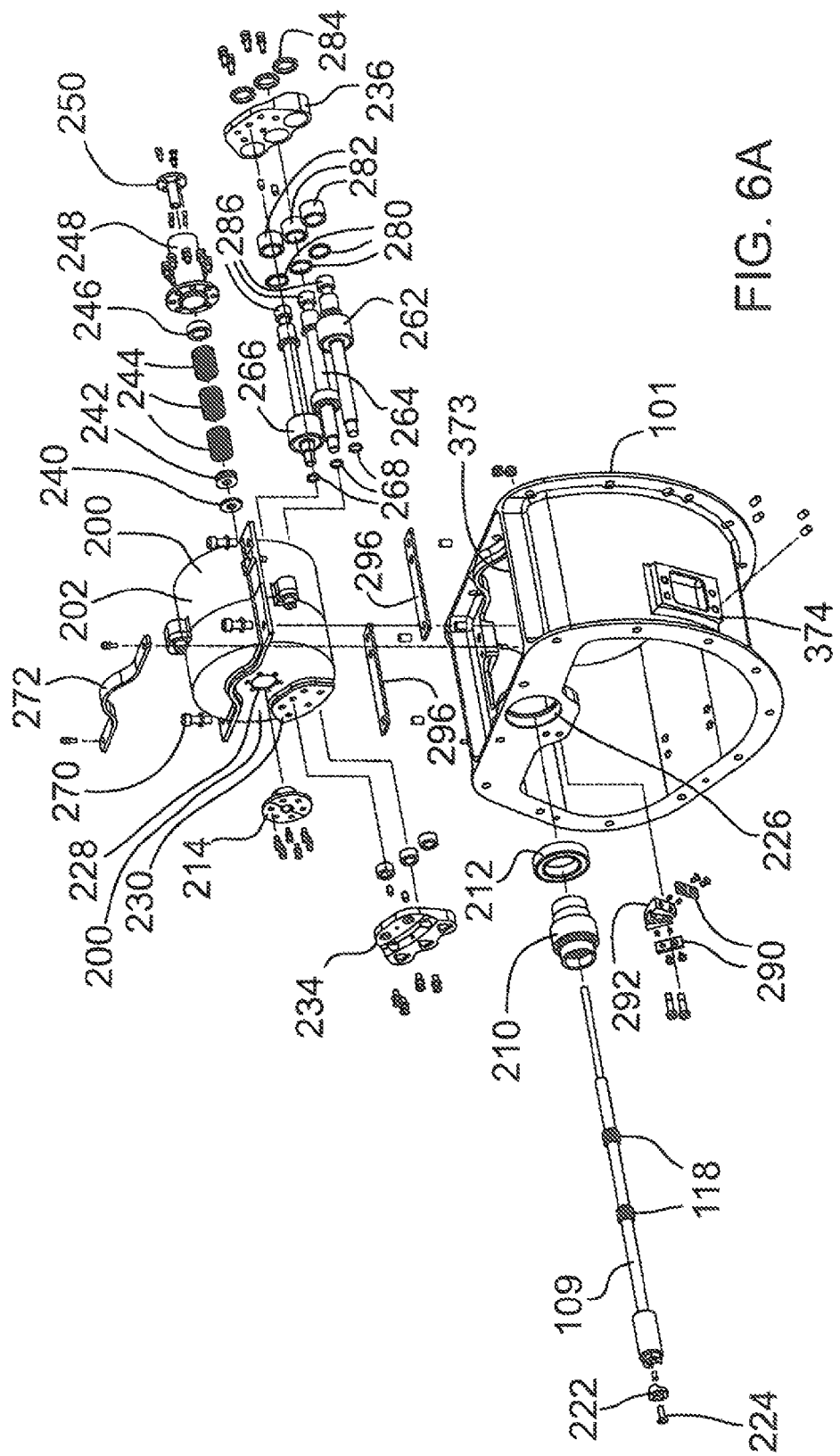
FIG. 6A is a disassembled view of a mid housing section of the refueling tool which houses a differential gearbox.
Figure 6B:
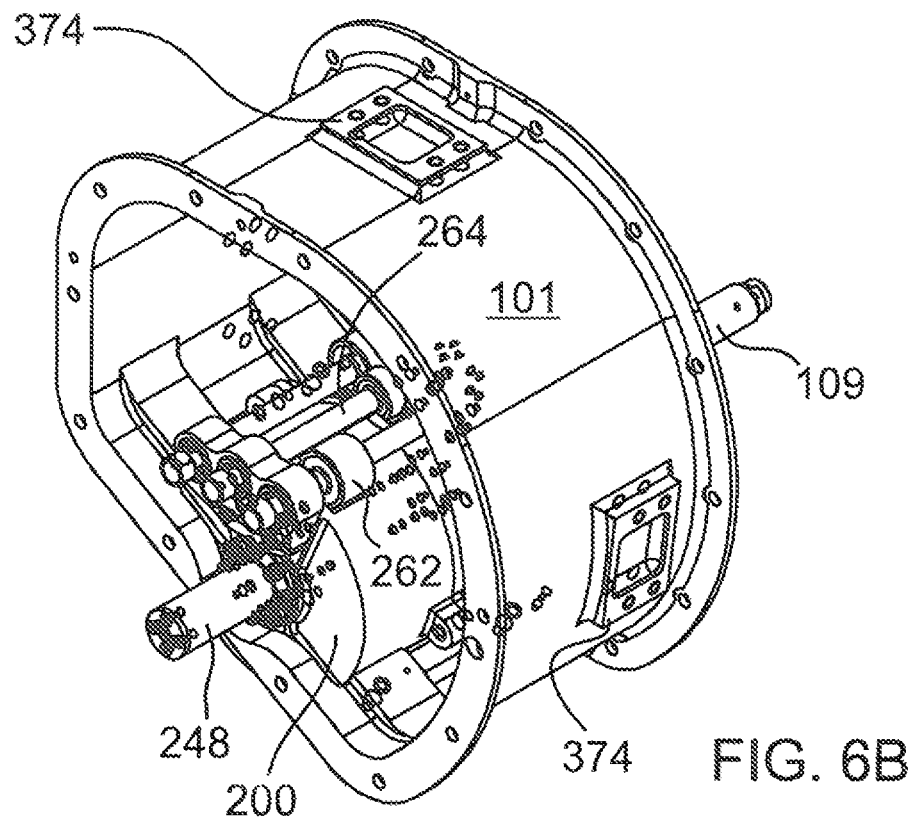
FIG. 6B shows an isometric view of the assembled refueling tool mid housing section showing internal components including a motor shaft used to drive the differential gearbox.
Figure 6C:
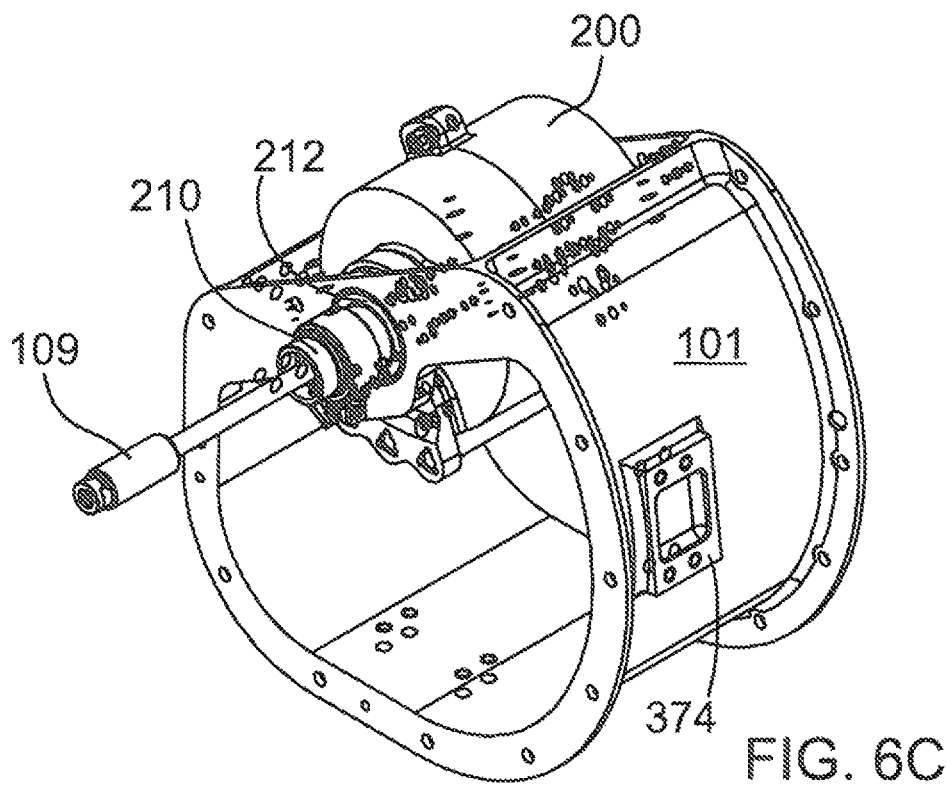
FIG. 6C shows an isometric view of the assembled tool mid housing section, flipped over compared to the view of FIG. 6B, showing the motor shaft engaged in the differential gearbox.
Figure 6D:
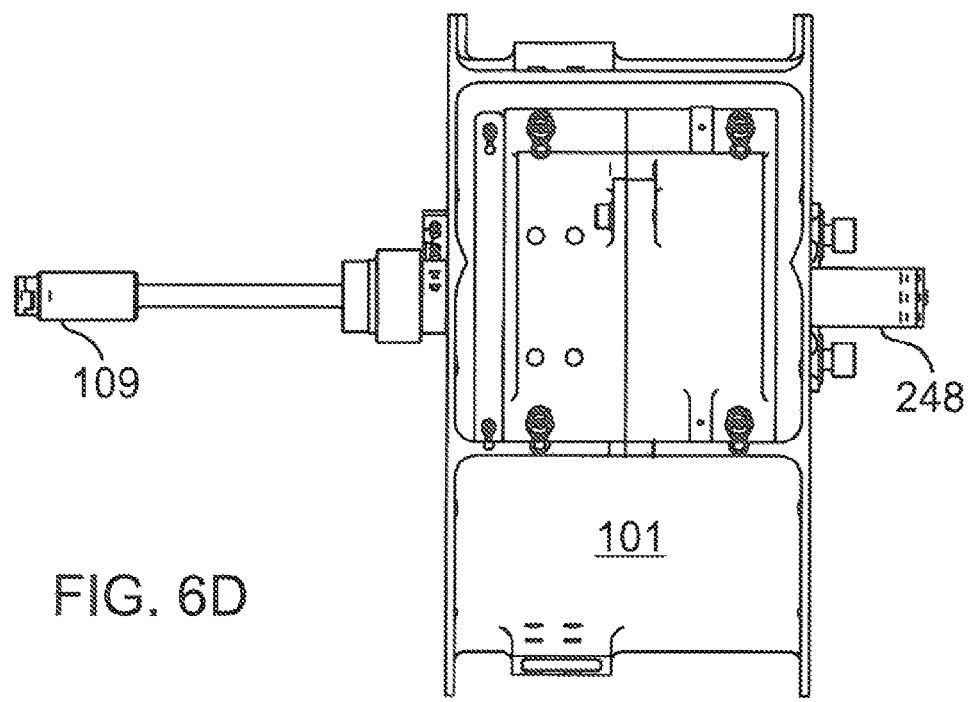
FIG. 6D shows a side elevation view of the tool mid housing section showing the Gearbox assembly installed in the housing.
Figure 6E:
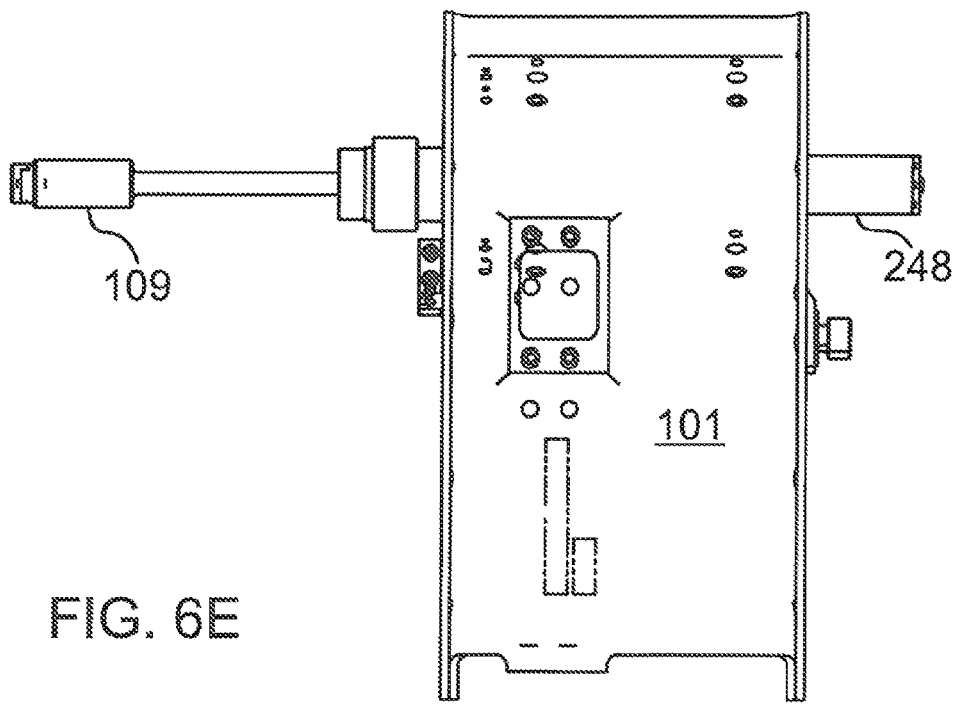
FIG. 6E shows a side elevation view of the tool mid housing section similar to FIG. 6D but rotated 90°.
Figure 6F:
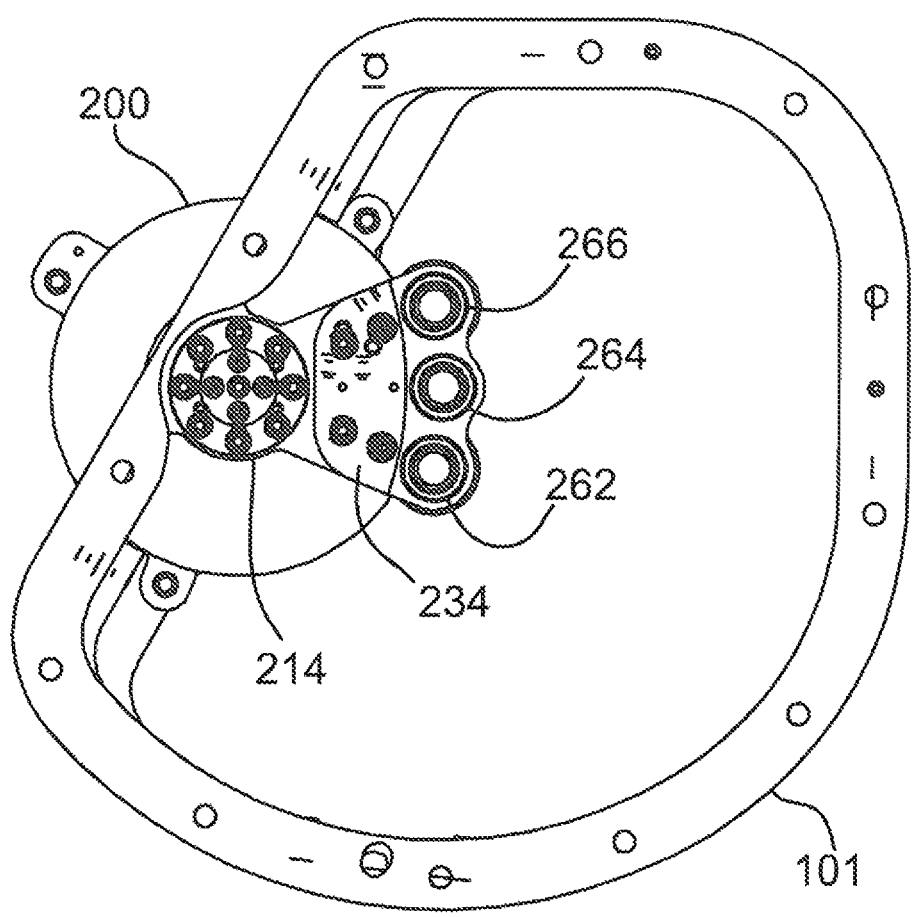
FIG. 6F shows a top view of the mid housing section showing the arrangement of the installed gearbox and cam wrench drive shafts.
Figure 6G:
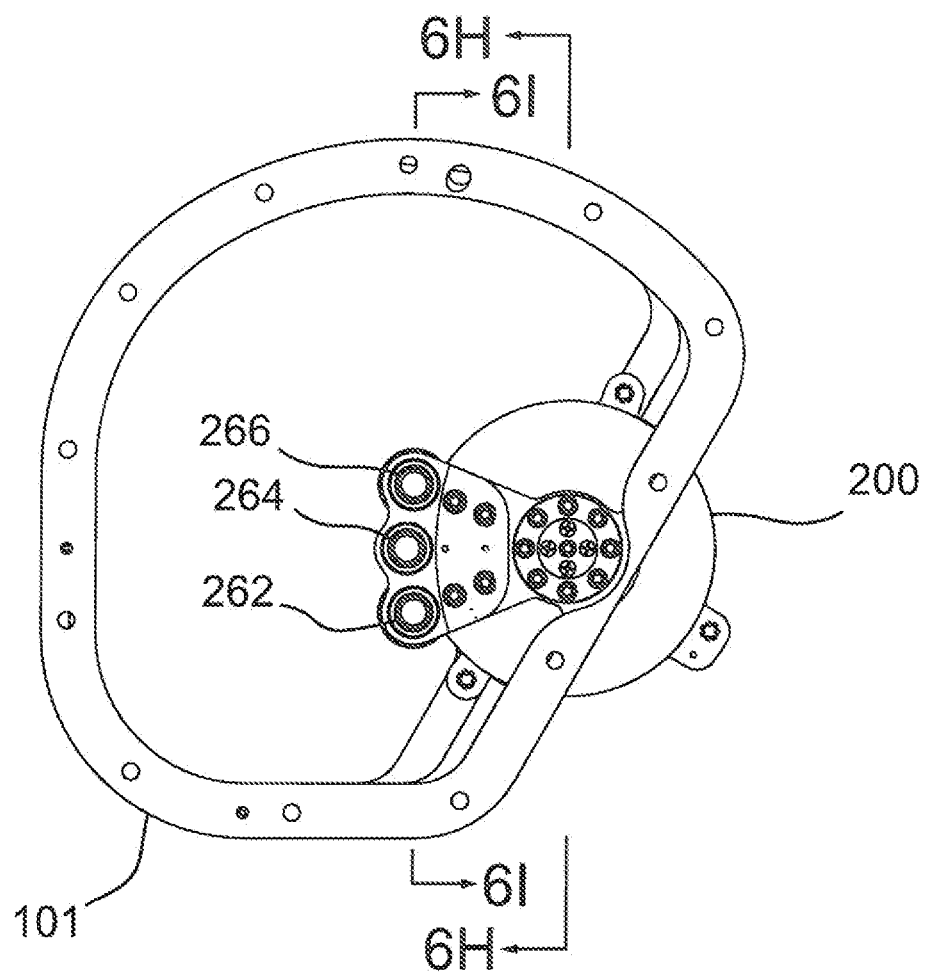
FIG. 6G is a top view of the mid housing section.
Figure 6H:
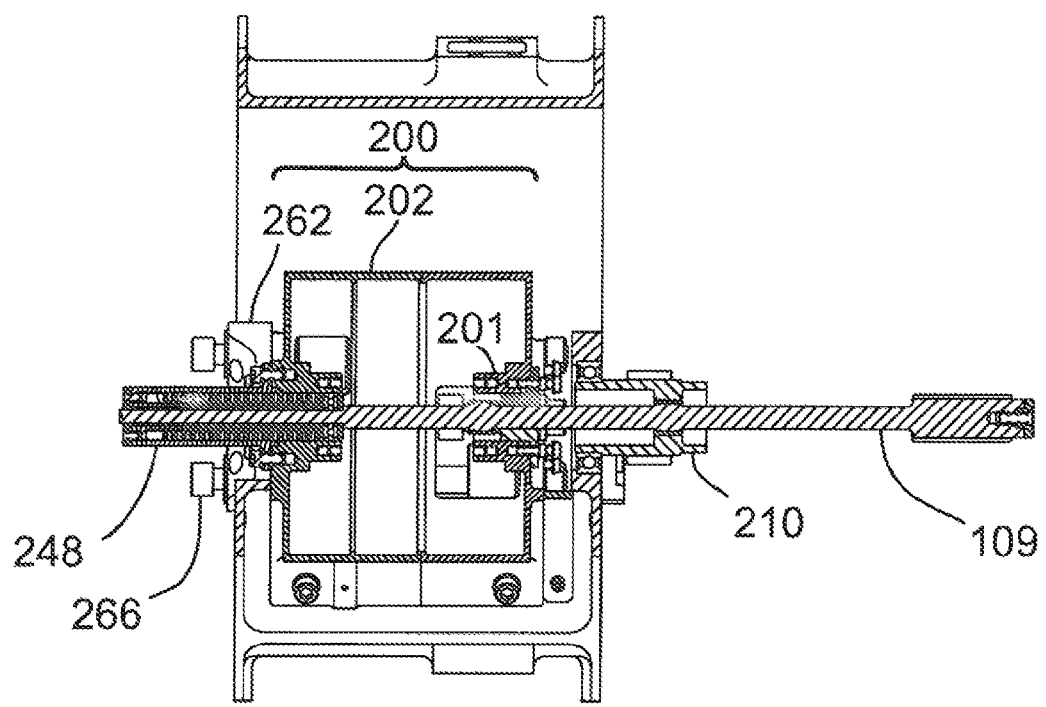
FIG. 6H is a view along line 6H-6H of FIG. 6G.
Figure 6I:
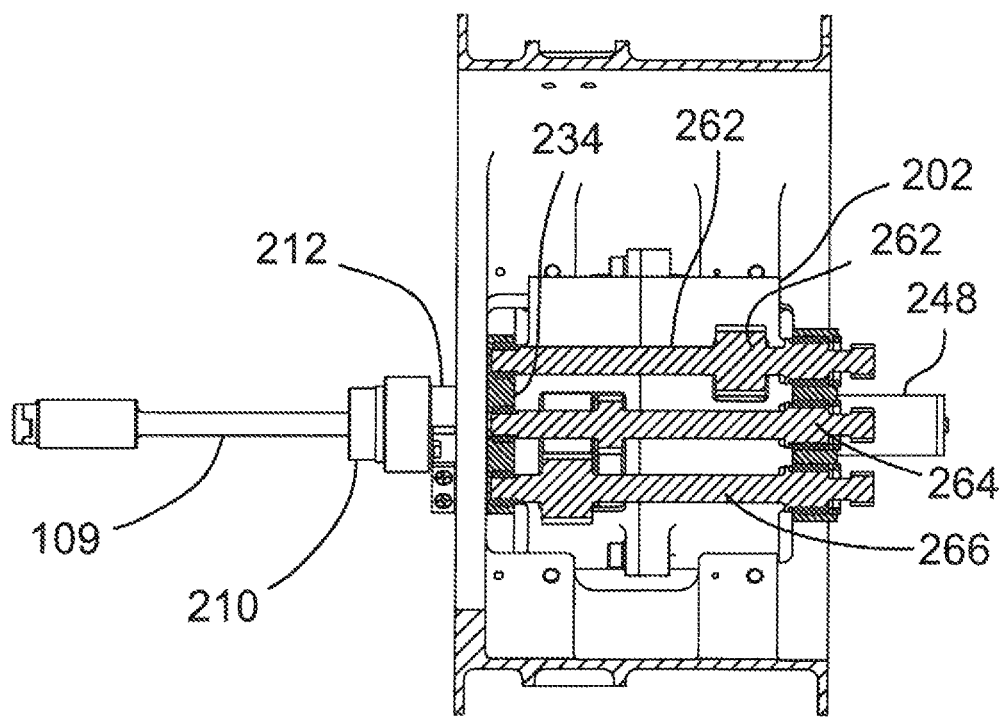
FIG. 6I is a view along line 6I-6I of FIG. 6G.

FIG. 6A shows a disassembled view of the mid-housing section 101 and the assembled gearbox assembly 200 showing that housing section 101 includes a cut-out section 373 of sufficient size to receive therein the differential gearbox assembly 200. FIG. 6B shows an isometric view of the assembled refueling tool mid housing section 101 showing the assembled differential gearbox 200 mounted thereto while FIG. 6C shows an isometric view of the assembled tool mid housing section and gearbox assembly 200, flipped over compared to the view of FIG. 6B.

Referring to FIG. 6A, three bracket mounts 374 (two of which are visible in FIG. 6B) are integral to the mid housing section 101 and provide attachment sites to which the three cameras 139 (FIG. 1) of the vision system are bolted. The structure of the gear box assembly 200 is as follows. Shaft 109 is a spline shaft with two spaced toothed drive gears or pinions 118 midway down the shaft and one end of spline shaft 109 is terminated by a spline shaft nose 222 and a screw 224 for retaining nose 222 to the this end of shaft 109. Spline shaft 109 goes through a switching gear 210 on which a ball bearing 212 is circumferentially mounted. Bearing 212 is positioned within hole 226 located in mid housing section 101. Gear box assembly 200 includes two (2) housing sections 201 and 202 and a split bushing 214 bolted to the housing 201 of gear box 200 over the central aperture 228 through which spline shaft 109 is positioned when assembled. An upper support bracket 234 is bolted to a raised pad 230 on one end wall of housing 201 of the gearbox assembly 200 and a lower support bracket 236 is bolted to the opposing end wall onto a raised pad (not shown) on housing 202 similar to pad 230. Spline shaft 109 extends through split bushing 214 and through differential gear box housings 201 and 202 and through a spring washer 240, a thrust bearing 242, three (3) springs 244, a spring spacer 246 and into a spring housing 248 with the other end of the shaft 109 located in shaft bushing 250 which is secured to spring housing 248.

A first output gear 262, a reaction gear 264 and a second output gear 266 have ends supported by upper and lower support brackets 234 and 236 respectively. The ends of the shafts supported by upper support bracket 234 go through thrust washers 268 while the ends supported by lower support bracket 236 each go through a shaft spacer 280, a bushing 282 and thrust washers 284. Hard stops 290 are bolted to hard stop bracket 292 which in turn is bolted to mid housing 101 as shown in FIG. 6A. Gearbox assembly 200 is bolted to midsection housing 101 by means of several socket head bolts 270 and gearbox shims 296. An assembly gap is closed with a cover 272.

FIGS. 6D to 6I show different views of the assembled mid housing section 101 with the gearbox assembly 200 incorporated therewith.

Figure 8:
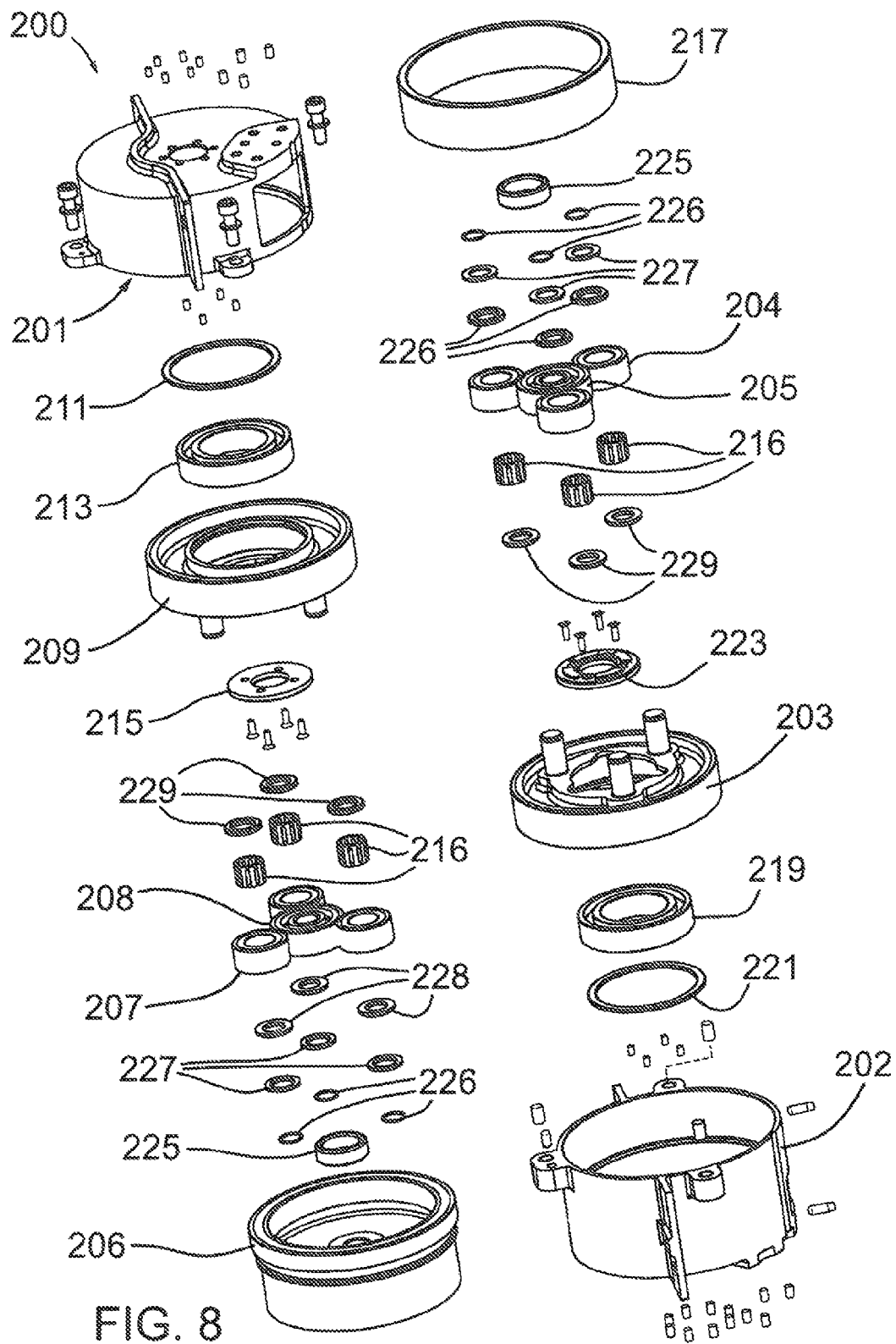
FIG. 8 is an exploded view of a gearbox forming part of the tool drive train.

FIG. 8 is an exploded view of the gearbox 200. It shows the upper gearbox housing 201 and lower gearbox housing 202 plus the valve actuation planet carrier gear 203, the valve actuation planet gears 204 (three of them), the valve actuation sun gear 205, the ring gear 206, the secondary seal fitting sun gear 208, the secondary seal fitting planet gear 207 and the secondary seal fitting planet carrier gear 209, first and second bearing retainers 223 and 215, a reaction bushing 217, first and second sets of three (3) needle roller bearings 216, first and second sun gear spacers 225, two retaining spiral rings 211 and 221, first and second deep groove, single row ball bearings 213 and 219, two (2) sets of three retaining rings 226, two sets of three (3) planet washers 227, two sets of three (3) thrust washers 228 and two sets of three (3) thrust washers 229.

Figure 7:
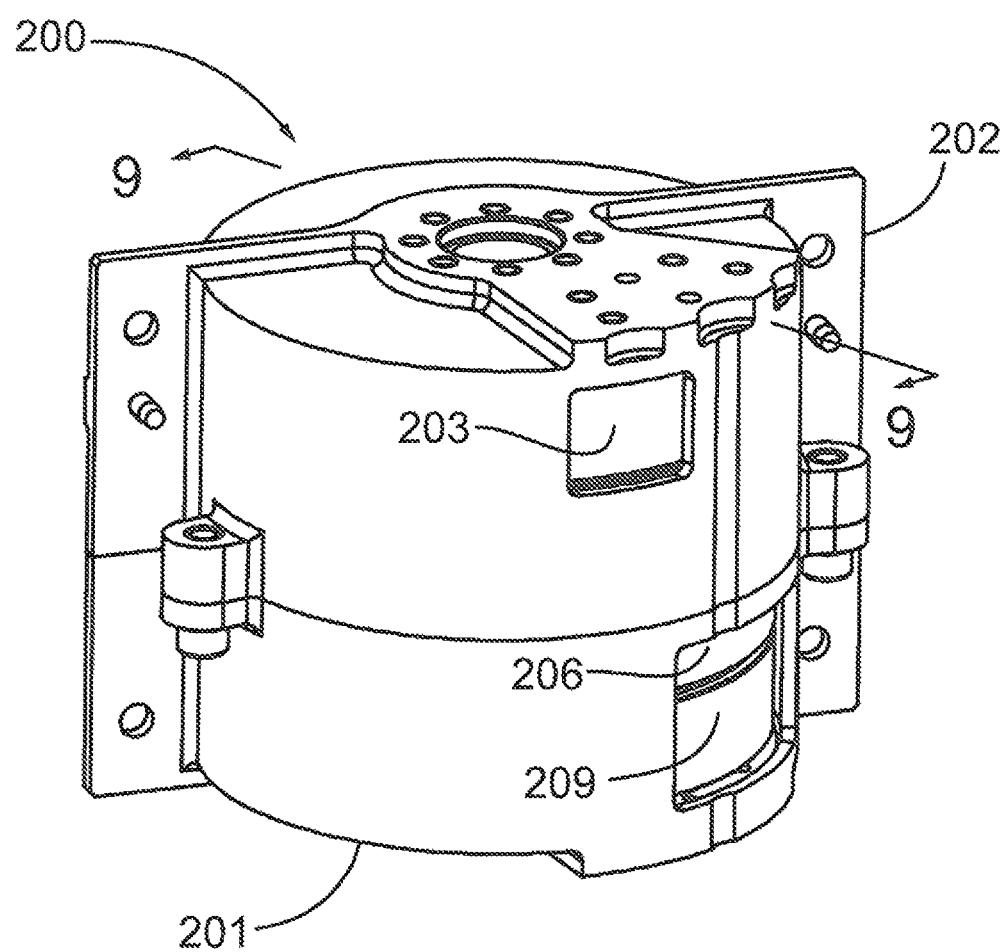
FIG. 7 shows an assembled, external view of a differential gearbox of the present disclosure.
Figure 9:
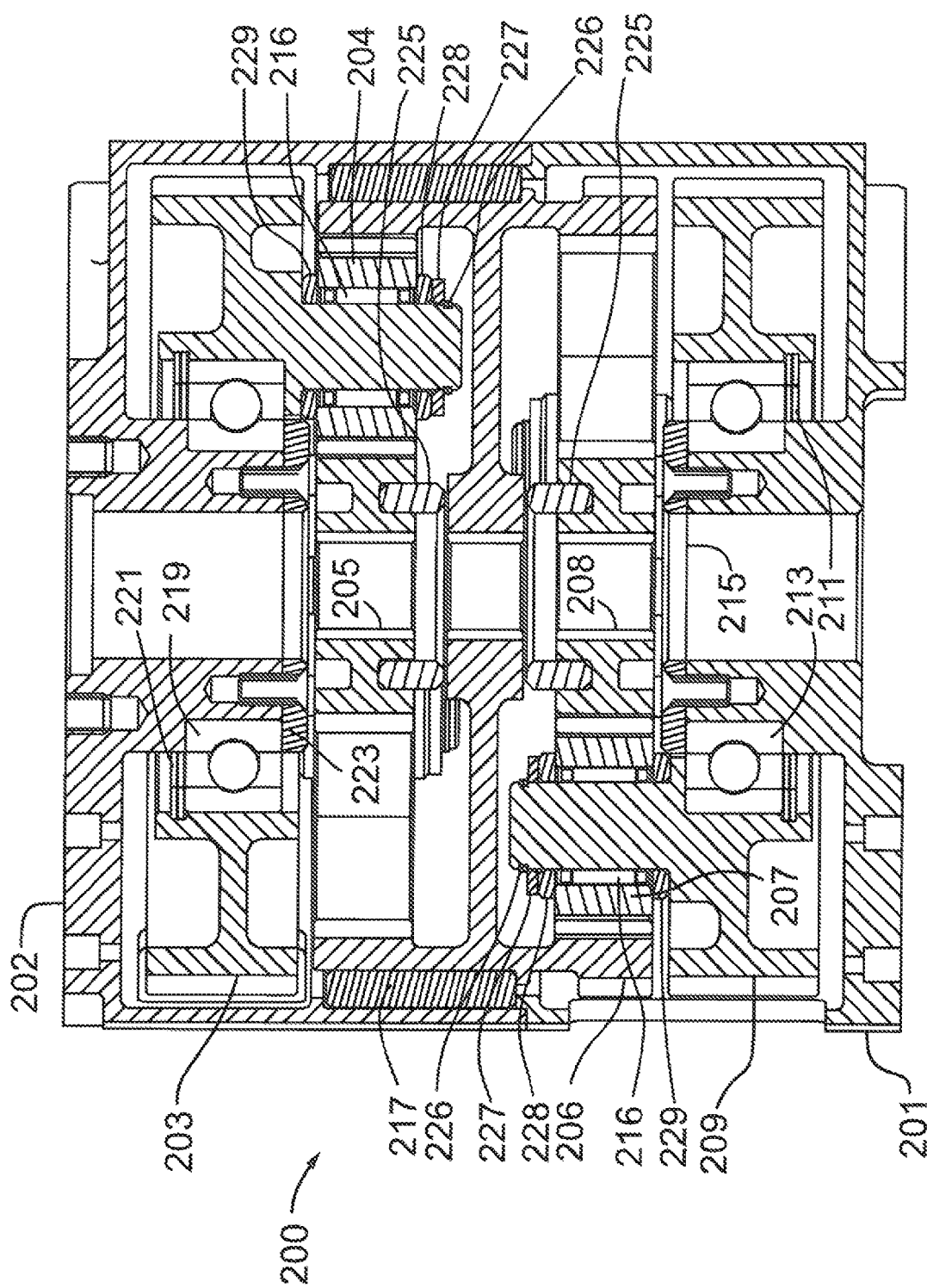
FIG. 9 is a cross section through the gearbox of FIG. 7 taken along the line 9-9.

FIG. 7 shows an external view of the gearbox 200 showing the valve actuation carrier gear 203, the ring gear 206, and the secondary seal fitting carrier gear 209. FIG. 9 is a cross section through the assembled gearbox 200 along line 9-9 of FIG. 7 showing the alignment of the disassembled components of FIG. 8 in the assembled gearbox 200.

Figure 10:
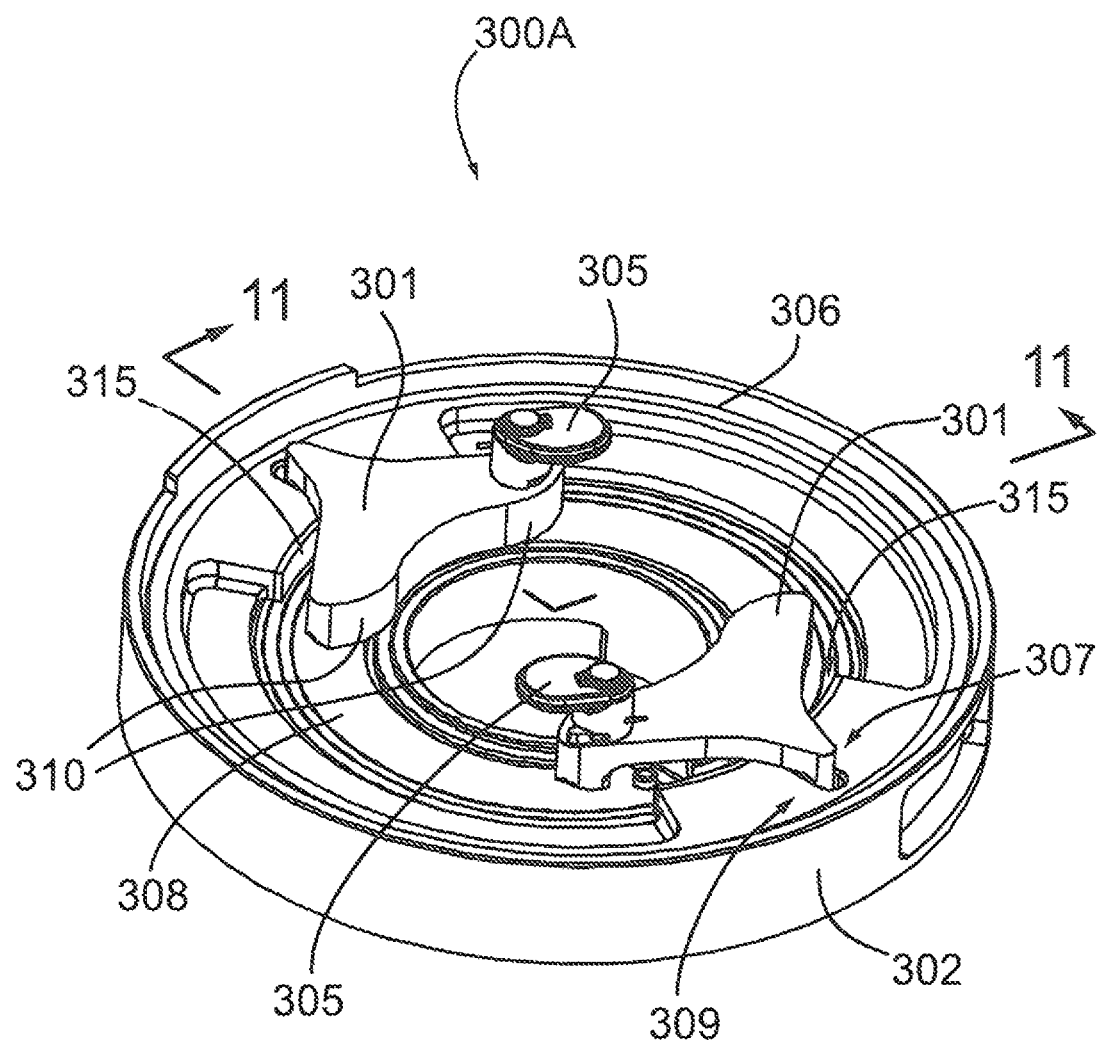
FIG. 10 is an isometric view of the interior of a cam wrench mechanism 300A forming part of the refueling tool.
Figure 11:
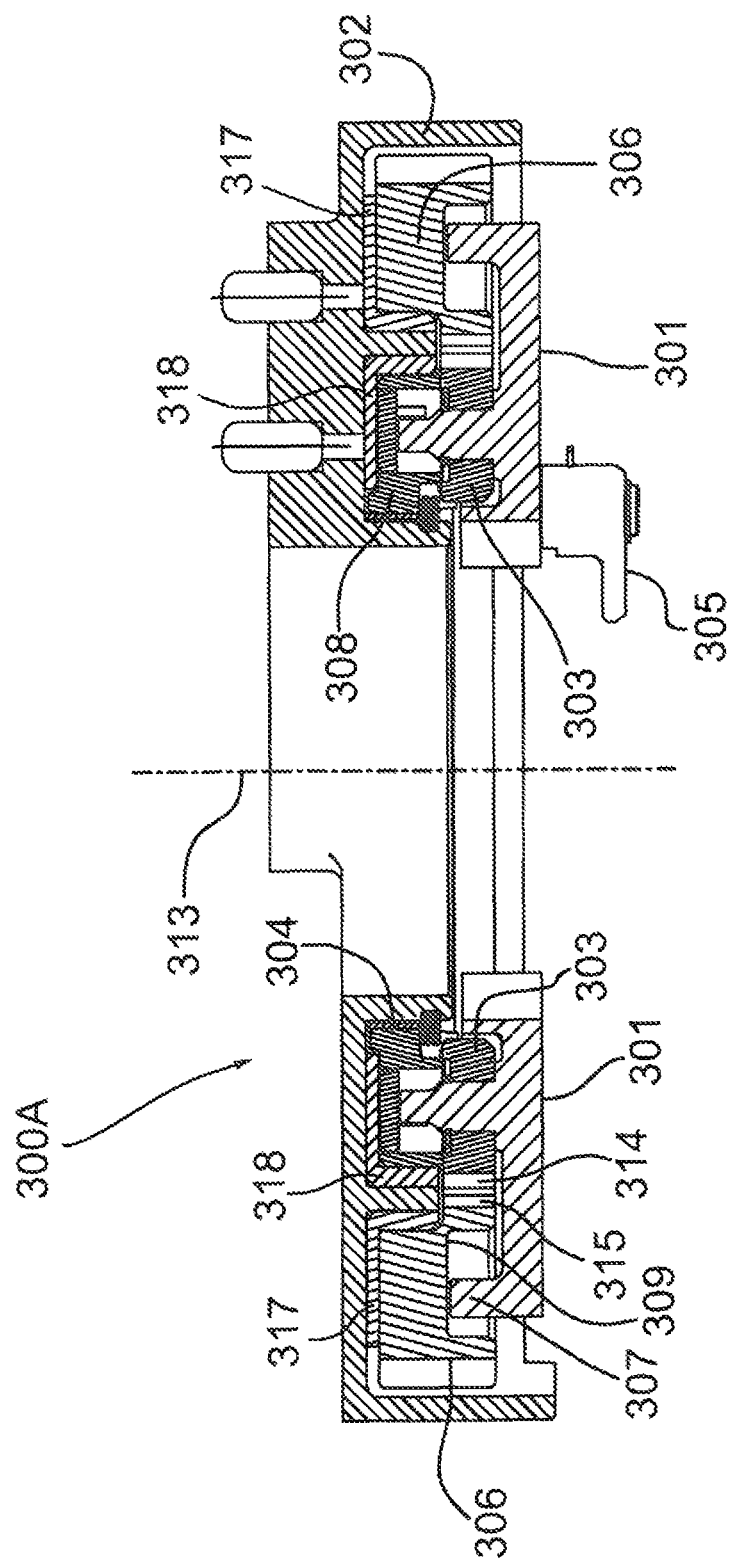
FIG. 11 is a cross section view of the cam wrench mechanism taken along line 11-11 of FIG. 10.

FIG. 10 is an isometric view of the interior of cam wrench mechanism 300A. It shows the nut cams 301, housing 302, toothed drive ring 306 in which the outer surface is toothed and inner surface is toothed) cam ring 308, and the retaining fittings 305. FIG. 11 is a cross section view of the cam wrench mechanism 300A taken along the line 11-11 of FIG. 10.

Figure 11A:
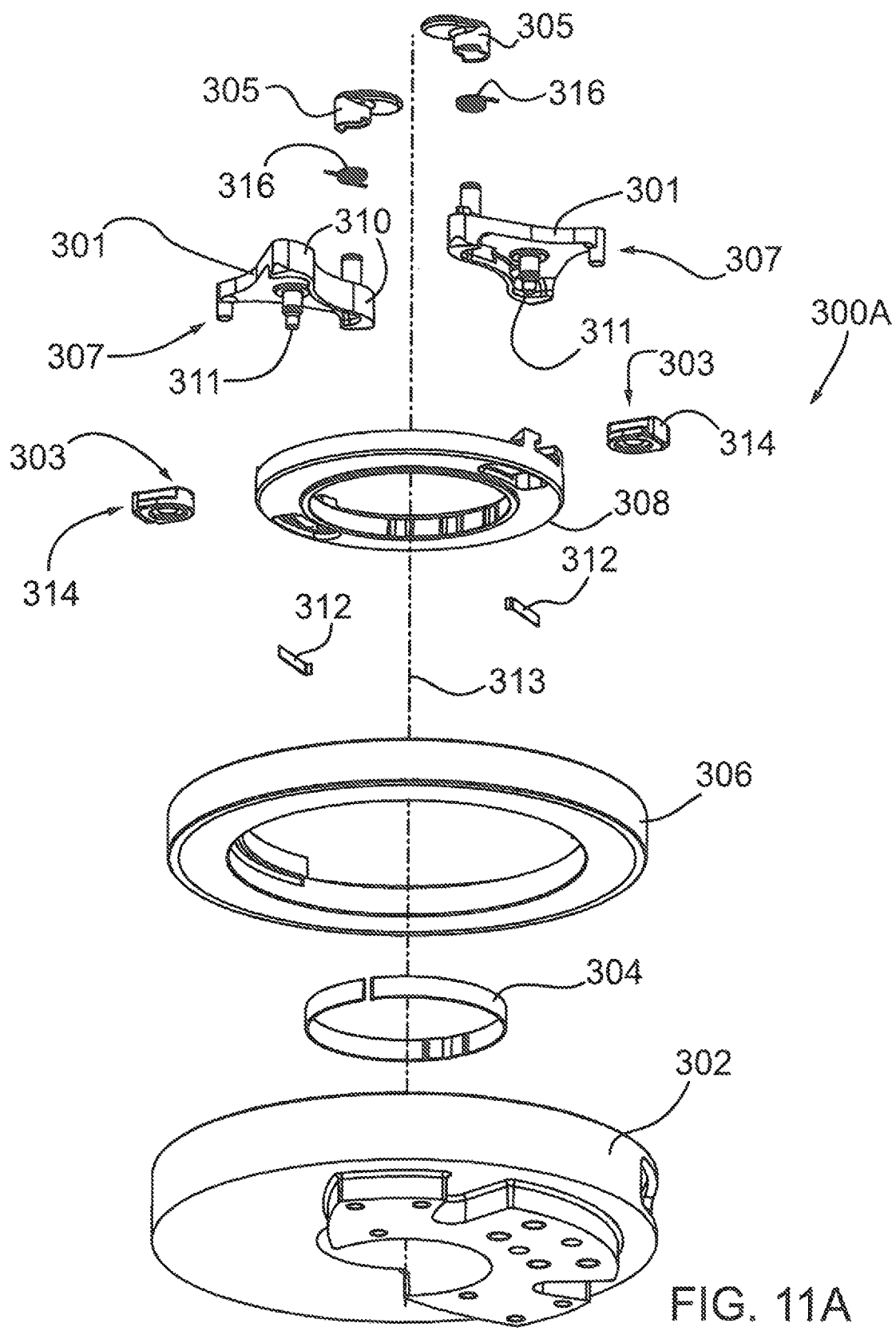
FIG. 11A is an exploded view of the cam wrench mechanism of FIG. 10.

FIG. 11A is an exploded view of a cam wrench mechanism 300A. It shows the housing 302, detent spring 304, drive ring 306, cam ring 308, cam locks 303, cam lock springs 312, nut cams 301, retaining fittings 305, retaining fitting springs 316 and cam wrench mechanism centreline 313.

Figure 11B:
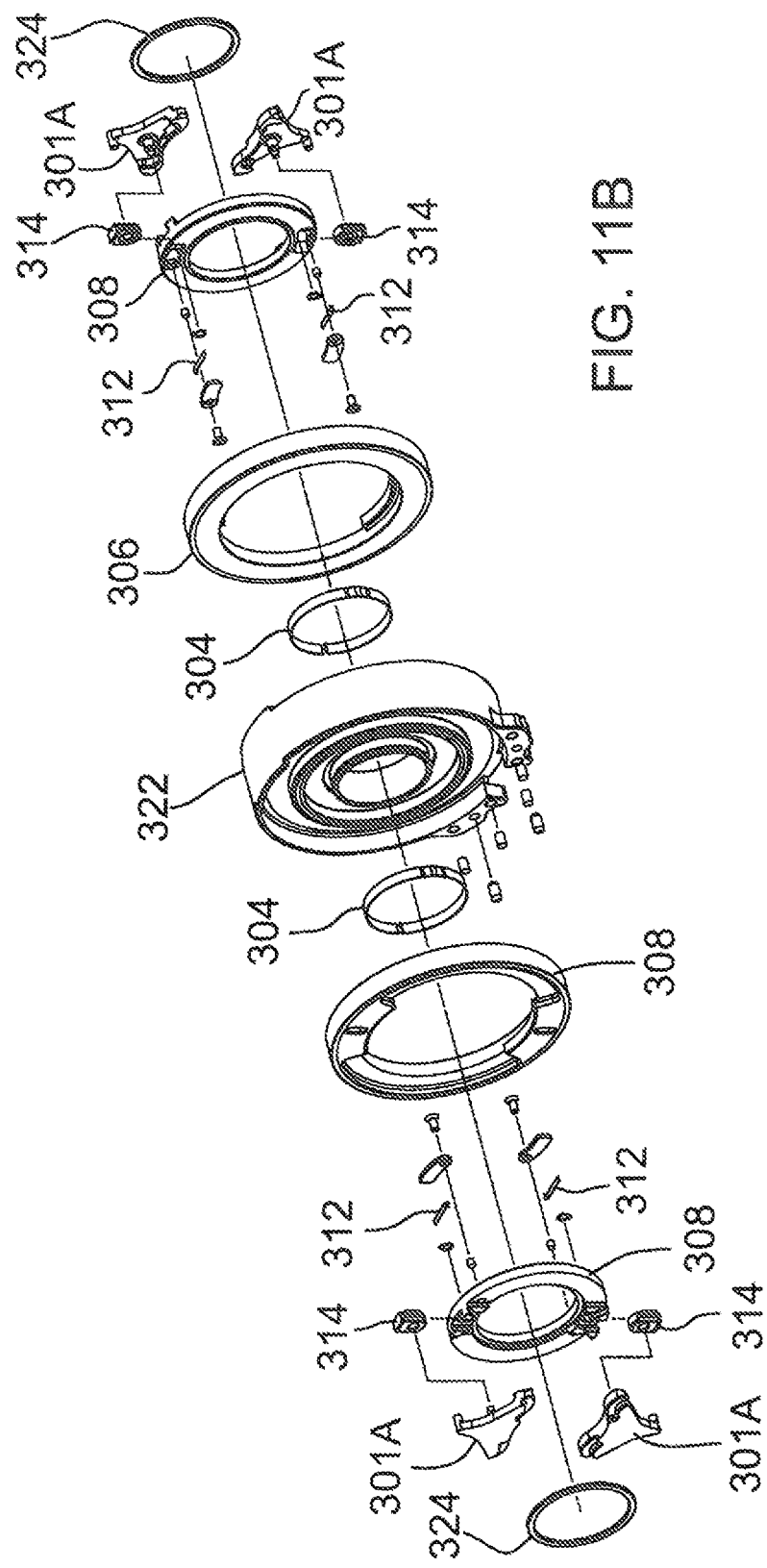
FIG. 11B shows an exploded view of the various adjustable wrench mechanisms forming the cam wrench mechanism.

FIG. 11B shows an exploded view of cam wrench mechanisms 300B and 300C. It shows two cam wrench mechanisms 300B and 300C are identical to mechanism 300A except as follows. The two mechanisms are mounted back to back in combination housing 322. The cam rings 308 of these two mechanisms are retained in combination housing 322 by retaining rings 324. Also, the nut cams 301A do not incorporate features to support retaining fittings 315 and retaining fitting springs 316.

Figure 11C:
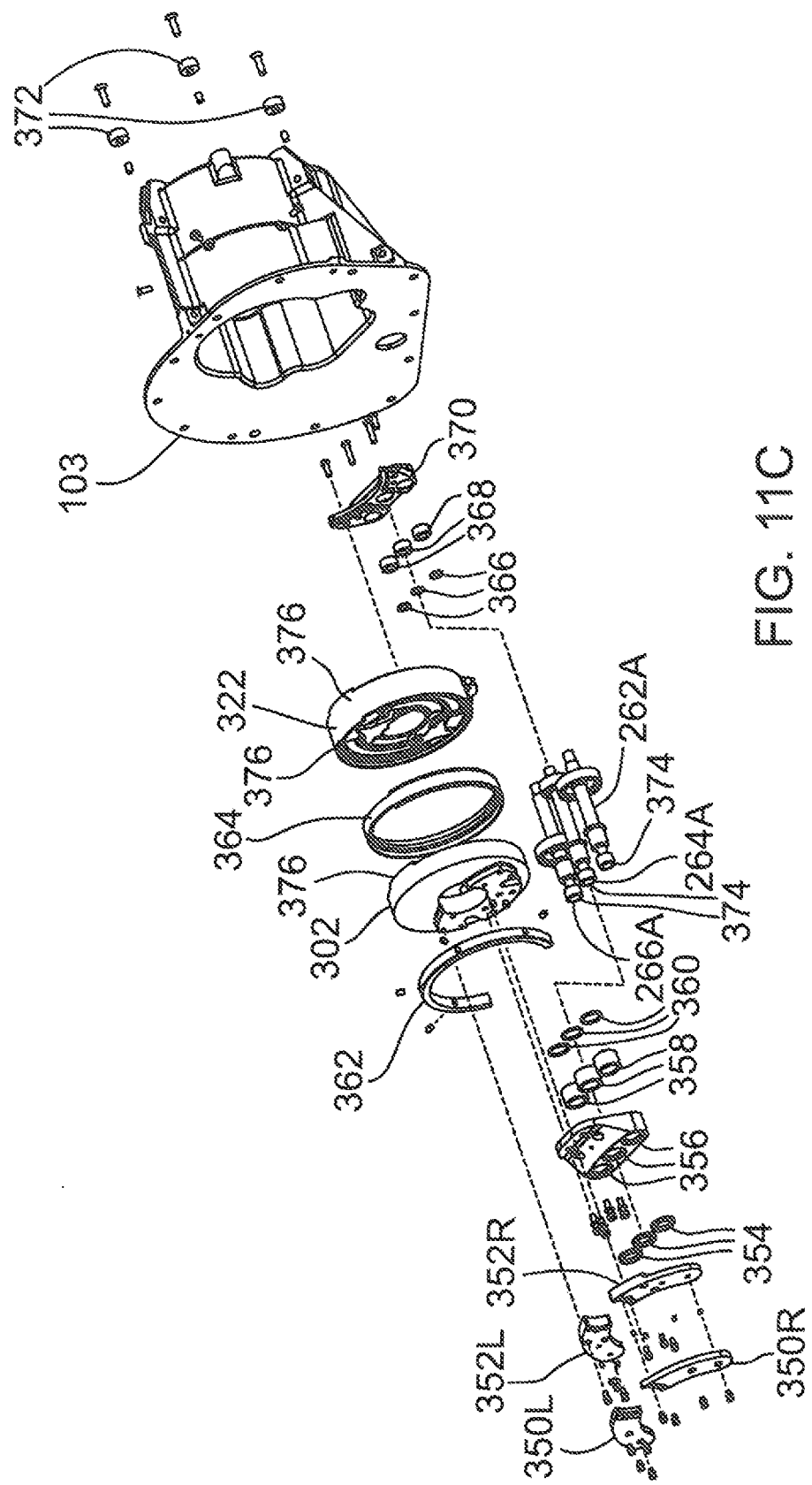
FIG. 11C is an exploded view of the lower housing portion and the adjustable wrench mechanism that sits adjacent the bottom of the lower housing portion and showing first and second output gears and a reaction gear located therebetween.

FIG. 11C is an exploded view of the lower housing 103 and the cam wrench mechanisms 300A, 300B and 300C that sits adjacent the bottom of the lower housing 103 and showing the lower extension portions of the first and second output gears 262A and 266A and the reaction gear 264A located between them. The lower extension portions of the output gears 262A and 266A and reaction gear 264A connect to the upper portions of each gear shaft via a spline interface at the top of each lower extension portion that mates with a matching spline on the lower end of each upper portion 286 via a spline union 396 (see FIG. 13A). Lower extension portions of the output gears and reaction gear rotate within needle bearings 358 at the top and bushings 368 at the bottom. The three shafts are supported by thrust bearings 360 at the top and thrust bearings 366 at the bottom. The shafts and bearings are supported by shaft housing 370 at the bottom, which bolts into combination housing 322 and by shaft housing 356 at the top which bolts into housing 302.

Lower housing 103 cam wrench mechanism housings 322 and 302 are separated by wrench spacer 364. The two cam wrench housings 302 and 322 and the wrench spacer 364 have interlocking dogs 376 and slots 378 that prevent the wrench mechanisms rotating under load and also the dog 376 on the bottom of housing 322 interlocks with a matching slot in the lower housing 103 to prevent any of the wrench mechanisms from rotating relative to the lower housing 103. The three cam wrench mechanisms 300A, 300B and 300C are retained in the lower housing 103 by the wrench retaining ring 362 which bolts into the lower housing 103.

To the top of cam wrench housing 302 are bolted two FOE bearing supports 352R and 352L and, on top of them two polymer FOE bearing pads 350R and 350L. Thrust washers 354 prevent the spline unions 396 from contacting the shaft housing 356.

Figure 12A:
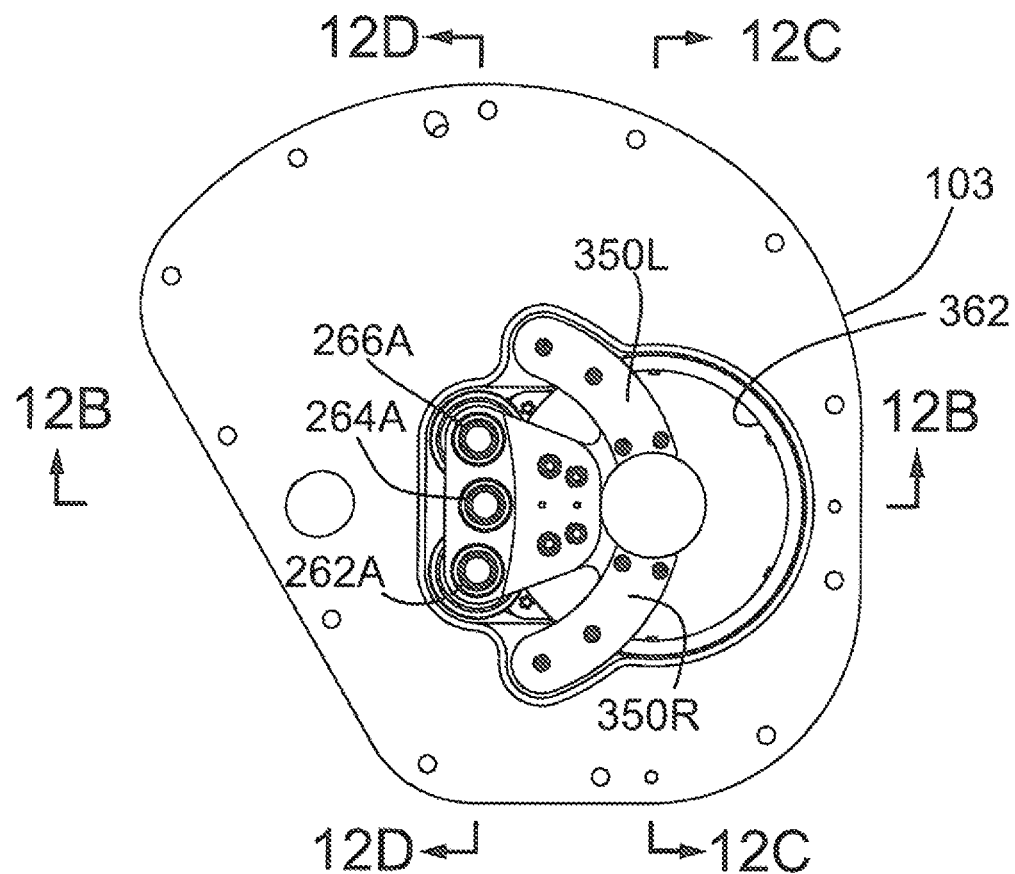
FIG. 12A is a top view of the lower housing portion with the first and second output gears and the reaction gear assembled therewith.
Figure 12B:
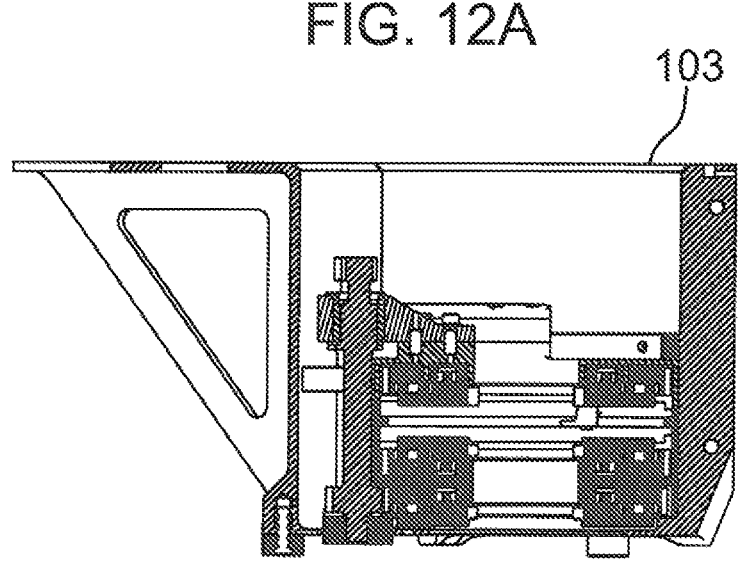
FIGS. 12B, 12C and 12d are various sectional views along the corresponding lines of FIG. 12A.
Figure 12C:
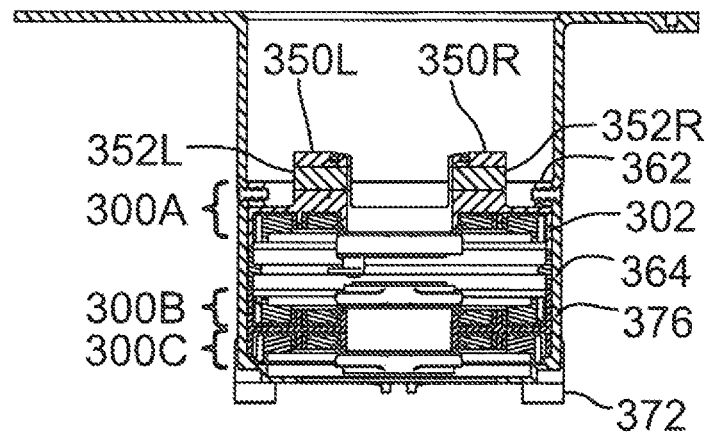
Figure 12D:
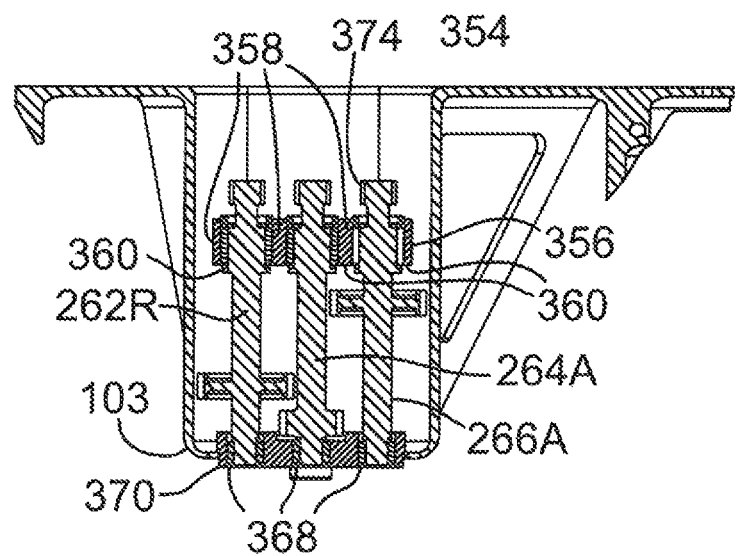
Figure 12E:
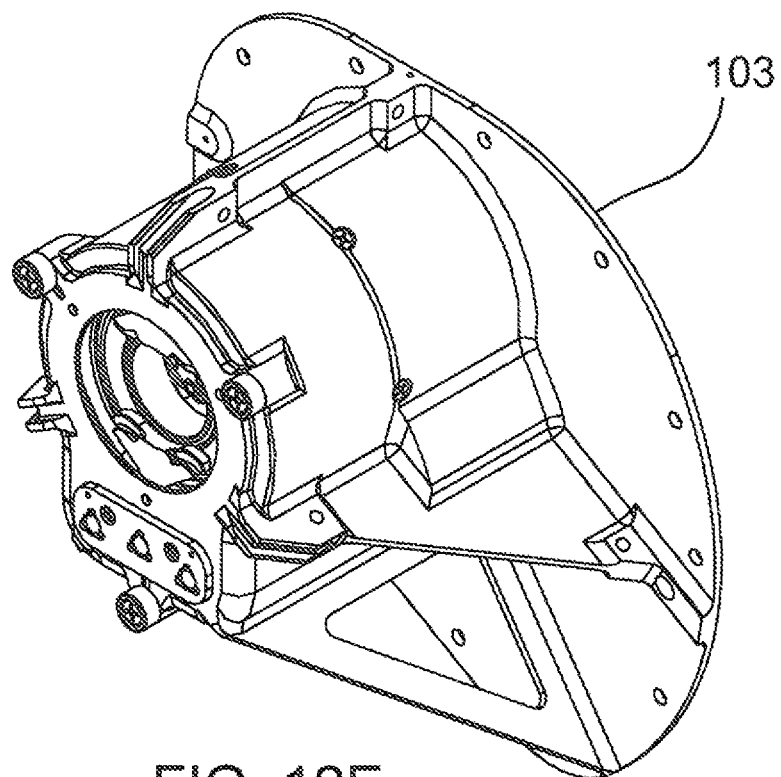
FIG. 12E is an isometric view of the lower housing section.
Figure 12F:
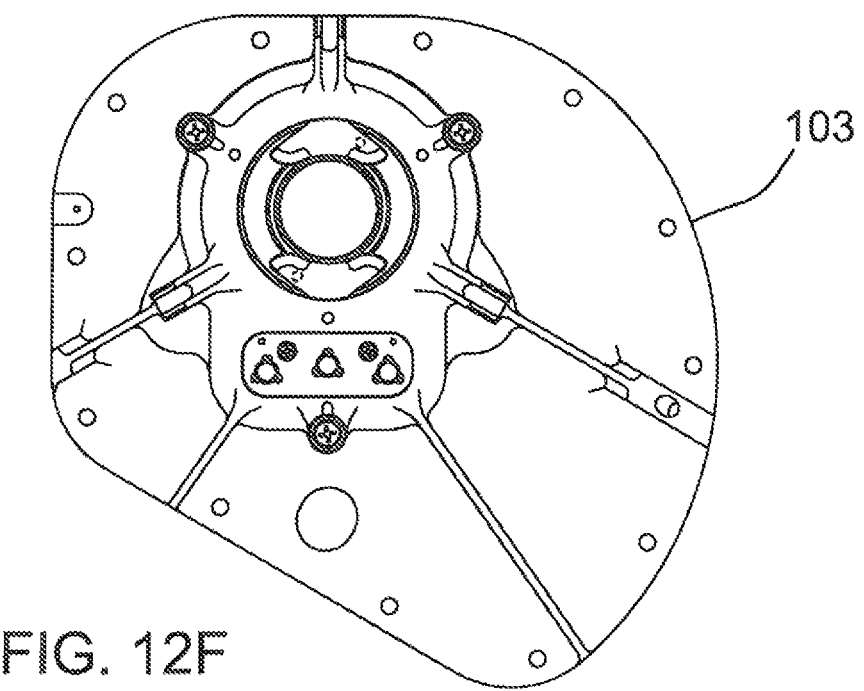
FIG. 12F is an bottom view of the lower housing section.

FIG. 12A is a top view of the lower housing portion with the first and second output gears 262A and 266A and the reaction gear 264A assembled therewith. FIGS. 12B, 12C, and 12D are various sectional views along the corresponding lines of FIG. 12A. FIG. 12F is a bottom view of the lower housing section 103 and FIG. 12E is an isometric view of the lower housing section 103.

Figure 13A:
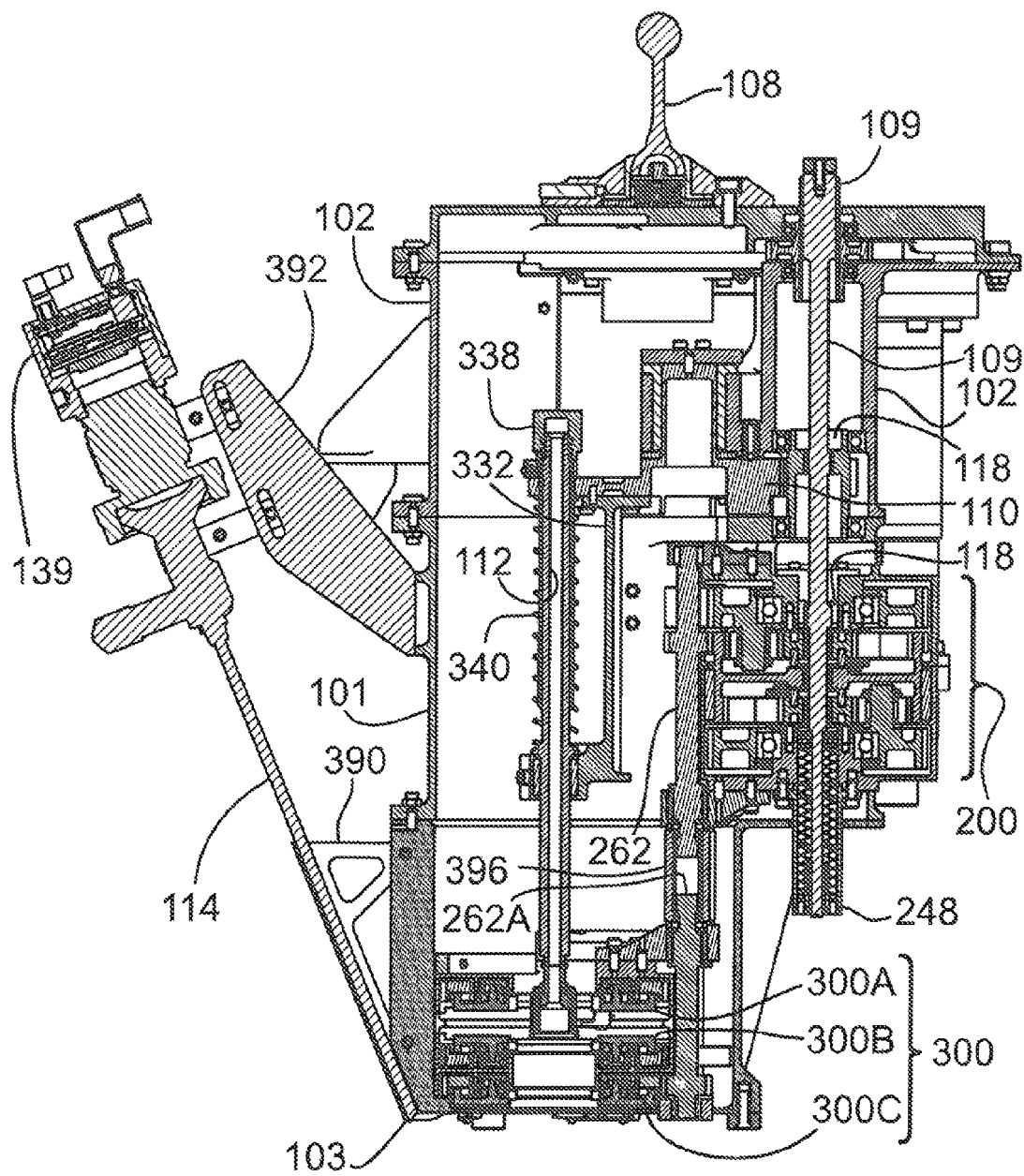
FIG. 13A is a cross section view through the refuelling tool along lines 13A-13A of FIG. 4 showing the assembled output drive train from the gearbox to the cam wrench mechanisms and, specifically, one output shaft 262 (262A) to the reaction cam wrench mechanism 300C forming part of the refueling tool.
Figure 13B:
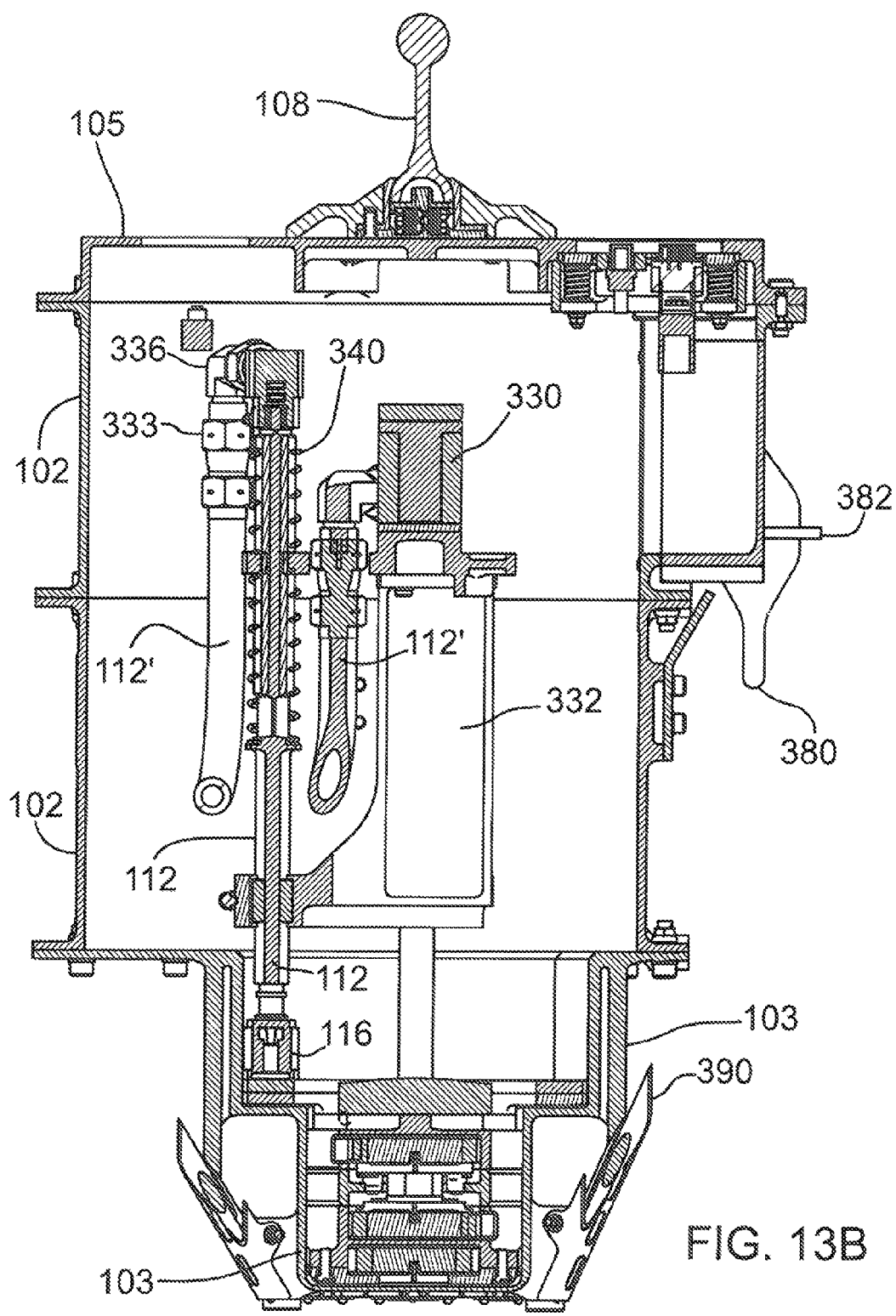
FIG. 13B is a cross section view through the refuelling tool along lines 13B-13B of FIG. 4.
Figure 13C:
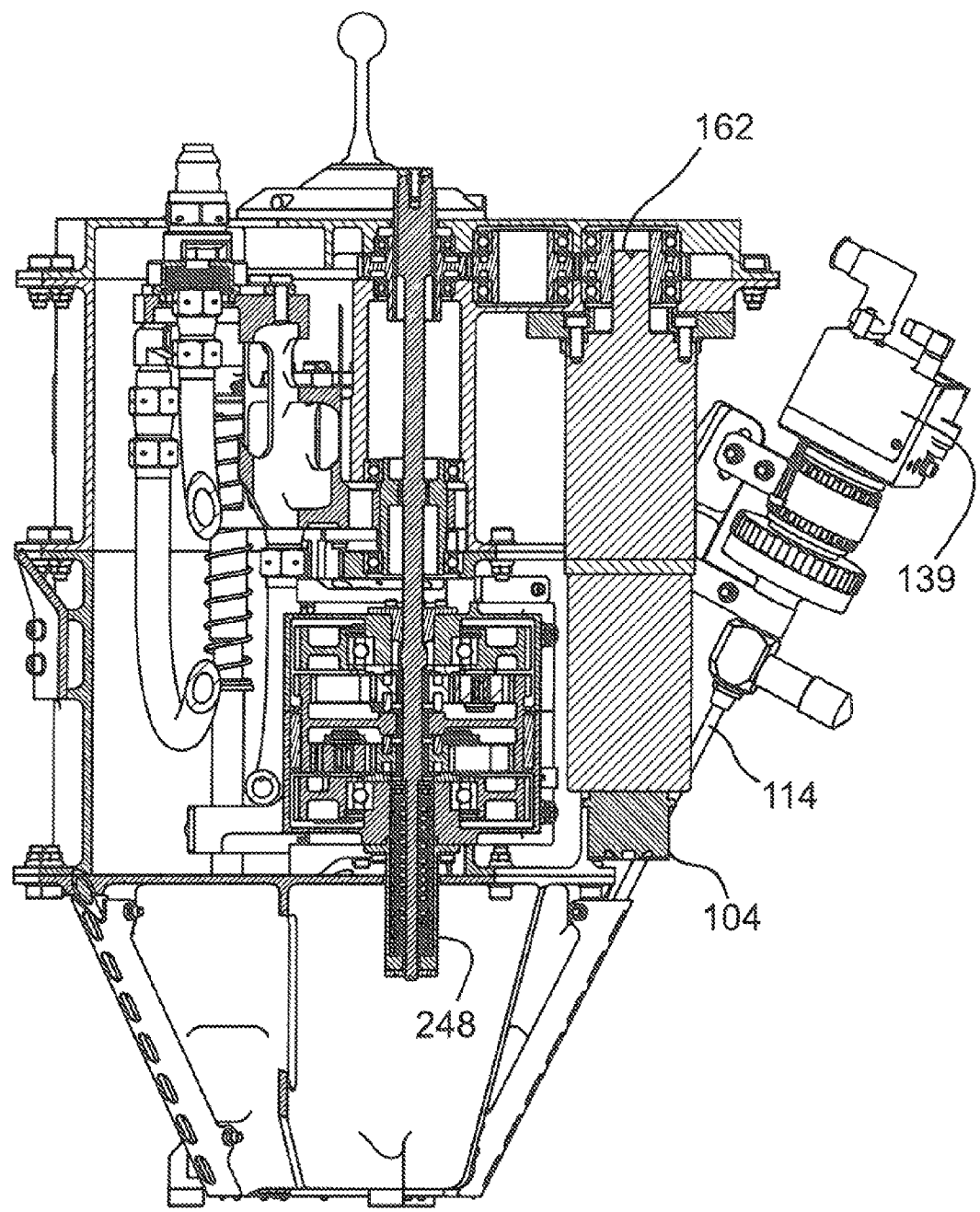
FIG. 13C is a cross section view through the refuelling tool along lines 10C-10C of FIG. 4 showing the assembled input drive train from motor to the gearbox.

FIGS. 13A, 13B and 13C are cross section views through the refuelling tool 100 of FIG. 4. FIG. 13A showing the gear shifter 109 and the two spaced drive pinions 118 on the gear shifter 109. It also shows the cam wrench mechanism 300 which includes, as discussed above, three cam wrench mechanisms comprising: the secondary seal fitting cam wrench 300A, the valve actuation cam wrench 300B, and the torque reaction feature cam wrench 300C. There are three output shafts 262 (262A), 264 (264A) (not visible in FIG. 13A) and 266 (266A) (not visible in FIG. 13A) which are configured to transmit power from the gearbox 200 each to an associated the cam wrench mechanism 300A, 300B and 300C. The three shafts are lined up substantially side by side so that they may efficiently engage the differential gearbox 200 at their input end and engage their intended cam wrench mechanism (300A, 300B or 300C) at their output end. Cam wrench mechanisms 300A, 300B and 300C are coaxially aligned one on top of the other.

Figure 14:
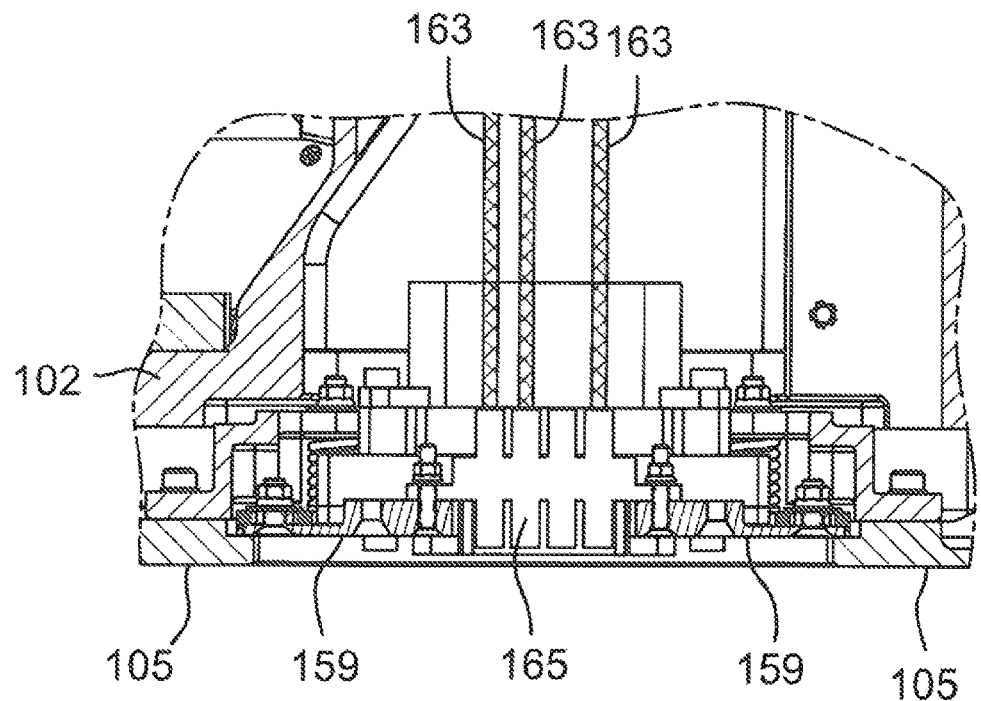
FIG. 14 is a cross section view through the refuelling tool along lines 14-14 of FIG. 4.

FIG. 14 shows a partial section through the refuelling tool along lines 14-14 of FIG. 4 and shows how the camera output video cables 163 and their connector 165 are attached to the compliant connector plate 159 with screws (illustrated, but not labelled).

Figure 15:
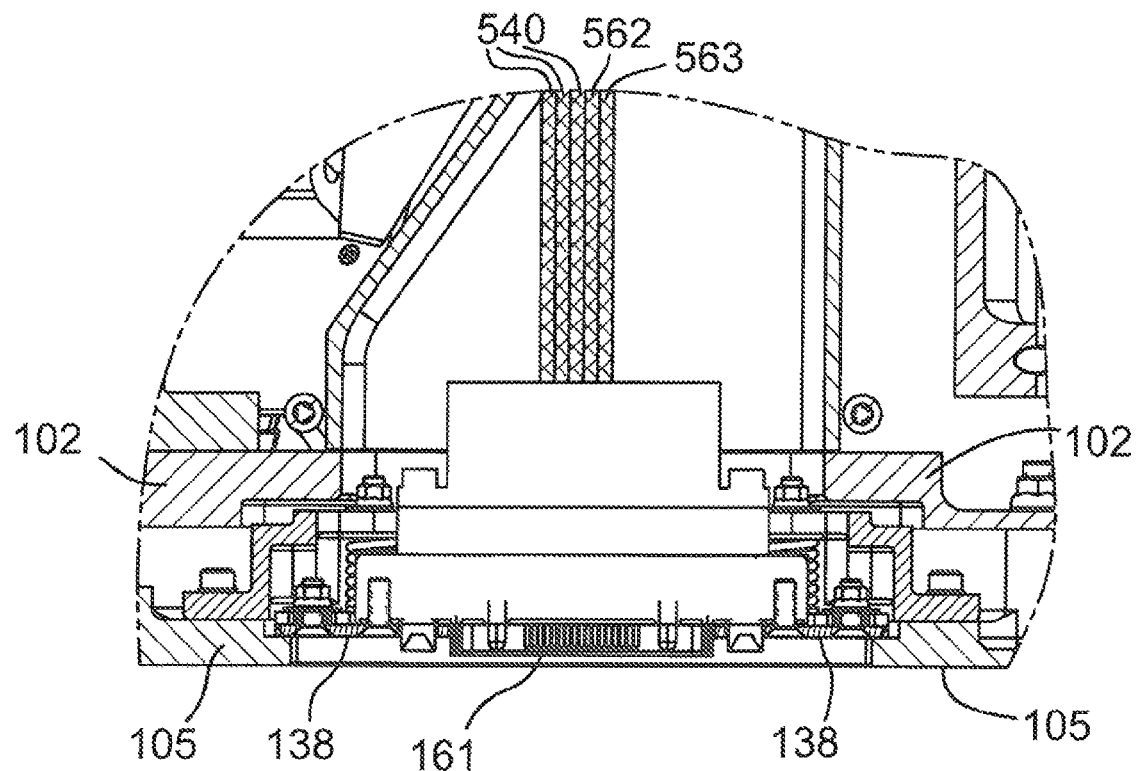
FIG. 15 is a cross section view through the refuelling tool along lines 15-15 of FIG. 4.

FIG. 15 is a partial section through the refuelling tool along lines 15-15 of FIG. 4 and shows how the refuelling tool motor power cable 562, motor resolver cable 563 and camera power and data cables 540 and their connector 161 are attached to the compliant connector plate 138 with screws (illustrated, but not labelled).

Figure 16A:
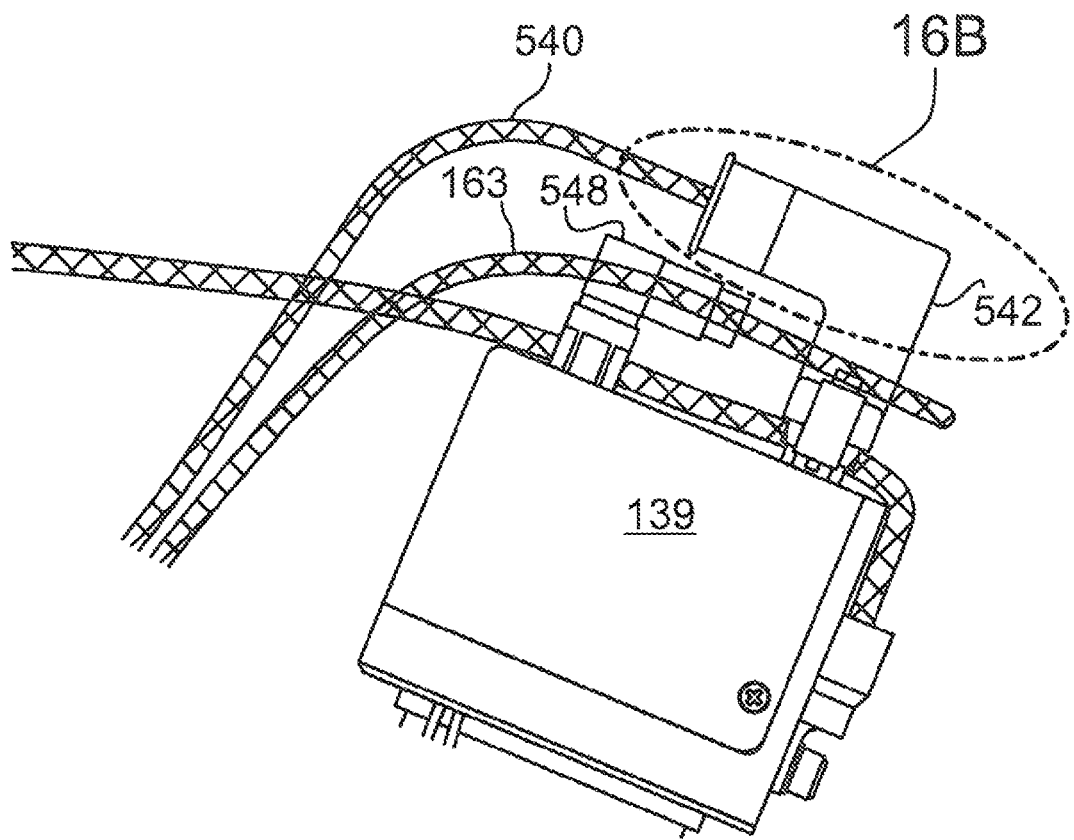
FIG. 16A shows how the camera electrical harness and video cable are connected to the camera

FIG. 16A shows how the camera electrical harness 540 is connected to the camera 139 via a connector 542 and video cable 163 is connected to the camera via connector 548.

Figure 16B:
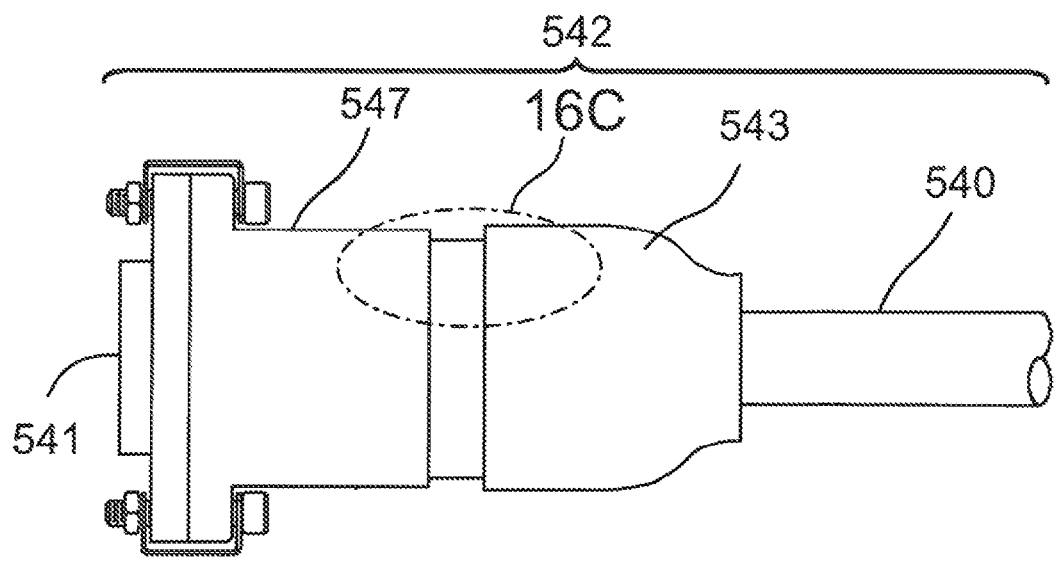
FIG. 16B shows the various parts of the camera harness and terminating connector.

FIG. 16B shows a detail of the various parts of the camera harness 540 and terminating connector 542. The terminating connector includes the connector 541, the connector backshell 547 and the shielding overwrap 543.

Figure 16C:
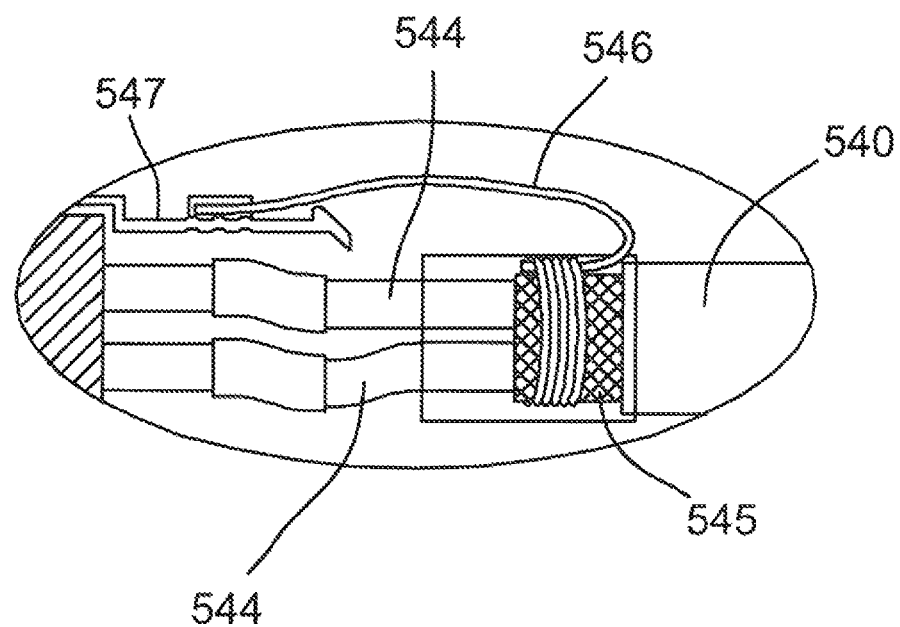
FIG. 16C shows how the camera harness shielding is connected to the connector backshell.

FIG. 16C shows how the camera harness shielding 545 is connected to the connector backshell 547 by splicing a small wire 546 to the video cable shielding 545 and then connecting it to the connector backshell 547.

FIG. 17 shows four component stowage points and the components stored on each one. Included are: the Fuel Oxidiser Exchanger (FOE) reset post 111 and its tool guide 123, the backup fill/drain valve storage location 126 consisting of back-up fill/drain valve 125 and its tool guide 123, the replacement seal fitting storage location 133 consisting of replacement seal fitting 134 and its tool guide 123 and the secondary seal fitting stowage point 122 and its tool guide 123.

The tool 100 disclosed herein for accessing fill/drain valves 125 on a client satellite may be mounted on a dedicated refuelling or servicer spacecraft 400 (FIG. 18) launched directly from earth. The system includes a multi-function tool 540 (see FIG. 22) as disclosed in copending U.S. patent application Ser. No. 13/652,339 (United States Patent Publication 20130103193) to Roberts et al. (which is incorporated herein in its entirety by reference) the purpose of which is to provide tool tips needed to gain access to the fill/drain valves themselves and includes a tool holder and a suite of tool tips which are held by the tool holder and activated by a single motive source under robotic control. The system also includes the propellant transfer system 406 for transferring bi- or mono-propellants from the servicing satellite 400 to the client satellite 401 as disclosed in copending U.S. patent application Ser. No. 13/678,281 (United States Patent Publication 20130119204) (which is incorporated herein in its entirety by reference) the purpose of which is to provide a propellant transfer system 406 (FIG. 18) for transferring the propellant which is under a combination of remote teleoperator and computer control. Such a dedicated servicer spacecraft 400 may include a spacecraft docking mechanism such as that disclosed in U.S. Pat. No. 6,969,030 issued Nov. 29, 2005, which patent is incorporated herein in its entirety by reference. Alternatively, or in addition, it may include a second robotic arm 430 for capturing the client spacecraft, as shown in ghost outline in FIG. 18.

Figure 18:
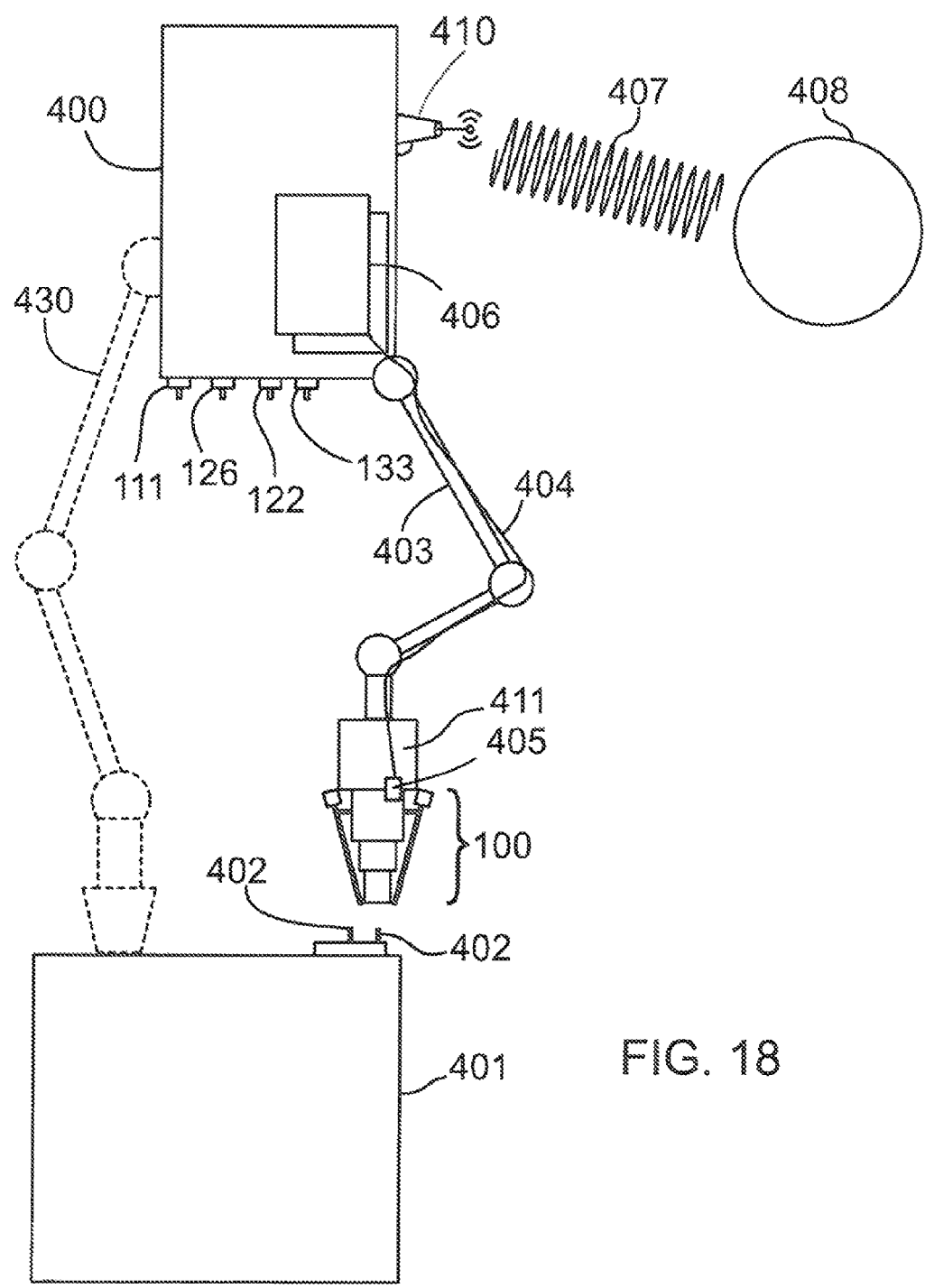
FIG. 18 is a block diagram showing those items pertaining to the refuelling of a satellite in addition to the refuelling tool.

FIG. 18 is a block diagram showing those items pertaining to the refueling of a client satellite in addition to the refueling tool 100. These include the host servicer spacecraft 400, the client satellite 401 to be refueled, the client fill/drain valve(s) 402, a robotic arm 403, an end effector 411 coupled to the robotic arm 403, the refueling tool 100 releasibly gripped by the end effector 411, a propellant transfer system 406, a propellant coupling mechanism 405, the propellant outlet hose 404, and a communication system 410 to provide a two-way radio link 407 to Earth 408 (or space station or mother ship-whichever is the location of the teleoperation control). It also shows the stowage points for the backup fill/drain valve 125, the replacement seal fitting 133, the secondary seal fitting 122 and the reset post 111.

Figure 22:
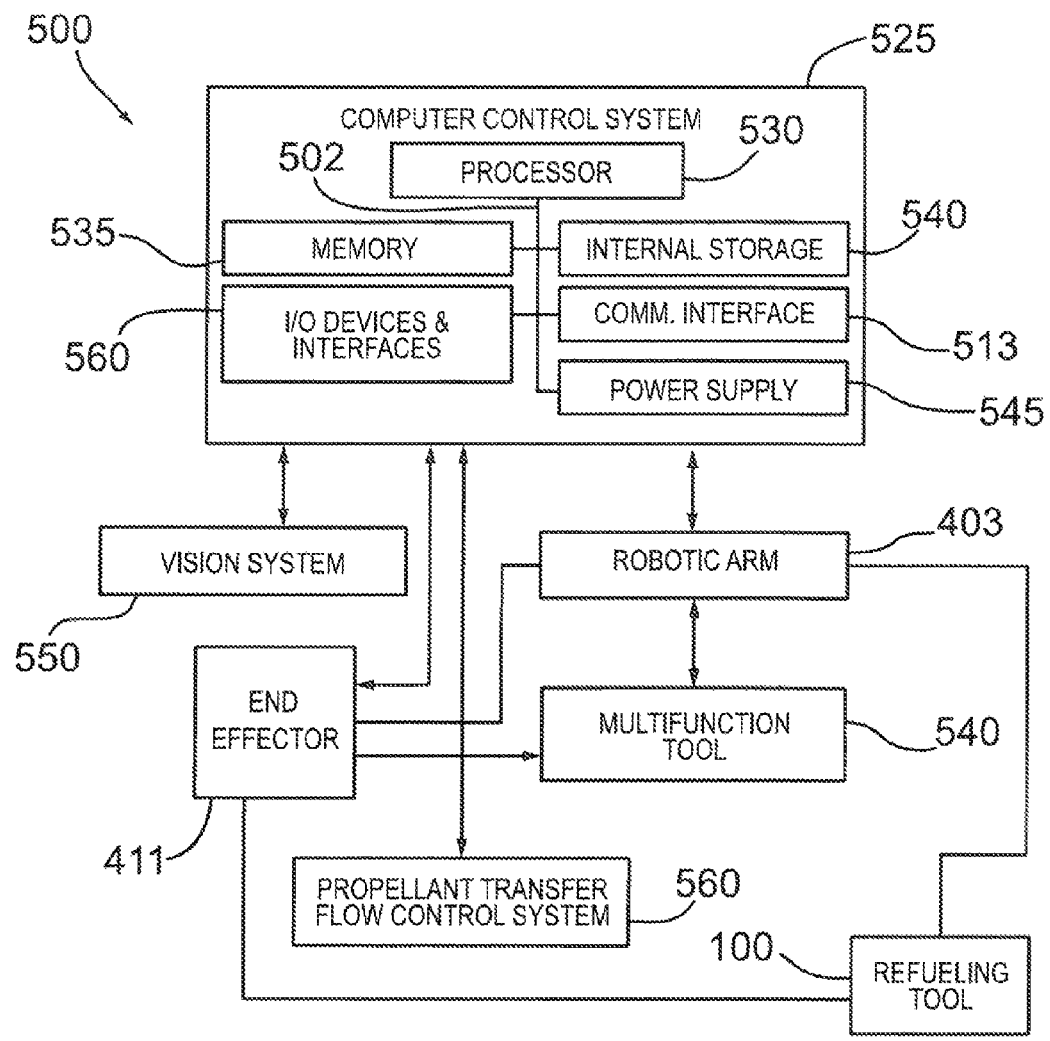
FIG. 22 shows a non-limiting exemplary example of a computer control system that may be used to control the actions of the robotic tool.

In addition, the servicer spacecraft 400 (FIG. 18) includes an onboard computer control system 500 (see FIG. 22) which may be interfaced with the tool 100, in addition to a propellant flow control system, shown at 560 in FIG. 22 so that it can drive all the components that are opened and closed during the propellant transfer operations in a selected sequence depending on which mode of propellant transfer has been selected based on the pressure in the client satellite propellant tank. With the presence of the computer control system 500 interfaced with the propellant flow control system, the propellant transfer process may be autonomously controlled by a local Mission Manager or may include some levels of supervised autonomy so that in addition to being under pure teleoperation there may be mixed teleoperation/supervised autonomy.

Referring now to FIGS. 18 and 22, an example computing system 500 forming part of the propellant resupply system is illustrated. The system includes a computer control system 525 configured, and programmed to control movement of the robotic arm 403 during the entire procedure of accessing the client satellite fill/drain valve 402, attachment of the backup fill/drain valve 125, mating of propellant outlet hoses 112 to the backup fill/drain valve 125, transfer of propellant into the client satellite propellant tanks, demating hoses 112 from backup fill/drain valve 125, sealing valve 125 and decoupling of the servicer spacecraft 400 from the client satellite 401.

The command and control system is also configured to control movement of the robotic arm 403 and the end effector 411 attached thereto for controlling the action of the refueling tool 100. This may be the same command and control system mentioned above that is interfaced with the flow control system, for example a computer mounted on the servicer satellite which is programmed with instructions to carry out all operations needed to be performed by the servicer satellite during approach, capture/docking with the client satellite and refueling operations. It may also be a separate computer system. The satellite refueling system includes a vision system for viewing the operation of the refueling tool just prior to engagement or release from the fill-drain valve. Communication system 410 is interfaced with the robotic arm 403 and configured to allow remote operation (from the Earth 408 or from any other suitable location) of the vision system (which may include one or more cameras), the robotic arm 403 and hence the tools. The vision system may include distinct markers mounted on the fluid transfer coupling used to couple the fluid transfer system storage tank and piping system to the fill/drain valve of the client satellite, as well as markings on all tools associated with the fluid transfer operation.

These cameras may be used within a telerobotic control mode where an operator controlling the servicing actions on earth views distinct views of the worksite on display screens at the command and control console. In an alternative mode, the position of elements like the fill drain valve may be determined by either a stereo camera and vision system which extracts 3D points and determines position and orientation of the fill-drain valve or other relevant features on the worksite from which the robotic arm holding tools (multi-function tool, refueling tool) can be driven to these locations according the sensed 6 degree-of-freedom coordinates.

The stereo camera could also be replaced with a scanning or flash lidar system from which desired 6 degree-of-freedom coordinates could be obtained by taking measured 3-D point clouds and estimating the pose of desired objects based on stored CAD models of the desired features or shapes on the refueling worksite. For those applications where the spacecraft was designed with the intention to be serviced, a simple target such as described in Ogilvie et al. (Ogilvie, A., Justin Allport, Michael Hannah, John Lymer, "Autonomous Satellite Servicing Using the Orbital Express Demonstration Manipulator System," Proc. of the 9th International Symposium on Artificial Intelligence, Robotics and Automation in Space (i-SAIRAS '08), Los Angeles, Calif., Feb. 25-29, 2008) could be used in combination with a monocular camera on the servicing robotics to locations items of interest such as the fill-drain valve. Finally, the robotic arm or device used to position the device may include a sensor or sensors capable of measuring reaction forces between the tools and the worksite (e.g. fill-drain valves). These can be displayed to the operator to aid the operator in tele-operation control or can be used in an automatic force-moment accommodation control mode, which either aids a tele-operator or can be used in a supervised autonomous control mode.

As mentioned above, computer control system 525 is interfaced with vision system 550, the flow control system 560 of the propellant transfer system, and robotic arm 403. Previously mentioned communication system 410 is provided which is interfaced with the robotic arm 403 and configured to allow remote operation (from the Earth 408 or from any other suitable location) of the vision system (which may include one or more cameras 550 as separate from the cameras 139 of the refueling tool 100), the robotic arm 403, robotic end effector 411, multifunction tool 540, refueling tool 100 and the flow control system 560. A system of this type is very advantageous particularly for space based systems needing remote control.

The end effector 411 possesses its own embedded processor (as does the robotic arm 403) and receives commands from the servicing spacecraft computer. The end effector 411 also passes power and data from the central computer through to the multifunction tool 540 and refuelling tool 100. The refuelling and multifunction tools do not possess embedded computers/microcontrollers so that they receive actuator commands from the computer control system 525 upstream via the end-effector 411.

Some aspects of the present disclosure can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version. Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

FIG. 22 provides an exemplary, non-limiting implementation of computer control system 525, forming part of the command and control system, which includes one or more processors 530 (for example, a CPU/microprocessor), bus 502, memory 535, which may include random access memory (RAM) and/or read only memory (ROM), one or more internal storage devices 540 (e.g. a hard disk drive, compact disk drive or internal flash memory), a power supply 545, one more communications interfaces 410, and various input/output devices and/or interfaces 555.

Although only one of each component is illustrated in FIG. 22, any number of each component can be included computer control system 525. For example, a computer typically contains a number of different data storage media. Furthermore, although bus 502 is depicted as a single connection between all of the components, it will be appreciated that the bus 502 may represent one or more circuits, devices or communication channels which link two or more of the components. For example, in personal computers, bus 502 often includes or is a motherboard.

In one embodiment, computer control system 525 may be, or include, a general purpose computer or any other hardware equivalents configured for operation in space. Computer control system 525 may also be implemented as one or more physical devices that are coupled to processor 530 through one of more communications channels or interfaces. For example, computer control system 525 can be implemented using application specific integrated circuits (ASIC). Alternatively, computer control system 525 can be implemented as a combination of hardware and software, where the software is loaded into the processor from the memory or over a network connection.

Computer control system 525 may be programmed with a set of instructions which when executed in the processor causes the system to perform one or more methods described in the present disclosure. Computer control system 525 may include many more or less components than those shown.

While some embodiments have been described in the context of fully functioning computers and computer systems, those skilled in the art will appreciate that various embodiments are capable of being distributed as a program product in a variety of forms and are capable of being applied regardless of the particular type of machine or computer readable media used to actually effect the distribution.

A computer readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. In general, a machine readable medium includes any mechanism that provides (i.e., stores and/or transmits) information in a form accessible by a machine (e.g., a computer, network device, personal digital assistant, manufacturing tool, any device with a set of one or more processors, etc.). Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like.

The present system is also configured for full autonomous operation. A fully autonomous system is a system that measures and responds to its external environment; full autonomy is often pursued under conditions that require very responsive changes in system state to external conditions or for conditions that require rapid decision making for controlling hazardous situations. The implementation of full autonomy is often costly and is often unable to handle unforeseen or highly uncertain environments. Supervised autonomy, with human operators able to initiate autonomous states in a system, provides the benefits of a responsive autonomous local controller, with the flexibility provided by human teleoperators.

Figure 19:
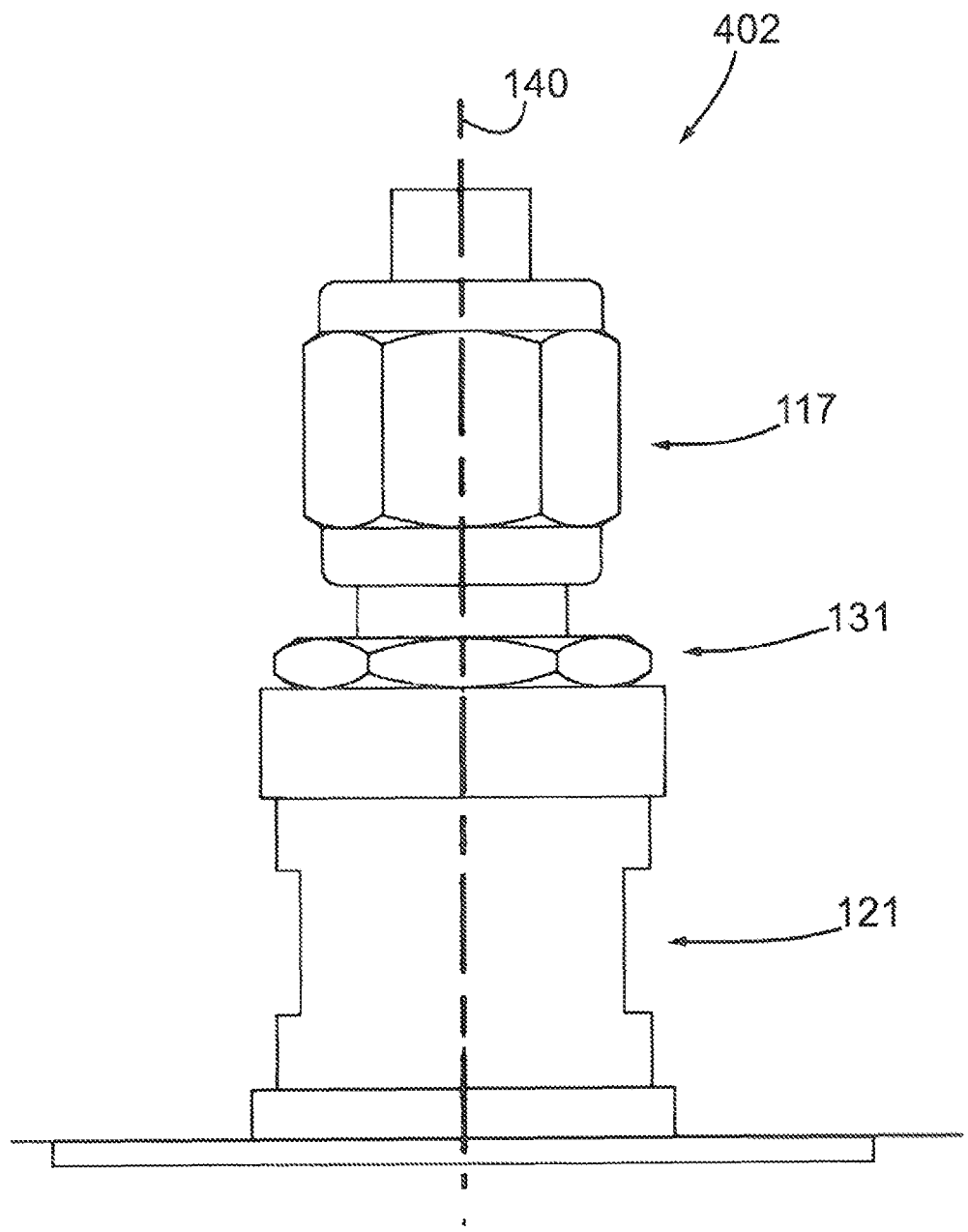
FIG. 19 shows a client valve located on a client satellite to be resupplied with propellant.

FIG. 19 shows the client fill/drain valve 402, the secondary seal fitting 117, (also referred to as a B-nut cap or "valve access cap") the valve actuation nut 131, the torque reaction features 121 and the client valve centreline 140.

Figure 20B:
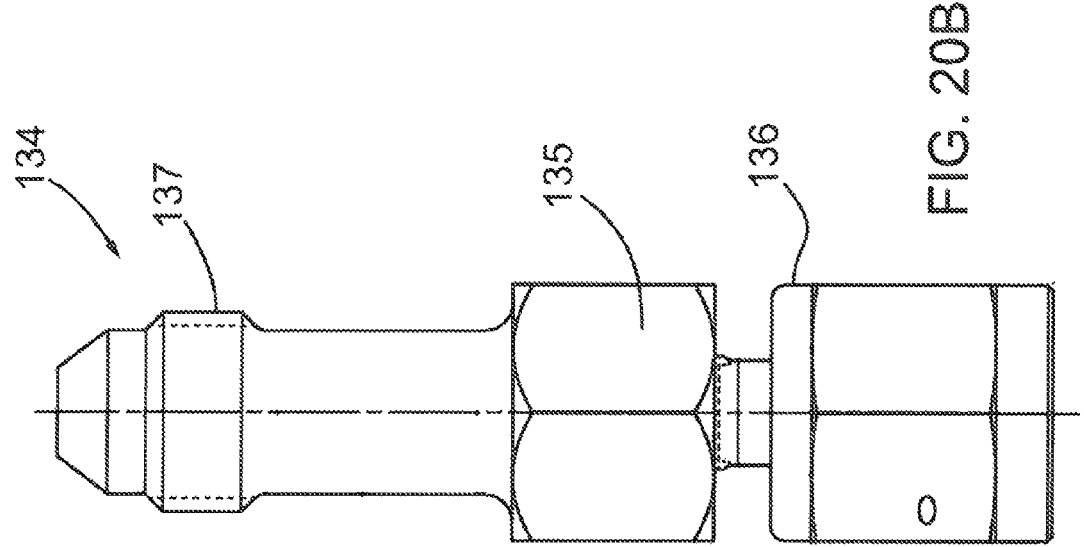
FIG. 20B is an elevation view of a replacement secondary seal fitting used to close the fuel tank on the client satellite once refueling operations have been completed.
Figure 20A:
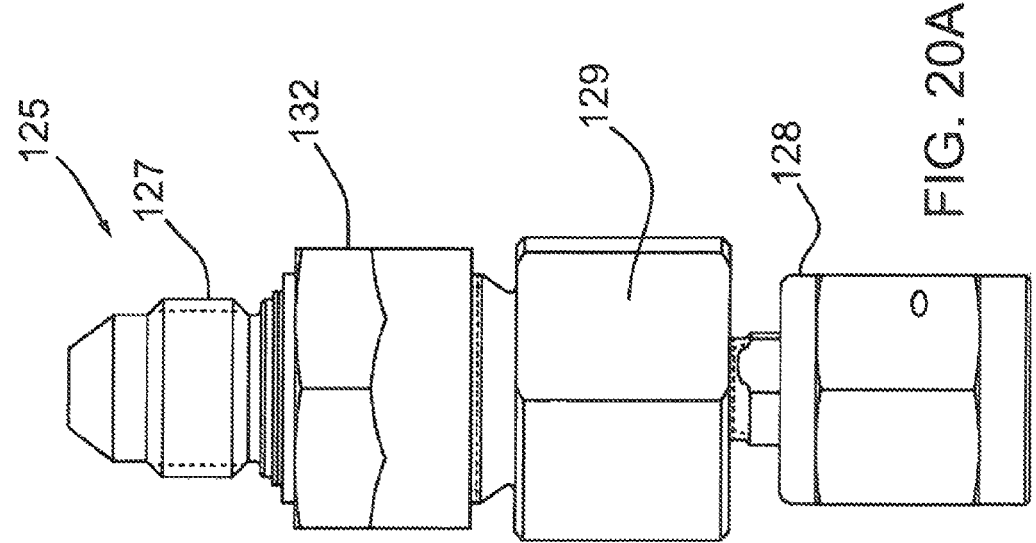
FIG. 20A shows the backup fill/drain valve 125 with the secondary seal threaded feature 127, the backup fill/drain valve actuation nut 132, the backup fill/drain valve torque reaction feature 129 and the backup fill/drain valve seal fitting 128.
Figure 21A:
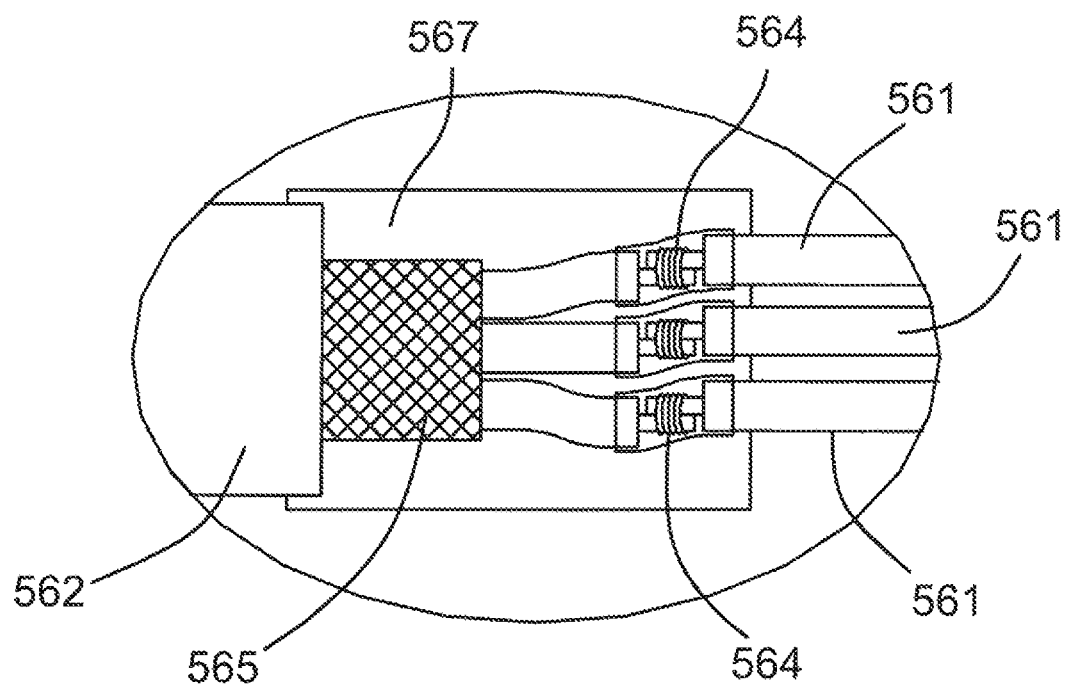
FIG. 21A shows a detail of how the motor power leads are spliced into the refuelling tool harness.
Figure 21B:
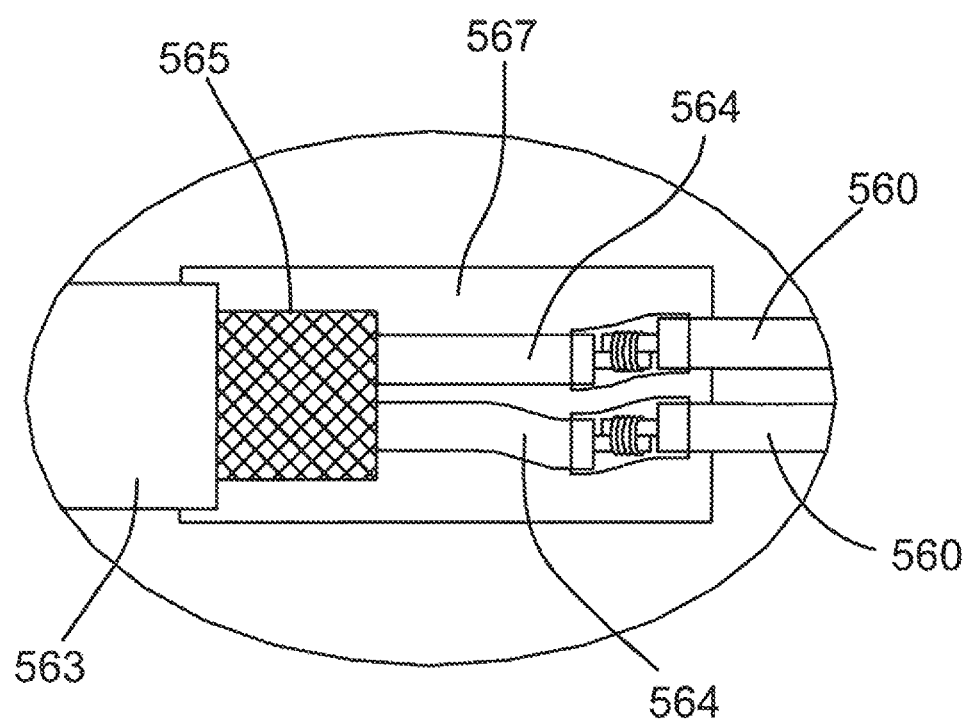
FIG. 21B shows a detail of how the resolver leads are spliced into the refuelling tool harness.

FIG. 20A shows the backup fill/drain valve 125 with the secondary seal threaded feature 127, the backup fill/drain valve actuation nut 132, the backup fill/drain valve torque reaction feature 129 and the backup fill/drain valve seal fitting 128.

FIG. 20B shows the replacement secondary seal fitting 134 with the seal fitting threaded feature 137, the replacement secondary seal fitting torque reaction feature 135 and the seal fitting 136.

Figure 23A:
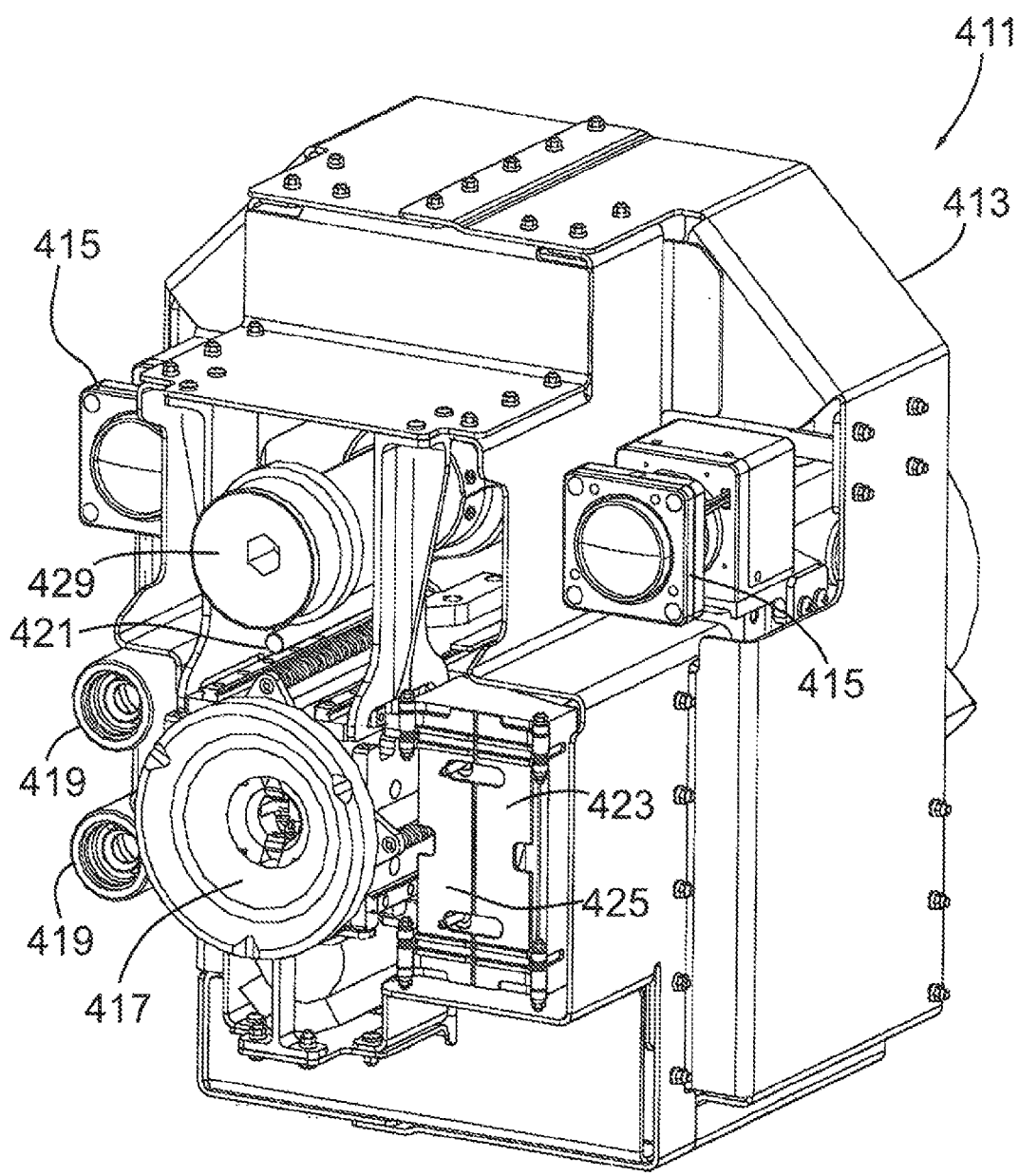
FIG. 23A shows a perspective view of the front of an end effector configured to be used in conjunction with the refueling tool.
Figure 23B:
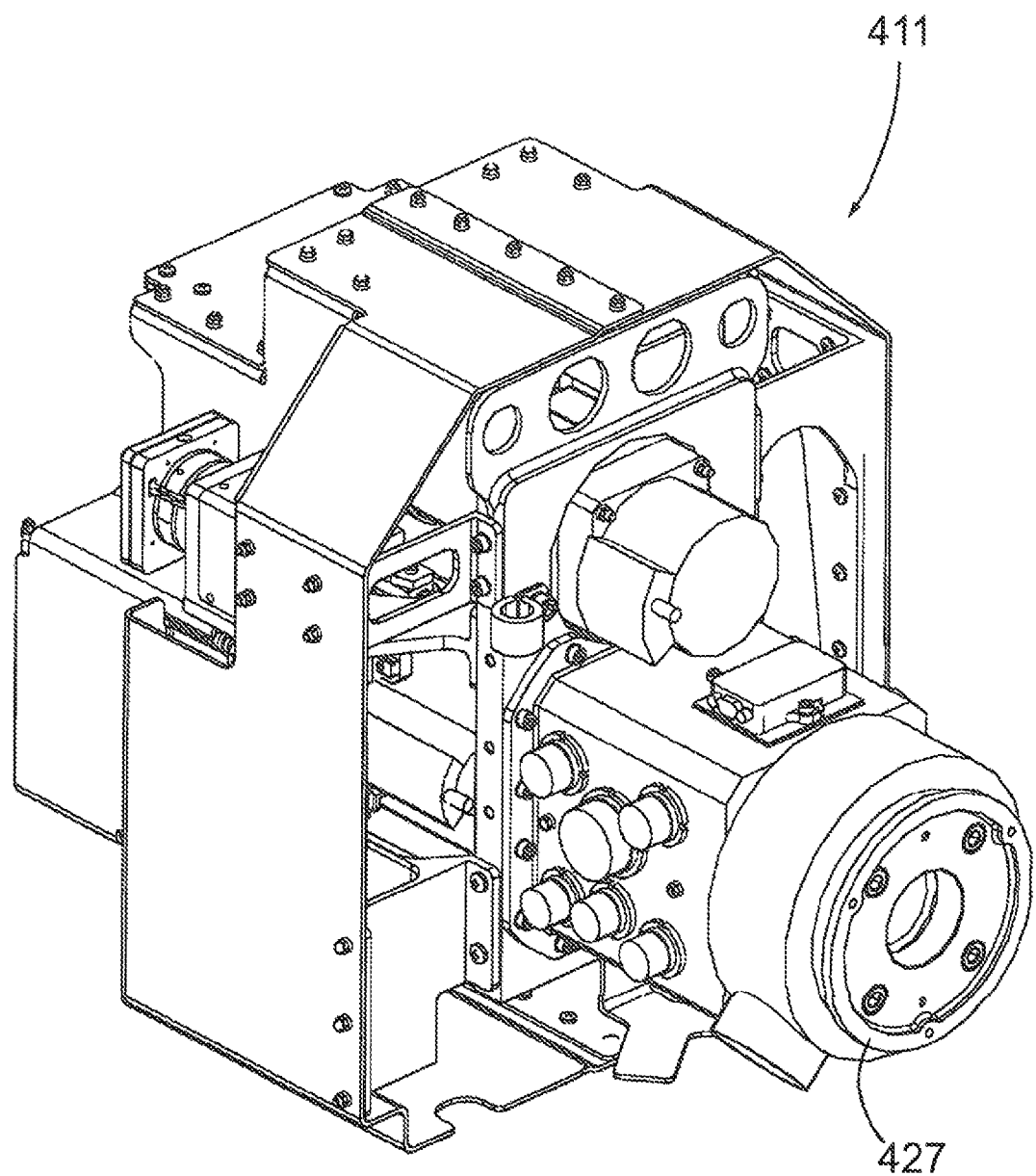
FIG. 23B shows perspective view of the back of the end effector of FIG. 23A.
Figure 23C:
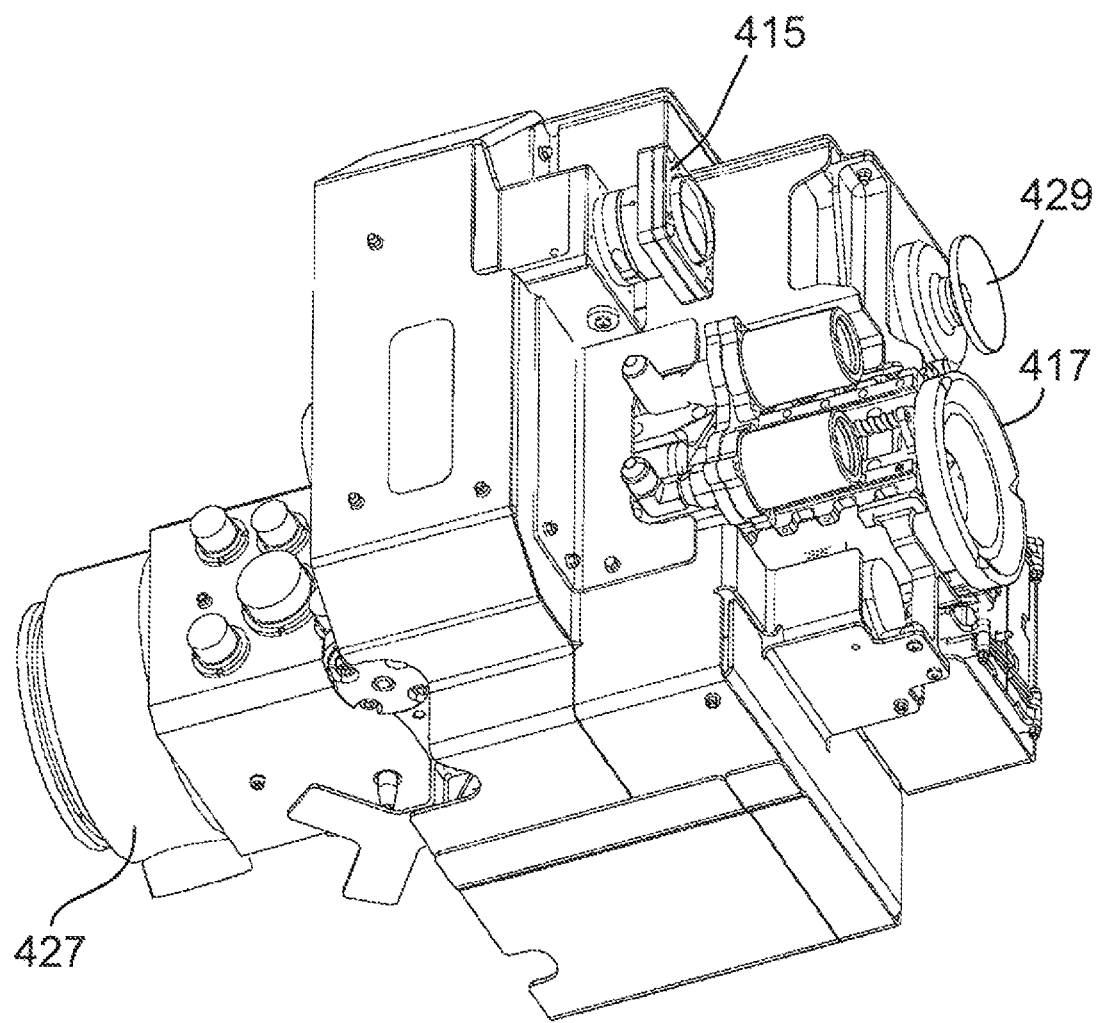
FIG. 23C is another perspective view of the front, side and bottom of the end effector of FIG. 23A.

FIGS. 23A to 23C show different views of end effector 411. The perspective view of FIG. 23A shows the end effector includes a housing 413, two (2) cameras 415, a grapple mechanism 417 for grappling grapple fixture 108 (FIG. 1), and two (2) propellant couplings 419 which couple with propellant couplings 106 and 107 (FIG. 1). Mounted in the end effector 411 is an actuator 421 (preferably a linear actuator) for actuating gearbox shifter 109 in the tool 100. Doors 423 and 425 cover electrical connectors for the electrical connections 161 and 165 located on tool 100 (FIG. 1). A hex nut drive 429 is included in end effector 411 for other servicing tasks unrelated to client valve actuation. One of these is the actuation of the tilting mechanism within the multifunction tool 540. Cameras 415 are provide views of operations and the client satellite to the teleoperators to permit them to control various end effector actions. FIG. 23B shows a perspective view of the back of the end effector 411 showing coupling 427 for coupling the end effector 411 to the end of the robotic arm 403.

The end effector 411 includes at least two fluid couplings 419, but it will be understood that if the system is designed to transfer only monopropellant then only one coupling is needed. Mounted in end effector 411 is a coupling actuator (not shown) for moving the fluid coupling(s) into engagement with the couplings 106 and 107 on the tool 100 (FIG. 1). Similarly, mounted in the end effector 411 is a coupling actuator (not shown) for moving the hex socket on the hex-nut drive 429 into engagement with hex-nuts suitably positioned on compatible servicing tools such as the multi-function tool 540. There is a third coupling actuator (not shown) for moving the electrical and data connectors behind doors 423 and 425 forward to mate with the electrical (power and data) connectors 161 and 165.

As discussed above, the fluid selection and coupling mechanism 110 includes at least one fluid coupling (106, 107) attached on an exterior of the housing section 102, and the end effector 411 and the housing section 102 of tool 100 are configured such that when the end effector 411 grips the grapple fixture 108 and the coupling actuator is activated fluid couplings 419 on the end effector 411 mate with fluid couplings 106, 107 on the exterior of the housing section 102.

Further, the end effector 411 and housing section 102 are configured so that when end effector grips the tool grapple fixture 108, the electrical connectors behind doors 423 and 425 mate with electrical connectors 161 and 165 (FIG. 1) on tool housing section 102 thereby connecting the tool 100 to a source of power and data on the servicer satellite 400. An actuator (not shown) mounted in end effector 411 drives the two connectors behind the doors 423 and 425 into the tool connectors 161 and 165.

The electrical connectors on the end effector 411 may be both a data and power connectors and the electrical connectors on the housing 102 may also be power and data connectors. The connector 161 on the end effector 411 is connected to the motor 104 in addition to the various sensor systems located on tool 100, including, but not limited to rangefinders, cameras 139, switches, position sensors, temperature sensors, etc. The connector 161 enables commands to be sent to the tool 100 and for telemetry of all sensors to be sent back to the control system. Examples of commands is the voltage demand to the motor 104 and examples of telemetry are status of position switches, measured position, temperature levels and other health monitoring functions and other built-in test function status.

Once the servicer satellite 400 has captured or docked with the client satellite 401, the process for refuelling a client satellite involves first removing any thermal blanket, lockwire and outer cap (or tertiary seal) that may be in place and then using refuelling tool 100 to access and operate the client's propellant valves. Removal of the thermal blanket, lockwire may be achieved using for example the multifunction tool 540 and once access has been achieved, the multifunction tool 540 is sequestered.

Referring briefly to FIG. 18, for all tool 100 operations, the refueling tool 100 is connected to a robotic arm 403 that provides the structural connection to the host spacecraft 400, the electrical power for the tool, the connections to the propellants contained in the host satellite 400 refuelling system 406 via the propellant coupling mechanism 405, the propellant hose 404 leading from the satellite refueling system 406 to coupling mechanism 405 and the mechanical actuation of the gear shifter 109 (FIG. 10).

To open, refuel and close the client satellite fill/drain valve 402, the refuelling tool 100 performs four functions, each function being selected by positioning the gearbox shifter 109 in a selected position. These positions are named here, for convenience, Gear 1, Gear 2, Gear 3 and Gear 4 and each gear position corresponds to the gearbox shifter 109 having been linearly moved to position the two drive pinions 118 to specific locations. Linear actuator 421, that is part of the end effector 411 (FIG. 23A), moves the gearbox shifter 109 forwards and backwards allowing the control software in the host spacecraft 400 to select the appropriate gear to perform the tasks as needed. In an alternative embodiment, the gearbox shifter 109 can be linearly actuated by an actuator physically mounted within the refuelling tool 100. In this form, this actuator would be commanded with the electrical connectors 161 and 165.

The first function that must be performed is to ensure that the correct propellant will be provided to the satellite 401. The Fuel Oxidiser Exchanger (FOE) 110 (FIG. 5A-5E) is the mechanism that is used to switch between the several propellants that the tool 100 can manage. After the robotic arm 403 has grappled the refueling tool 100 using the grapple fixture 108 and made all mechanical and electrical connections, the operator establishes which propellant will be provided to the client satellite 401.

There is a nominal stowage position for the FOE 110 and if the propellant to be supplied matches the nominal FOE position, no further action is required. If the nominal FOE position does not match that of the propellant to be supplied, then, the refuelling tool 100 is moved onto the Reset Post 111 by the robotic arm 403. The linear actuator 421 is commanded to move the gear shifter 109 to the Gear 1 position which is located such that the upper drive pinion 118 on the gear shifter 109 engages the FOE drive gear 168 on the upper FOE housing 330 (shown in FIG. 5H). The motor 104 is commanded to move the FOE 110 such that the correct propellant delivery tube 112 is located concentric with the cam wrench centreline 313 (FIGS. 11A and 13A) The refuelling tool 100 is then moved off of the reset post 111 (FIGS. 17 and 18), the correct propellant delivery tube slides down into the centre of the cam wrench mechanism 300 driven by spring 340 as the tool 100 moves off the rest post 111 and manoeuvred over the client valve 402.

The ability of the tool 100 to perform four distinct functions, two of which involve splitting the motor torque equally between two cam wrench mechanisms (300A and 300C or 300B and 300C) is a key factor in permitting tool 100 to work. The torque splitting is performed using the differential gear train 200. While individual differential gear trains are not unique, the ability of the refuelling tool gearbox 200 design to shift between several differential and non-differential gear trains is unique. These four gear trains are described while defining each of the gear states: Gear 1, Gear 2, Gear 3 and Gear 4. While the gearbox 200 in this example of a refuelling tool switches between a total of four separate gear trains, there is nothing inherent in the design that would prevent the number of gear trains from being some other number from two trains up to the limit of the space available and the amount of linear motion available to the gear shifter 109 due to actuator 421 on the end effector 411.

Using detailed knowledge of the client satellite, the robotic arm 403 manoeuvres the tool 100 to a position very near the client fill/drain valve 402 and then the operator uses the three cameras 139 and their associated optics 114 and lights 115 to provide final and fine guidance to move the tool 100 down over the valve 402 until the refueling tool 100 comes in contact with the surface of the client satellite 401 with the client valve 402 located within the tool 100. At this point the tip 116 of the propellant delivery pipe 112 is in gentle contact with the top of the secondary seal fitting on the client valve 402.

The first step in servicing the client satellite drain/fill valve 402 is to remove the secondary seal fitting 117. To do so the linear actuator 411 moves the gearbox shifter 109 to the Gear 2 position. In this position, the lower drive pinion 118 on the gear shifter 109 engages the secondary seal sun gear 208. The refueling tool 100 is commanded to rotate the secondary seal fitting 117 in a counter-clockwise direction. With the gear shifter in the above noted Gear 2 position, torque from the motor 104 passes to the gear shifter 109, which is also the main input drive shaft, via motor output gear 155 idler gear 154 and gear shifter input gear 156. The torque then passes from the upper pinion 118 to the lower pinion 118 which is engaged in the secondary seal sun gear 208. The well understood differential arrangement of the secondary seal sun gear 208, secondary seal planet gears 207, secondary seal fitting planet carrier gear 209 and the ring gear 206 splits the input torque from the lower pinion 118 and causes both the ring gear 206 and the secondary seal fitting planet carrier gear 209 to rotate in opposite directions. The secondary seal fitting planet carrier gear 209 is connected to output shaft 266, which is then connected to lower output shaft 266A via a spline coupling 396 and then to cam wrench mechanism 300A. The ring gear 206 is connected to the reaction gear 264, which is then connected to lower reaction gear 264A via a spline coupling 398 and then to cam wrench mechanism 300C.

It will be appreciated that while the present disclosure shows three (3) different cam wrench mechanisms 300A, 300B and 300C stacked coaxially one on top of the other, it will be understood that some applications may require only two (2) cam wrench mechanisms coaxially stacked one on top of each other depending on the number of the nuts on the client satellite they are engaging for the application at hand.

When in the Gear 2 position as described above, torque is supplied to the cam wrench mechanism 300A that engages the secondary seal fitting and to the cam wrench mechanism 300C that engages the torque reaction features on the client valve 402. The differential action of the gearbox 200 causes both cam wrench mechanisms 300A and 300C to activate and the cams to close on and engage the flat surfaces of the secondary seal fitting 117 and the torque reaction features 121. As torque is applied to the cam wrenches 300A and 300C (described in more detail below) they both rotate around the client valve 402 in opposite directions and the nut cams 301 of the wrench close in providing an action that both "hunts" for the optimal seating position for the nut cams 301 to apply torque to the client valve 402 and centres the valve within the refuelling tool 100 to provide the correct alignment between the tool 100 and the client valve 402 for further functions.

Once the mechanism has found its optimum position, further application of motor torque causes cam wrench mechanism 300A to apply a loosening torque to the secondary seal fitting 117 and the other cam wrench mechanism 300C to apply an equal and opposing reaction torque to the valve reaction features 121. This contains all of the servicing torques within the valve 402 and the tool 100 and virtually eliminates any torque being applied to the structure of the client spacecraft 401, which it may not be designed for. It also eliminates torques being applied to the servicing spacecraft robotic arm 403 allowing it to be significantly lighter.

The torque applied to the secondary seal fitting 117 is increased until it overcomes the torque with which it was installed and then the fitting is rotated in the counter-clockwise direction until it is completely free of the client valve 402. The secondary seal fitting cam wrench 300A has attached to it, via an axis and spring, a pair of seal fitting retainers 305 and when the secondary seal fitting is completely loose from the client valve 402, these fitting retainers 305, driven by their springs 316, become engaged with the underside of the seal fitting 117. Contained at the sides by the cam wrench jaws 301 of cam wrench 300A, from the top by the propellant delivery pipe 112 and from below by the fitting retainers, the secondary seal fitting 117 is ready to be removed from the client valve 402.

To remove the secondary seal fitting 117 from the client valve 402, the gear shifter 109 is advanced to the Gear 3 position. In the Gear 3 position the lower drive pinion 118 is disengaged from the secondary seal sun gear 208 and moved such that it directly engages the ring gear 206. In this position, the lower drive pinion 118 is disengaged from the secondary seal fitting cam wrench 300A but remains engaged with the torque reaction cam wrench 300C via reaction gear 264 and 264A. The motor 104 is then commanded to rotate such that the torque reaction cam wrench 300C opens. Mechanical drag within the machine leaves the jaws of the secondary seal fitting cam wrench 300A engaged with the fitting. With the jaws of the torque reaction wrench 300C fully withdrawn the way is clear for the refuelling tool 100 to be withdrawn from contact with the client valve 402 taking the secondary seal fitting 117 with it.

The refuelling tool 100 is manoeuvred away from the client satellite 401 and back to the host spacecraft 400 where there is a storage point for the removed secondary seal fitting 117. The storage point 122 includes a guide 123 for the refuelling tool 100 and a threaded fitting that matches the configuration of the client valve 402.

The refuelling tool 100 manoeuvres over the guide 123 and, using the cameras 139, optics 114 and lights 115, engages the tool 100 into the guide. Once engaged, the tool 100 is commanded down over the storage point 122. Once the tool 100 is fully seated into the storage point, the storage fitting 122 is inside the tool in the same location as the client valve 402 occupied and the retained secondary seal fitting 117 comes in contact with the top of the storage fitting 122. The springs on the retaining fittings are moved out of the way by the action of lowering the refuelling tool 100 over the storage fitting 122 leaving the threads of the secondary seal fitting 117 to engage with the treads on the top of the storage fitting 122.

To store the secondary seal fitting 117 onto the secondary seal fitting stowage point 122, the gear shifter 109 is retracted to the Gear 2 position, see above. The motor 104 provides torque to both the secondary seal fitting cam wrench 300A and to the torque reaction cam wrench 300C. The motor 104 is then commanded to rotate the secondary seal fitting 117 in the clockwise direction, installing it onto the storage fitting 122. Once a satisfactory installation torque has been reached, the motor direction is reversed and the cam wrench nut cams 301 are retracted to the fully open position. The refuelling tool 100 is retracted from the secondary seal fitting stowage point 122.

The refuelling tool 100 is then manoeuvred to the stowage point for a backup fill/drain valve 125. The backup fill/drain valve 125 provides a method to close off the client valve 402 in case the client valve's own sealing mechanism fails to work properly after refuelling. It is installed at the interface between the secondary seal fitting which has been removed and the exposed threaded interface on the client valve 402 and, if need be, is left behind to seal the client satellite's propellant system in the event that fuel is found to be leaking from the valve 402 even with the valve actuation nut 131 closed. The backup fill/drain valve 125 has interfaces at the top and bottom that match the configuration of the client valve 402 being serviced.

The backup fill/drain valve 125 stowage point has refuelling tool guides similar to those on the secondary seal fitting storage point 122. After being manoeuvred over the backup fill/drain valve 125 the guide positions the refuelling tool 100 properly with respect to the backup fill/drain valve 125 and the refuelling tool 100 is lowered down over the backup fill/drain valve 125. Once properly positioned within the refuelling tool 100, the top of the backup fill/drain valve 125 becomes engaged with the tip of the propellant delivery pipe 112. The tip of the propellant delivery pipe 112 contains a seal fitting 116 similar to the secondary seal fitting 117 of the client fill/drain valve 402.

Once the backup fill/drain valve 125 is properly positioned within the refuelling tool 100, the tool is retracted by the arm 403 to an intermediate position where the secondary seal fitting cam wrench 300A can engage the seal fitting 116 on the propellant delivery pipe 112. At that point the torque reaction cam wrench 300C is aligned with torque reaction features 129 on the backup fill/drain valve 125. The gearbox shifter 109 is commanded to the Gear 2 position, see above, (or verified that it has remained in the Gear 2 position) and the motor 104 is commanded to rotate the seal fitting 116 of the propellant delivery pipe 112 so that it is installed onto the top threaded feature 127 of the backup fill/drain valve 125. Once the proper torque is reached to ensure a good seal, the motor 104 is commanded to open the two cam wrenches to the fully open position and the arm moves the tool 100 downward so that the backup fill/drain valve 125 protrudes further into the tool 100 and the secondary seal fitting cam wrench 300A on the tool 100 aligns with the seal fitting 128 on the base of the backup fill/drain valve 125. At that point the torque reaction cam wrench 300C is aligned with torque reaction features 431 on the base of the backup fill/drain valve 125 stowage point.

With the gear shifter still in the Gear 2 position, the motor 104 on the tool 100 is commanded to rotate the seal fitting at the base of the backup fill/drain valve 125 in the counterclockwise direction thereby disengaging the backup fill/drain valve 125 from the backup fill/drain valve stowage point. At this point the backup fill/drain valve 125 is fully installed in tip 116 of the propellant delivery tube 112 and free of the backup fill/drain valve stowage point 126. The refuelling tool 100 is manoeuvred off of the backup fill/drain valve 125 stowage point 126 and then back over the client valve 402. Again using the refuelling tool cameras 139, optics 114 and lights 115, the refuelling tool 100 is manoeuvred down to the client valve 402 until the seal fitting at the base of the backup fill/drain valve 125 can be seen engaging the threaded feature at the top of the client valve 402 where the client secondary seal fitting 117 had been threaded previously before removal. Once this has taken place the refuelling tool 100 is commanded downwards until the refuelling tool again contacts the surface of the client satellite 401.

With Gear 2 still engaged, and the seal fitting 128 of the backup fill/drain valve 125 engaged with the threads on the client valve 402 the motor 104 is commanded to turn the seal fitting 128 clockwise, installing the backup fill/drain valve 125 and propellant delivery pipe 112 onto the client satellite 401. Once the correct sealing torque has been achieved, the motor 104 is commanded to open cam wrenches 300A and 300C to the fully open position.

With the backup fill/drain valve 125 installed on the client valve 402 the propellant hose(s) 404 (FIG. 18) in the robotic arm 403 is advanced until the fluid couplings 419 and 419 on the hose mechanism on end effector 411 fully engages with the fittings 106 and 107 on the refuelling tool 100. The mechanical arrangement of the hose couplings and the refuelling tool 100 fittings 106 and 107 is such that it is impossible to incorrectly mate hose couplings 419 and 419' to the desired fittings 106 and 107 on the tool 100.

The valve within the backup fill/drain valve 125 is nominally closed and in this position, and with the propellant hose 404 to the host spacecraft attached, the propellant hose 404 is pressurised by the propellant transfer system 406 on the servicer satellite 400 so that it can be verified that the backup fill/drain valve 125 to propellant delivery pipe connection is pressure tight. Once this has been verified the refuelling tool 100 is raised to the point where the torque reaction cam wrench 300C is in contact with the torque reaction features 129 on the backup fill/drain valve 125. The gear shifter 109 is advanced to the Gear 4 position by the linear actuator 421. In this position, the lower pinion 118 on gear shifter 109 is aligned with the valve actuation sun gear 205. With the gear shifter 109 in the above noted Gear 3 position, torque from the motor 104 passes to the gear shifter 109, via motor output gear 155 idler gear 154 and gear shifter input gear 156. The torque then passes from the upper pinion 118 to the lower pinion 118 which is engaged in the valve actuation sun gear 205. The well understood differential arrangement of the valve actuation sun gear 205, secondary seal planet gears 204, valve actuation planet carrier gear 203 and the ring gear 206 splits the input torque from the lower pinion 118 and causes both the ring gear 206 and the valve actuation planet carrier gear 203 to rotate in opposite directions. The valve actuation planet carrier gear 203 is connected to output shaft 262, which is then connected to lower output shaft 262A via a spline coupling 396 and then to cam wrench mechanism 300B. As before, the ring gear 206 is connected to the reaction gear 264, which is then connected to lower reaction gear 264A via a spline coupling 398 and then to cam wrench mechanism 300C. The motor 104 is commanded to rotate the backup fill/drain valve actuation nut 132 to the open position. In the Gear 4 position, when torque is applied to the input pinion 118 on the gear shifter 109 the selected differential gear stage splits the torque between the torque reaction cam wrench 300C and the valve actuation cam wrench 300B. Similar to the action when removing or installing the seal fitting, the motor torque is supplied to the valve actuation cam wrench mechanism 300B that engages the valve actuation nut 132 and to the torque reaction cam wrench mechanism 300C that engages the torque reaction features 129 respectively on the backup fill/drain valve 125. The differential action of the gear train causes both cam wrench mechanisms 300B and 300C to activate and the nut cams 301 to close on and engage the flat surfaces of the backup fill/drain valve 125 actuation nut 132 and the backup fill/drain valve 125 torque reaction features 129. As torque is applied to the cam wrenches 300B and 300C they both rotate around the backup fill/drain valve 125 in opposite directions and the nut cams 301 of the wrench mechanism 300B and 300C close in providing an action that both "hunts" for the optimal seating position for the cams to apply torque to the backup fill/drain valve 125 and centres the backup fill/drain valve 125 within the refuelling tool 100 to provide the correct alignment between the tool 100 and the backup fill/drain valve 125 for further functions.

Once the mechanism has found its optimum position, further application of motor torque causes cam wrench 300B to apply a loosening torque to the actuation nut on the backup fill/drain valve 125 and the other cam wrench 300C to apply a reaction torque to the reaction features 129 of the backup fill/drain valve 125. Again, this contains all of the servicing torques within the backup fill/drain valve 125 and the tool 100 and virtually eliminates any torque being applied to the structure of the client spacecraft 401.

The torque applied to the backup fill/drain valve 125 actuation nut 132 is increased until it overcomes the torque with which it was installed and then the nut rotates in the counter-clockwise direction until the backup fill/drain valve 125 aperture is completely open. Once the backup fill/drain valve 125 actuation nut 132 is open, the seal between the backup fill/drain valve 125 and the client satellite is pressure checked by the host satellite refuelling system 406.

Once the pressure checks have been passed, the cam wrenches (300B and 300C) are commanded to open fully and the refuelling tool 100 is translated back down until it again contacts the surface of the client satellite 401. In this location, and with Gear 4 (see above) still engaged, the motor 104 is commanded to open the valve actuation nut 131 on the client fill/drain valve 402 using the valve actuation nut cam wrench 300B while cam wrench 300C is engaged with torque reaction feature 121 on valve 402. Once the valve 402 is fully opened, the refuelling system on the servicer spacecraft 400 directs new propellant from the servicer spacecraft 400 to the client spacecraft 401 through the propellant hose 404. When the desired amount of propellant has been transferred to the client satellite 401, the motor 104 is commanded to close the valve actuation nut 131 using the valve actuation nut cam wrench 300B and the torque reaction cam wrench 300C is engaged with torque reaction feature 121 on valve 402.

With the backup fill/drain valve 125 still in the open position, the integrity of the closed client valve 402 seal is pressure checked by the host satellite refuelling system 406. If the seal is acceptable, the process skips on to the removal of the backup fill/drain valve 125 step, below. If the seal is inadequate, the backup fill/drain valve 125 is left behind as the client's primary seal. In that case, the refuelling tool 100 is translated away from the client spacecraft 401 until the refuelling tool valve actuation nut cam wrench 300B can access the actuation nut 132 on the backup fill/drain valve 125 and, with the tool in Gear 4 (see above), the motor 104 is commanded to close the backup fill/drain valve 125 actuation nut 132 and, when closed, the seal is pressure checked by the host satellite refuelling system 406. When the seal is acceptable, the propellant hoses 112 are decoupled from the refuelling tool 100, cam wrenches 300B and 300C are commanded top fully open and the tool is translated to where the secondary seal fitting cam wrench 300A can access the seal fitting 116 between the propellant delivery pipe and the backup fill/drain valve 125. The gear shifter 109 is moved to the Gear 2 position (see above) and the motor 104 is commanded to disconnect the seal fitting 116 from the top of the backup fill/drain valve 125 using cam wrenches 300A and 300C. With seal fitting 116 completely loosened from the backup fill/drain valve 125, the refuelling tool 100 is manoeuvred away from the client fill/drain valve 402 leaving the backup fill/drain valve 125 behind.

Assuming the client valve 402 seal was acceptable, then, with the client spacecraft 401 resupplied with propellant, the backup fill/drain valve 125 is removed from the client fill/drain valve 402 by reversing the installation procedure. First, the propellant hoses 112 are decoupled from the refuelling tool 100. Then, with the gear shifter in the Gear 2 position (see above) the secondary seal fitting cam wrench untorques the seal fitting 128 between the backup fill/drain valve 125 and the client valve 402 allowing the tool to back away from the client satellite taking the backup fill/drain valve 125 with it. The tool 100 and backup fill/drain valve 125 are manoeuvred back to the stowage point on the servicer satellite 400. Once the tool 100 has been guided back down over the backup fill/drain valve 125 stowage point the secondary seal fitting cam wrench 300A reinstalls the backup fill/drain valve 125 seal fitting onto the stowage point.

The cam wrenches 300A and 300C are positioned to the fully open position and the tool 100 is free to translate upwards to where the secondary seal fitting cam wrench 300A detaches the seal fitting 116 at the tip of the propellant pipe 112 from the top of the backup fill/drain valve 125. The cam wrenches (300A and 300C) are opened again and the refuelling tool 100 is now free from the backup fill/drain valve 125.

The tool 100 translates to the replacement secondary seal fitting stowage point 133 on the servicer satellite 400. With the gear shifter 109 still in the Gear 2 position (see above), the refuelling tool 100 picks up a replacement secondary seal fitting 134 in the same way as it picked up the backup fill/drain valve 125. The seal fitting 116 on the end of the propellant delivery pipe 112 is torqued onto the threaded feature 137 on the top of the replacement fitting 134 and then the seal fitting 136 at the base of the replacement fitting 134 is detached using the secondary seal fitting cam wrench 300A allowing, once the cam, wrenches 300A and 300C are opened the replacement secondary seal fitting 134 to be lifted away from the servicer satellite 400 and manoeuvred over the client satellite fill/drain valve 402.

With the gear shifter still in Gear 2, the replacement secondary seal fitting 134 is installed onto the client valve 402 by using the secondary seal fitting cam wrench 300A to install the seal fitting 136 of the replacement fitting 134 onto the threaded feature on top of either the client valve 402 or the backup fill/drain valve 125 depending upon whether the backup fill/drain valve 125 is to remain on the client satellite 400. Once the replacement secondary seal fitting 134 has been torqued to the correct value, the tool 100 is translated such that the seal fitting 116 on the propellant delivery pipe 112 can be removed from the top of the replacement seal fitting, leaving the tool 100 free and leaving the replacement seal fitting installed on the client satellite 401.

This completes the tool activities to provide one propellant to a client satellite 401.

As mentioned above, the cam wrench mechanisms 300A, 3006 and 300C for opening and closing the fill/drain valves 402 are aligned coaxially one on top of the other. The cam wrench mechanism 300 and the gearbox 200 are configured so that the torque is substantially equally split between the two output shafts 262 (262A) and 264 (264A) or 266 (266A) and 264 (264A) of selected pairs of cam wrench mechanisms (300A, 300C, or 300B, 300C) which are being employed as pairs to avoid applying torque to the client satellite 401 or to the robot arm 403 during fluid transfer operations. It will be understood that the torque may not be split exactly equally due to the mechanical nature of the system but they are substantially equal.

Replenishing a client satellite 401 may require the provision of several types of propellants to several different sized fill/drain valves. To accomplish this without requiring the use of multiple refuelling tools required the disclosure of the present cam wrench mechanism 300. The cam wrench mechanism 300 allows torque to be applied to a wide range of nut sizes that may be at any rotational orientation around the nut axis and can be reversed to permit the application of torques in both the clockwise and counter-clockwise directions using the same cam wrench.

All three cam wrenches 300A, 300B and 300C in the refuelling tool 100 work essentially the same way and may be comprised of identical parts if the client valve 402 specifications permit it. The cam wrench mechanisms comprise the following principle components: a housing, which supports the components of the cam wrench via bearings and is anchored to the tool lower housing structure 103 to prevent its rotation under torque load, a drive ring which is geared on its exterior surface to accept the torque input from the gearbox output shaft, a cam ring, which is coaxial with the drive ring, supports two cam locks and resides within the drive ring, two nut cams which are free to rotate each within a hole in a cam lock, two cam locks, each of which supports one nut cam and is free to translate radially within the cam ring and a detent spring which resides between the cam ring and the housing which provides the initial resistance to motion so that the cams start to rotate before the cam ring is rotated by the drive ring. Other fasteners and covers may be present in order to build a reliable mechanism, but they are not critical to the operation of the cam wrench mechanism.

The physical manifestation of the cam wrench mechanism 300 is quite compact and takes up little space perpendicular to the axis of the client valve 402 so that several mechanisms (300A, 300B, 300C) may be stacked coaxially on top of each other to apply torque at several locations along the axis of rotation without moving the tool 100. Each cam wrench mechanism 300A, 300B and 300C must be supplied with torque from an external source, such as output and reaction shafts 262 (262A), 264 (264A) and 266 (266A) from a gearbox 200. Usually, the cam wrench mechanisms 300A, 300B, 300C are utilized only in pairs with the wrenches of each pair being rotated in opposite directions.

A key feature of each of the adjustable cam wrench mechanisms is the presence of the cam locks 303. Referring to FIG. 11A, each adjustable wrench mechanism (300A, B and C) includes housing 302 having a rotational axis 313, the pair of opposed nut cams 301 pivotally mounted each to toothed cam lock 303. The nut cams 301 each include a pawl member 307, with the cam locks 303 being translationally mounted to cam ring 308. The cam ring 308 is coaxially mounted in the housing 302 and is rotationally movable with respect to the housing 302. A detent spring 304 is mounted between the cam ring 308 and the housing 302 to restrict movement of the cam ring. The toothed drive ring 306 having an inner tooth surface 315 and outer toothed surface and is mounted in the housing 302 and is rotatable with respect to the housing 302. The cam pawls 307 are engaged with the toothed drive ring 306 so that when the toothed drive ring is rotated by an output shaft from the differential gear box 200, the opposed nut cams 301 are rotationally driven until they contact opposing outer surfaces of a faceted rotatable element (such as fill/drain valve 402), at which point the toothed cam locks 303 slide radially outward to engage the toothed inner surface 315 of the drive ring 306 thereby locking the drive ring 306 and the cam ring 308 together to permit torque applied by the output shaft to be transmitted to the faceted surface.

More specifically, referring to FIGS. 10, 11 and 12, to operate a cam wrench 300A, 300B or 300C, torque is input to the mechanism via the drive ring 306, which turns on the bearing 317 in the housing 302. As the drive ring 306 turns, the detent spring 304 keeps the cam ring 308 rotationally fixed to the housing 302. The nut cams 301 (301A) are attached to the cam rings 308 yet have pawls 307 that engage slots 309 in the drive ring 306. As these pawls 307 are moved by the drive ring 306, and given that the cam ring 308 is not rotating, the nut cams 301 start to rotate. The nut cams 301 (301A) continue to rotate as the drive ring 306 rotates until their interior surfaces 310 contact the object or nut to be rotated. At that point a moment or torque is established that tries to rotate the axis 311 of the nut cams 301 (301A) away from the axis 313 of the nut being acted upon.

The axis 311 of the nut cams 301 is supported within the cam locks 303 and these cam locks are free to slide radially inwards and outwards, a spring 312 being used to keep them nominally positioned closer to the cam wrench axis of rotation 313. As cam nut 301 (301A) contacts the nut face 310, the resultant moment pushes the cam lock outward to the point where the spline segment 314 on the exterior of the cam lock 303 engages with the spline segments 315 on the interior of the drive ring 306. This locks the cam ring 308 and the nut cams 301 (301A) rotationally to the drive ring 306 and from that point onward additional torque applied to the drive ring 306 is resolved as torque applied to the nut that is to be rotated.

Changing the direction of rotation of the drive ring 306, usually, but not necessarily, by changing the direction of rotation of the tool motor 104, rotates the drive ring 306 in the opposite direction. The nut cam 301 (301A) rotates out of contact with the nut or object being rotated and the moment that moved the cam lock 303 radially outward and into contact with the drive ring disappears. The spring 312 attached to the cam lock 303 moves the cam lock 303 back to its original position thereby unlocking the cam ring 308 from the drive ring 306 and the drive ring 308 starts to rotate in the other direction. It will continue to rotate in that direction until the contact faces 310 of the nut cams 301 (301A) again come into contact with the nut and the contact force moment is re-established. At that point the cam lock 303 again moves outward and locks the cam ring to the drive ring and the wrench mechanism can apply torque in the opposite direction to before. Thus the same mechanism can apply torque in the clockwise and counter-clockwise directions.

As drive ring 306 rotates around axis 313 it pushes on pawl 307. Pawl 307 pushes nut cam 301 to rotate around axis 311 until cam face 310 comes into contact with something solid. The drive ring 306 continues to rotate and the push force on the pawl 307 is resisted by whatever surface face 310 is in contact with. The combination of the force on pawl 307 and the resistance by 310 creates a moment within the nut cam 301, but cam nut 301 is not held rigidly and does not resist the radial component of the forces developed because the axis 311 sits in the nut cam 303 which is free to slide radially. The forces on the axis 311 force the nut cam 303 to slide radially outward until the teeth on the nut cam 314 engage the inner teeth 315 on the drive ring 306. These teeth intermesh and lock the two rings 306 and 308 together. The locked pair of then rings resist the resultant force on 311 and then can transmit torque to the feature.

The size adjustability comes about because the locking of the two rings does not occur until the face 310 actually contacts something solid creating the radial force vector that moves the cam lock out into engagement with the drive ring 306. For a larger feature, the nut cam 301 does not rotate as much when pawl 307 is pushed before contacting the larger feature and the mechanism locks up soon after torque is applied. For smaller features, the nut cam 301 has to rotate further before contact and only after the contact is made after this larger rotation does the cam lock 303 move outwards to lock the two rings 306 and 308 together.

The use of backup fill/drain valve 125 is very advantageous for several reasons. If the client fill drain valve cannot be properly closed (i.e., if it leaks), then propellant would leak from the client propulsion subsystem as soon as the refueling tool is disconnected. This situation is not acceptable and the risk of its occurrence could dissuade potential customers from consider propellant resupply of their spacecraft. This risk is mitigated through the use of the backup fill/drain valve 125. The system may be configured in such a way that backup fill/drain valve 125 also functions as a throttling valve. If the backup fill/drain valve 125 is only partially opened, then it has increased flow resistance and so can be used to regulate the flow rate of propellant. This is useful for the direct transfer method as otherwise the flow rate would be determined solely by the pressure difference between the client propellant tank and the servicer spacecraft propellant storage tank. The backup fill/drain valve 125 provides a secondary sealing of the principal flow path from the client storage tank to the vacuum of space.

Tool 100 may include passive thermal control means such as thermal insulation blankets or surface coatings and may include active temperature control means for sensing and controlling the temperature of the housing and the mechanisms therein such as thermistors, thermal switches, heaters and heat pipes.

The tool 100 may include sensors for sensing and reporting the locations of designated moving parts. Said sensors may include switches, proximity sensors, miniature cameras or visual indications on or inside the tool. Portions of the tool housings (101, 102, 103, 105) may have openings to permit cameras external to the tool to view and report on mechanism positions.

An advantage of the present tool is that the gear shifter shaft 109 is also the torque input shaft for the gearbox 200 so that the present system does not require a separate drive input and separate gear shifter, the present system accomplishes both using one shaft.

It will be understood that the present tool may be used not just for refueling operations but in any operation for opening a rotationally removable access component of the client satellite, i.e., not just fill/drain valves but any other the access component on the client satellite having rotatable and static features. Such a tool is useful for accessing other areas of the client satellite rather than specifically the propellant system. Such a tool would not require the fluid exchanger subsystem per se and as such in this embodiment of the tool the fluid exchanger subsystem would be optional.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A system mounted on a servicing spacecraft for transferring fluid between one or more selected fluid storage tanks on the servicing spacecraft and a client satellite, the client satellite including one or more fluid storage tanks and a fill/drain valve associated with each of the one or more fluid storage tanks, each fill/drain valve having rotatable features and static features coaxially aligned along a first axis, comprising:
   a) a positioning mechanism, an end effector mounted on the positioning mechanism, the end effector being coupled to the one or more selected fluid storage tanks;
   b) a tool including
      a housing,
      a grapple fixture mounted on said housing configured to be grasped by said end effector,
      a fluid selection and coupling mechanism mounted in said housing and configured to be coupled to the end effector for coupling the one or more fluid storage tanks on the client satellite to the one or more selected fluid storage tanks mounted on the servicing spacecraft,
      a wrench permanently fixed within said housing including at least first and second adjustable wrench mechanisms coaxially aligned one on top of the other along a second axis, one of said first and second adjustable wrench mechanisms being configured to engage the rotatable feature and the other being configured to engage the static feature while simultaneously and adjustably conforming to a size of the rotatable and static features for opening and closing each fill/drain valve on the one or more tanks and mating the fluid selection and coupling mechanism to the at least one fill/drain valve on the client satellite;
an actuator mounted in said housing coupled to the fluid selection and coupling mechanism and the wrench;
c) a sensor system for at least determining a relative displacement between said tool and each fill/drain valve on the one or more fluid storage tanks; and
d) a control system in communication with said sensor system, said positioning mechanism, said end effector and said actuator for controlling operation of said positioning mechanism, said end effector and said tool based on feedback from said sensor system.

2. The system according to claim 1 wherein said actuator includes
a motor,
a gear shifter, the motor being coupled to the gear shifter,
a differential gearbox mounted in said housing coupled to said gear shifter and at least first and second output shafts, the gear shifter being configured to transmit torque from said motor to said differential gearbox, said differential gearbox being configured to transmit said torque received from said gear shifter to said at least first and second output shafts, the gear shifter being configured to be engaged to said fluid selection and coupling mechanism for moving said fluid selection and coupling mechanism between at least two positions in said housing,
said first adjustable wrench mechanism being coupled to said first output shaft for transmitting torque received by said first output shaft from said gearbox to a first object engaged by the first adjustable wrench mechanism, said second adjustable wrench mechanism being coupled to said second output shaft for transmitting torque received by said second output shaft from said gearbox to a second object engaged by the second adjustable wrench mechanism, the gearbox being configured to split the torque received by the gear shifter evenly between the first and second adjustable wrench mechanisms to apply equal and opposite forces to said first and second objects; and
wherein said first object is the rotatable feature of a fill/drain valve such that the first adjustable wrench mechanism configured to engage the rotatable features of the fill/drain valve of the second satellite to apply bi-directional torque to the rotatable features, and the second object is the static feature of the fill/drain valve such that the second adjustable wrench mechanism reacts the torque on the static features on the fill/drain valve.

3. The system according to claim 2 wherein the at least one fill/drain valve includes a secondary seal fitting with associated rotatable features, wherein said wrench includes at least a third adjustable wrench mechanism being aligned coaxially with the first and second adjustable wrench mechanisms, said gearbox including a third output shaft, said third output shaft being coupled to said third adjustable wrench mechanism, said third adjustable wrench mechanism being configured to engage the associated rotatable features of the secondary seal fitting to apply bi-directional torque thereto while the second of the adjustable wrench mechanisms reacts this bi-directional torque on the static features on the fill/drain valve.

4. The system according to claim 3 wherein said differential gearbox is a shifting differential gearbox in which an operator can selectively shift between differentially paired output shafts.

5. The system according to claim 3 wherein said differential gearbox is a shifting differential gearbox in which an operator can selectively shift between said first and second output shafts and said second and third output shafts.

6. The system according to claim 3 wherein each adjustable wrench mechanism includes a housing having a rotational axis, a pair of opposed nut cams pivotally mounted each to a toothed cam lock, said nut cams each including a pawl member, said cam locks being translationally mounted to a cam ring, said cam ring coaxially mounted in said housing and being rotationally movable with respect to said housing, a detent spring mounted between said cam ring and said housing to restrict movement of said cam ring, a toothed drive ring having inner and outer toothed surfaces mounted in said housing and being rotatable with respect to said housing, said pawl member being engaged with said toothed drive ring so that when said toothed drive ring is rotated by an output shaft from said differential gearbox, said nut cams are rotationally driven until they contact opposing outer surfaces of a faceted rotatable element, at which point said toothed cam locks slide radially outward to engage a toothed inner surface of said toothed drive ring thereby locking the drive ring and the cam ring together to permit torque applied by said output shaft to be transmitted to said faceted surface.

7. The system according to claim 6 wherein said each nut cam includes a cam face, and wherein when said adjustable wrench mechanism is rotated within said housing over a fill/drain valve the cam faces on the two nut cams move towards each other until they contact the features on the fill/drain valve.

8. The system according to claim 1 wherein the positioning mechanism is configured to carry one or more fluid lines which are coupled to the one or more selected fluid storage tanks, and wherein the end effector is coupled to the one or more fluid lines on the positioning mechanism.

9. The system according to claim 8 wherein the end effector includes at least one fluid coupling and a coupling actuator for moving the at least one fluid coupling, and said fluid selection and coupling mechanism includes at least one fluid coupling attached on an exterior of the housing, and wherein the end effector and the housing are configured such that when the end effector grips the grapple fixture and the actuator is activated the at least one fluid coupling on the end effector mates with at least one fluid coupling on the exterior of the housing.

10. The system according to claim 9 wherein the end effector includes at least one electrical connector connected to a power source on the servicer satellite, and wherein said housing includes at least one electrical connector located on an exterior of the housing, and wherein the end effector and the housing are configured such that when the end effector grips the grapple fixture and the actuator is activated the at least one electrical connector on the end effector mates with at least one electrical connector on the exterior of the housing to provide power to the tool.

11. The system according to claim 10 wherein the at least one electrical connector on the end effector is a data and electrical connector, and wherein the at least one electrical connector on the housing is an electrical and data connector, and wherein the data connector on the end effector is connected to the control system, and wherein the data connector on the tool is connected to said sensor system and said actuator.

12. A system mounted on a servicing spacecraft for engaging components on a client satellite, the components having rotatable features and static features coaxially aligned along a first axis, comprising:
   a) a positioning mechanism;
   b) a tool connected to said positioning mechanism, said tool including
      a housing,
      a wrench permanently fixed within said housing including at least first and second adjustable wrench mechanisms coaxially aligned one on top of the other along a second axis and being permanently fixed with respect to each other, one of said first and second adjustable wrench mechanisms being configured to engage the rotatable feature and the other being configured to engage the static feature while simultaneously and adjustably conforming to the size of the rotatable and static features;
   c) a sensor system for at least determining a relative displacement between said tool and the client satellite; and
   d) a control system in communication with said sensor system and said positioning mechanism, for controlling operation of said positioning mechanism and said tool based on feedback from said sensor system.

\* \* \* \* \*